US011838459B2

(12) United States Patent
Naya et al.

(10) Patent No.: US 11,838,459 B2
(45) Date of Patent: Dec. 5, 2023

(54) INFORMATION PROCESSING SYSTEM, INFORMATION PROCESSING APPARATUS, AND INFORMATION PROCESSING METHOD

(71) Applicant: CANON KABUSHIKI KAISHA, Tokyo (JP)

(72) Inventors: Yuji Naya, Kawasaki (JP); Toru Takahashi, Matsudo (JP); Takeshi Matsumura, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/889,488

(22) Filed: Jun. 1, 2020

(65) Prior Publication Data

US 2020/0389565 A1  Dec. 10, 2020

(30) Foreign Application Priority Data

Jun. 7, 2019  (JP) .................................. 2019-106916
Jun. 13, 2019 (JP) .................................. 2019-110689

(51) Int. Cl.
*G06F 15/00* (2006.01)
*H04N 1/00* (2006.01)

(52) U.S. Cl.
CPC ....... *H04N 1/00403* (2013.01); *H04N 1/0044* (2013.01); *H04N 1/00474* (2013.01)

(58) Field of Classification Search
CPC ............. H04N 1/00403; H04N 1/0044; H04N 1/00474

(Continued)

(56) References Cited

U.S. PATENT DOCUMENTS 6,266,566 B1 * 7/2001 Nichols .............. A61N 1/37247
                                                           607/30
8,949,902 B1 * 2/2015 Fabian-Isaacs .... H04N 21/4821
                                                           725/40

(Continued)

FOREIGN PATENT DOCUMENTS

CN    104796527 A    7/2015
CN    105847622 A    8/2016
(Continued)

*Primary Examiner* — Mark R Milia
(74) *Attorney, Agent, or Firm* — Canon U.S.A., Inc. IP Division

(57) ABSTRACT

An image forming system includes an image forming device, a display capable of displaying information, a microphone capable of acquiring a sound, and one or more controllers configured to function as a unit of performing control so as to display, on the display, a screen including an operation object that indicates, by a pointing position, a parameter related to a setting in forming the image, a unit of acquiring, based on voice information representing one-phrase voice expression acquired via the microphone, first identification information corresponding to the operation object and second identification information corresponding to an updating process on the pointing position, and a unit of performing control, based on at least information regarding a current pointing position indicated by the operation object, the first identification information, and the second identification information, so as to display a screen including the operation object updated in terms of the pointing position.

23 Claims, 81 Drawing Sheets

(58) Field of Classification Search
USPC .......................................................... 358/1.13
See application file for complete search history.

(56) References Cited

U.S. PATENT DOCUMENTS

| | | |
|---|---|---|
| 2005/0065794 A1 | 3/2005 | Yamamoto |
| 2006/0181750 A1* | 8/2006 | Lu ..................... H04N 1/00466 358/527 |
| 2011/0035671 A1* | 2/2011 | Iwai ................... H04N 1/00347 715/728 |
| 2020/0098361 A1* | 3/2020 | Nakamae ................ G06F 3/167 |

FOREIGN PATENT DOCUMENTS

| | | |
|---|---|---|
| JP | 1081588 A2 | 3/2001 |
| JP | 2002123288 A | 4/2002 |
| JP | 2004206179 A | 7/2004 |
| JP | 2005500591 A | 1/2005 |
| JP | 2011-145748 A | 7/2011 |
| JP | 2013222229 A | 10/2013 |
| JP | 2014-78007 A | 5/2014 |
| JP | 2019049848 A | 3/2019 |
| JP | 2019-67258 A | 4/2019 |
| WO | 2009/016729 A1 | 2/2009 |
| WO | 2013/015364 A1 | 1/2013 |

* cited by examiner

FIG. 7B

| GROUP ID | VOICE RECOGNITION RESULT | |
|---|---|---|
| | KATAKANA | KANA/KANJI |
| OPR00000 | SOSA | 操作 (OPERATION) |
| OPR00001 | TATCHI | |
| | TAPPU | |
| | OSU | 押す (PRESS) |
| | OUKA | 押下 (PRESS) |
| | KURIKKU | |
| OPR00002 | RONGUTATCHI | |
| | RONGUTAPPU | |
| | NAGAOSHI | 長押し (HOLD DOWN) |
| OPR00003 | SUWAIPU | |
| OPR00004 | SURAIDO | |
| OPR00005 | SUKURORU | |
| OPR00010 | OKE | OK |
| | OKKE | |
| | KAKUTEI | 確定 (CONFIRM) |
| | KETTEI | 決定 (DETERMINE) |
| | KIMARI | 決まり (DECIDE) |
| OPR00011 | KAISHI | 開始 (START) |
| | SUTATO | |
| | HAJIME | 始め (BEGIN) |
| OPR00012 | SHURYO | 終了 (END) |
| | OWARI | 終わり (FINISH) |
| | KANRYO | 完了 (COMPLETE) |
| OPR00013 | KYANSERU | |
| | CHUSHI | 中止 (STOP) |
| OPR00014 | TEISHI | 停止 (PAUSE) |
| | POZU | |
| OPR00020 | TOJIRU | 閉じる (CLOSE) |
| | TOJITE | 閉じて (CLOSE) |
| | KUROZU | |
| ⋮ | | |
| OPR00040 | SENTAKU | 選択 (SELECT) |
| | SETTEI | 設定 (SET) |
| | SHITEI | 指定 (SPECIFY) |
| OPR00041 | HENKO | 変更 (CHANGE) |
| | HENSHU | 編集 (EDIT) |
| OPR00042 | HOSEI | 補正 (COMPENSATE) |
| | SHUSEI | 修正 (CORRECT) |
| | CHOSEI | 調整 (ADJUST) |
| OPR00043 | SAKUJO | 削除 (DELETE) |
| | KESHI | 消し (ERASE) |
| | KESU | 消す (ERASE) |
| | SHOKYO | 消去 (DELETE) |
| | JOKYO | 除去 (REMOVE) |
| | NAKUSU | なくす (ELIMINATE) |
| | NAKUSHITE | なくして (ELIMINATE) |
| OPR00044 | KATTO | |
| | KAIJO | 解除 (CLEAR) |
| | KURIA | |
| OPR00045 | RISETTO | |
| | YARINAOSHI | やり直し (RESET) |
| ⋮ | | |

| GROUP ID | VOICE RECOGNITION RESULT | |
|---|---|---|
| | KATAKANA | KANA/KANJI |
| FNC00000 | KINO | 機能 (FUNCTION) |
| | FANKUSHON | |
| FNC00001 | KOPI | |
| | FUKUSYA | 複写 (COPY) |
| | FUKUSEI | 複製 (DUPLICATE) |
| FNC00002 | INSATSU | 印刷 (PRINT) |
| | PURINTO | |
| FNC00003 | SUKYAN | |
| | YOMITORI | 読み取り (READ) |
| | YOMIKOMI | 読み込み (SCAN) |
| FNC00004 | HOZON | 保存 (SAVE) |
| | HOKAN | 保管 (STORE) |
| | KAKUNO | 格納 (STORE) |
| | NOKOSU | 残す (LEAVE) |
| | HORUDO | |
| | KIROKU | 記録 (RECORD) |
| | KAKIKOMI | 書き込み (WRITE) |
| FNC00005 | SOSHIN | 送信 (TRANSMIT) |
| | SENDO | |
| FNC00006 | JUSHIN | 受信 (RECEIVE) |
| | RESHIBU | |
| FNC00007 | SUPURU | |
| | TAMATTE | 溜まって (SPOOL) |
| FNC00008 | SHOKAI | 紹介 (INTRODUCE) |
| | HERUPU | |
| | GAIDO | |
| | INTORO | |
| ⋮ | | |

| GROUP ID | VOICE RECOGNITION RESULT | |
|---|---|---|
| | KATAKANA | KANA/KANJI |
| NUM00000 | ZERO | 0、零 (ZERO) |
| | REI | 0、零 (ZERO) |
| | ZEROBAN | 0番、零番 (ZEROTH) |
| | REIBAN | 0番、零番 (ZEROTH) |
| NUM00001 | ICHI | 1、一 (ONE) |
| | ICHIBAN | 1番、一番 (FIRST) |
| | HITOTSUME | 1つ目、一つ目 (FIRST) |
| NUM00002 | NI | 2、二 (TWO) |
| | NIBAN | 2番、二番 (SECOND) |
| | FUTATSUME | 2つ目、二つ目 (SECOND) |
| NUM00003 | SAN | 3、三 (THREE) |
| | SANBAN | 3番、三番 (THIRD) |
| | MITTSUME | 3つ目、三つ目 (THIRD) |
| NUM00004 | YON | 4、四 (FOUR) |
| | YONBAN | 4番、四番 (FOURTH) |
| | YOTTSUME | 4つ目、四つ目 (FOURTH) |
| ⋮ | | |
| NUM99999 | KYUMAN KYUSEN KYUHYAKU KYUJU KYU | 99999、九万九千九百九十九 (NINETY-NINE THOUSAND NINE HUNDRED AND NINETY-NINE) |
| | KYUMAN KYUSEN KYUHYAKU KYUJU KYUBAN | 99999番、九万九千九百九十九番 (NINETY-NINE THOUSAND NINE HUNDRED AND NINETY-NINTH) |

| GROUP ID | VOICE RECOGNITION RESULT | |
|---|---|---|
| | KATAKANA | KANA/KANJI |
| PAP00000 | YOSHI | 用紙 (SHEET) |
| | KAMI | 紙 (PAPER) |
| | SHITO | |
| | PEPA | |
| PAP00001 | SAIZU | |
| | OKISA | 大きさ (SIZE) |
| PAP00002 | KEIRETSU | 系列 (SERIES) |
| | KEITO | 系統 (SYSTEM) |
| | KATEGORI | |
| | KATEGORII | |
| PAP00003 | ISAIZU | 異サイズ (DIFFERENT SIZE) |
| PAP00004 | DOHABA | 同幅 (SAME WIDTH) |
| PAP00005 | IHABA | 異幅 (DIFFERENT WIDTH) |
| PAP00100 | EISAN | A3 |
| | ESAN | A3 |
| PAP00101 | EIYON | A4 |
| | EYON | A4 |
| PAP00102 | EIGO | A5 |
| | EGO | A5 |
| PAP00103 | BIIYON | B4 |
| | BIYON | B4 |
| ⋮ | | |

| GROUP ID | VOICE RECOGNITION RESULT | |
|---|---|---|
| | KATAKANA | KANA/KANJI |
| CHR00000 | E | A, a |
| | EI | A, a |
| CHR00001 | BI | B, b |
| CHR00002 | SHI | C, c |
| CHR00003 | DI | D, d |
| | DE | D, d |
| CHR00004 | I | E, e |
| CHR00005 | EFU | F, f |
| CHR00006 | JI | G, g |
| CHR00007 | EICHI | H, h |
| | ETCHI | H, h |
| CHR00008 | AI | I, i |
| ⋮ | | |
| CHR00025 | ZETTO | Z, z |
| | ZI | Z, z |

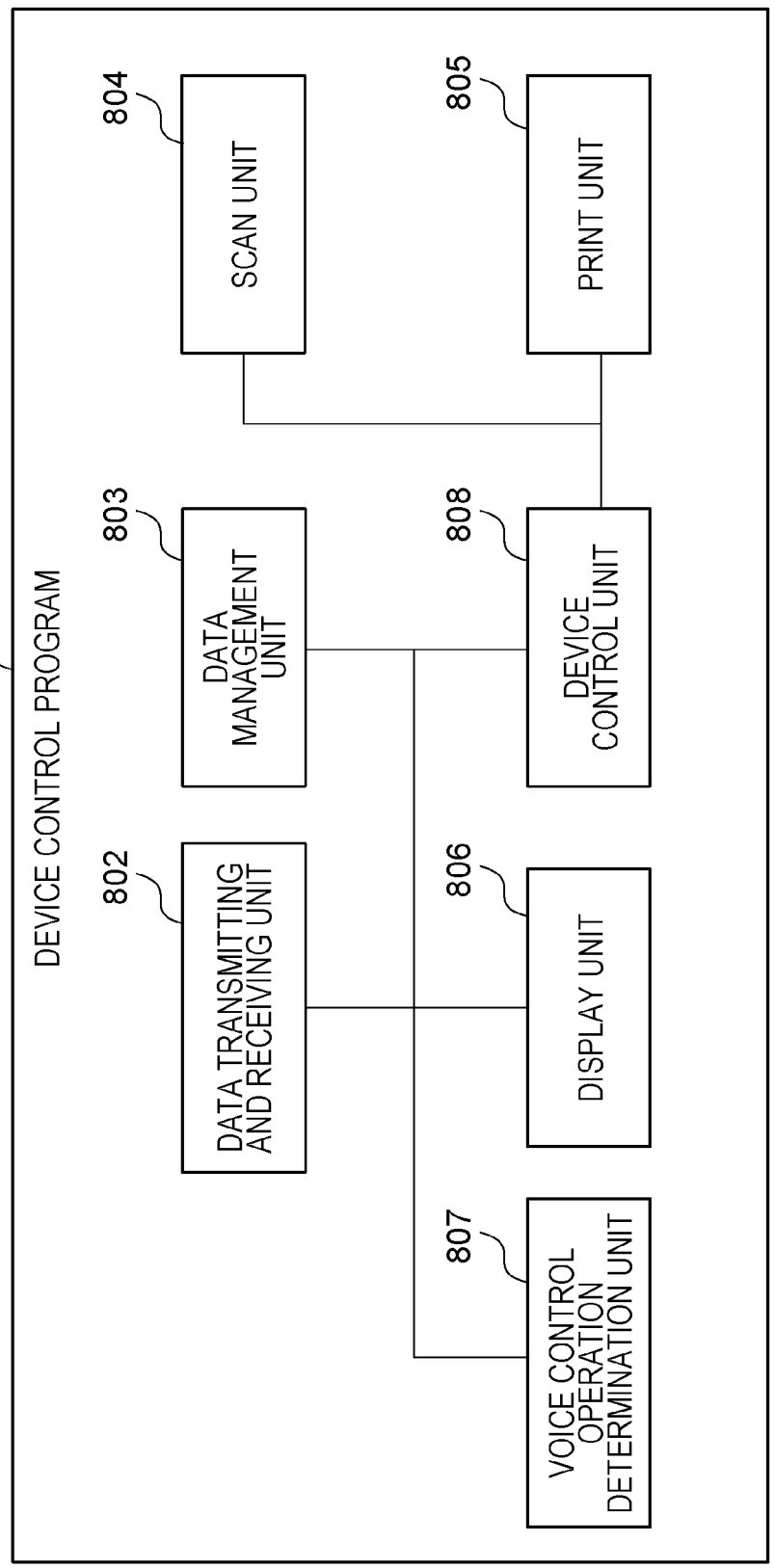

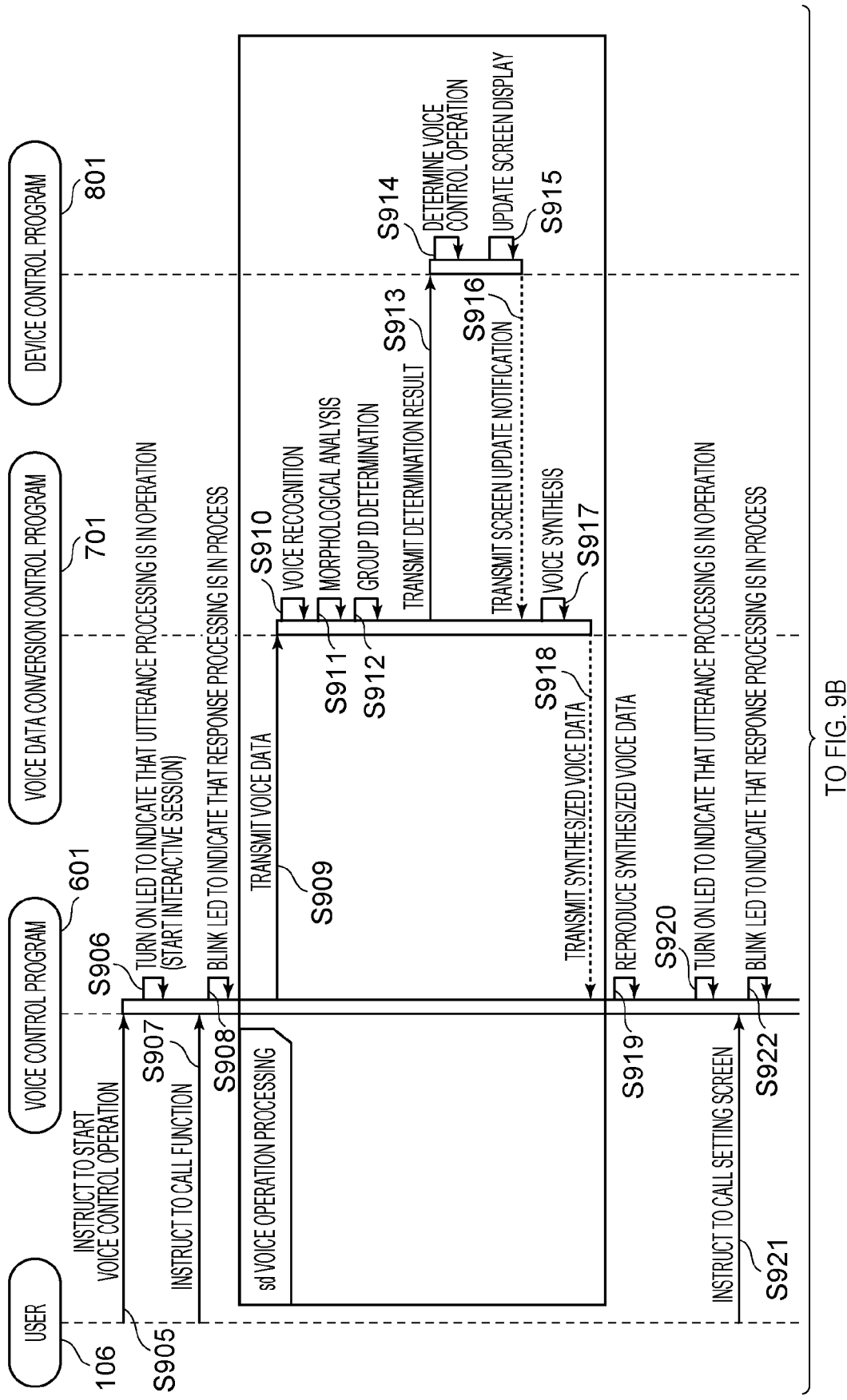

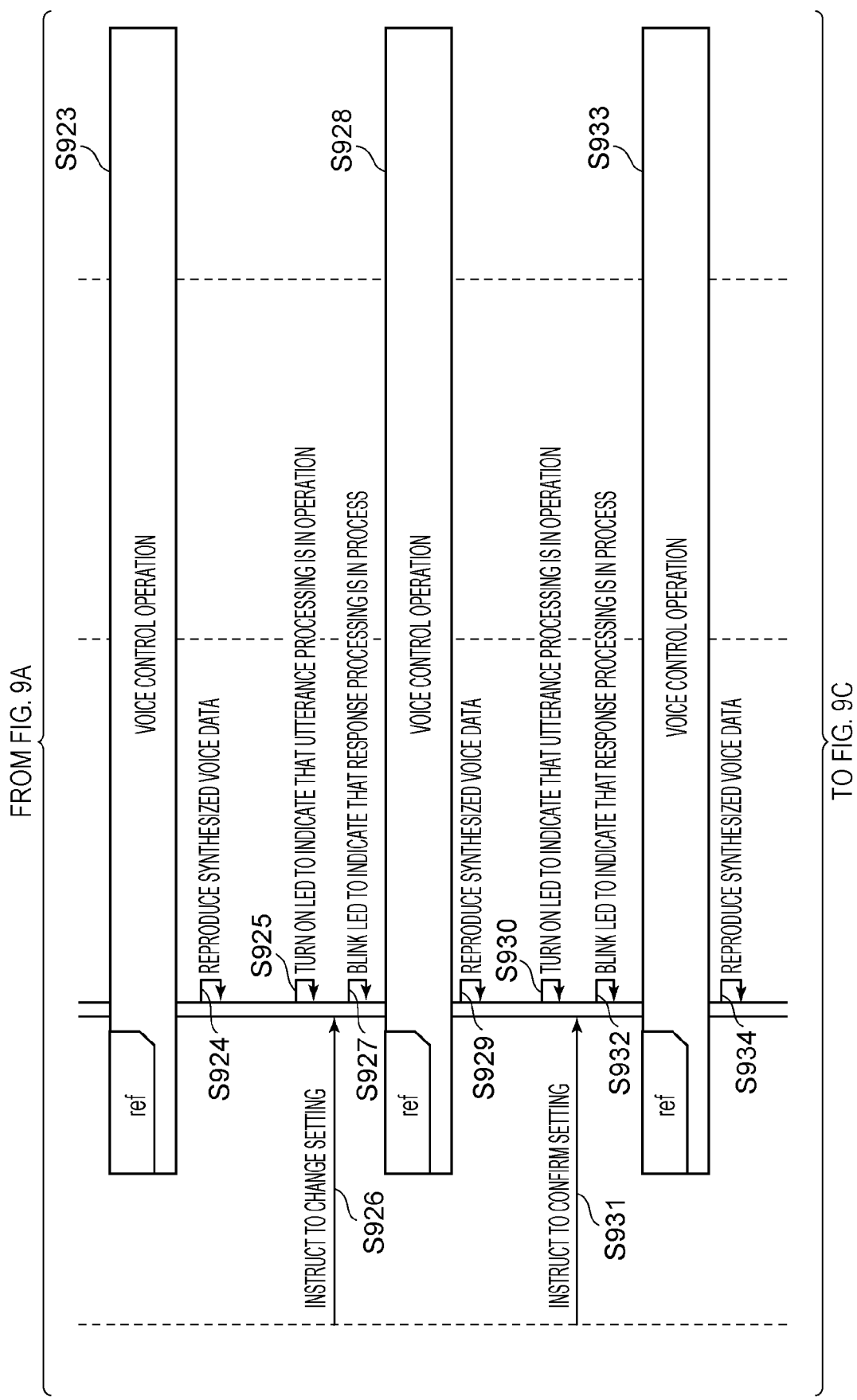

FIG. 11A

| GROUP ID | VOICE RECOGNITION RESULT | |
|---|---|---|
| | KANA | KANA/KANJI |
| COL00000 | KARA | |
| | IRO | 色 (COLOR) |
| COL00001 | REDDO | |
| | AKA | 赤 (RED) |
| | AKAIRO | 赤色 (RED COLOR) |
| COL00002 | GURIN | |
| | MIDORI | 緑 (GREEN) |
| | MIDORIIRO | 緑色 (GREEN COLOR) |
| COL00003 | BURU | |
| | AO | 青 (BLUE) |
| | AOIRO | 青色 (BLUE COLOR) |
| COL00004 | IERO | |
| | KI | 黄 (YELLOW) |
| | KIRO | 黄色 (YELLOW COLOR) |
| COL00005 | MAZENTA | |
| | MAZENDA | |
| COL00006 | SIAN | |
| COL00100 | BURAKKU | |
| | KURO | 黒 (BLACK) |
| | KUROIRO | 黒色 (BLACK COLOR) |
| COL00101 | GURE | |
| | GURESUKERU | |
| | SHIROKUROTACHI | 白黒多値 (MULTILEVEL BLACK AND WHITE) |
| COL00102 | SHIROKURO | 白黒 (BLACK AND WHITE) |
| | BIDABURYU | BW |
| | MONOKURO | |
| COL00103 | SHIROKURONICHI | 白黒2値、白黒二値 (BINARY BLACK AND WHITE) |
| COL00110 | TANSHOKU | 単色 (SINGLE COLOR) |
| | MONOKARA | |
| COL00111 | NISHOKU | 2色、二色 (TWO COLOR) |
| | BAIKARA | |
| COL00200 | IROBETSU | 色別 (FOR EACH COLOR) |
| | IROGOTO | 色ごと (FOR EACH COLOR) |
| | KAKUSHOKU | 各色 (EACH COLOR) |
| COL00201 | ZENSHOKU | 全色 (ALL COLORS) |
| | FURUKARA | |

FIG. 11B

| GROUP ID | VOICE RECOGNITION RESULT | |
| --- | --- | --- |
| | KANA | KANA/KANJI |
| UIP00001 | BOTAN | |
| | KI | |
| UIP00002 | PURUDAUN | |
| | DOROPPUDAUN | |
| UIP00003 | AIKON | |
| UIP00004 | FOMU | |
| UIP00005 | BOKKUSU | |
| UIP00006 | GAMEN | 画面 (SCREEN) |
| | UINDO | |
| UIP00007 | POPPUAPPU | |
| | POPPUOBA | |
| | MODARU | |
| | DAIAROGU | |
| UIP00008 | MENYU | |
| UIP00009 | SURAIDA | |

FIG. 11C

| GROUP ID | VOICE RECOGNITION RESULT | |
| --- | --- | --- |
| | KANA | KANA/KANJI |
| IMG00000 | IMEGI | |
| | GAZO | 画像 (IMAGE) |
| IMG00001 | MOJI | 文字 (TEXT) |
| | JI | 字 (TEXT) |
| IMG00002 | SHASHIN | 写真 (PHOTO) |
| | FOTO | |
| IMG00003 | CHIZU | 地図 (MAP) |
| | MAPPU | |
| IMG00004 | NODO | 濃度 (DENSITY) |
| | KOSA | 濃さ (DENSITY) |
| IMG00005 | KOI | 濃い (DARK) |
| | KOKU | 濃く (DARK) |
| | KOYUKU | こゆく (DARK) |
| IMG00006 | USUI | 薄い (LIGHT) |
| | USUKU | 薄く (LIGHT) |

FIG. 11D

| GROUP ID | VOICE RECOGNITION RESULT | |
|---|---|---|
| | KANA | KANA/KANJI |
| DGR00000 | REBERU | |
| | SUIJUN | 水準(LEVEL) |
| | DOAI | 度合い(DEGREE) |
| DGR00001 | SAISHO | 最小(MINIMUM) |
| | MINIMAMU | |
| DGR00002 | SAIDAI | 最大(MAXIMUM) |
| | MAKKUSU | |
| DGR00003 | MAINASU | |
| | GENSHO | 減少(DECREASE) |
| | HERASU | 減らす(REDUCE) |
| | CHIISAKU | 小さく(SMALL) |
| | SYUKUSHO | 縮小(REDUCTION) |
| | SUKUNAKU | 少なく(SMALLER) |
| | MIJIKAKU | 短く(SHORT) |
| DGR00004 | PURASU | |
| | ZOKA | 増加(INCREASE) |
| | FUYASU | 増やす(INCREASE) |
| | OOKIKU | 大きく(LARGE) |
| | KAKUDAI | 拡大(EXPAND) |
| | OOKU | 多く(MUCH) |
| | NAGAKU | 長く(LONG) |
| DGR00005 | ONAJI | 同じ(SAME) |
| | ISSHO | いっしょ(SAME) |
| | KAWARANAI | 変わらない(NO DIFFERENCE) |
| | KINITSU | 均一(UNIFORM) |
| DGR00006 | CHIGAU | 違う(DIFFERENT) |
| | KOTONARU | 異なる(DIFFERENT) |
| DGR00007 | SONOMAMA | そのまま(DON'T CHANGE) |
| DGR00008 | JIDO | 自動(AUTO) |
| | OTO | |
| DGR00009 | SHUDO | 手動(MANUAL) |
| | MANUARU | |
| DGR00010 | FURI | |
| | JIYU | 自由(FREE) |
| | NIN-I | 任意(ARBITRARY) |
| DGR00011 | TSUYOI | 強い(STRONG) |
| | TSUYOKU | 強く(STRONGLY) |
| | KITSUKU | きつく(TIGHTLY) |
| DGR00012 | YOWAI | 弱い(WEAK) |
| | YOWAKU | 弱く(WEAKLY) |
| | YURUKU | ゆるく(LOOSELY) |
| DGR00013 | TAKAKU | 高く(GET HIGHER) |
| | TAKAME | 高目(SLIGHTLY HIGHER) |
| DGR00014 | HIKUKU | 低く(GET LOWER) |
| | HIKUME | 低目(SLIGHTLY LOWER) |
| DGR00015 | HIKUI | 低い(LOW) |
| | TEI | 低(LOW) |
| DGR00016 | CHU | 中(MIDDLE) |
| DGR00017 | TAKAI | 高い(HIGH) |
| | KOU | 高(HIGH) |
| DGR00018 | SUKOSHI | 少し(A LITTLE) |
| | CHOTTO | ちょっと(SLIGHTLY) |
| | BI | 微(SLIGHT) |
| | WAZUKA | 僅か(LITTLE) |
| DGR00019 | SHOSUU | 少数(A FEW) |
| DGR00020 | TASUU | 多数(MANY) |
| | TAKUSAN | たくさん(MANY) |

FIG. 11E

| GROUP ID | VOICE RECOGNITION RESULT | |
|---|---|---|
| | KANA | KANA/KANJI |
| FNC00000 | KINOU | 機能 (FUNCTION) |
| | FANKUSHON | |
| FNC00001 | KOPI | |
| | FUKUSYA | 複写 (COPY) |
| | FUKUSEI | 複製 (DUPLICATION) |
| FNC00002 | INSATSU | 印刷 (PRINT) |
| | PURINTO | |
| FNC00003 | SUKYAN | |
| | YOMITORI | 読み取り (READ) |
| | YOMIKOMI | 読み込み (READ) |
| FNC00004 | HOZON | 保存 (SAVE) |
| | HOKAN | 保管 (KEEP) |
| | KAKUNOU | 格納 (STORAGE) |
| | NOKOSU | 残す (LEAVE) |
| | HORUDO | |
| | KIROKU | 記録 (RECORD) |
| | KAKIKOMI | 書き込み (WRITE) |
| FNC00005 | SOUSHIN | 送信 (TRANSMISSION) |
| | SENDO | |
| FNC00006 | JUSHIN | 受信 (RECEPTION) |
| | RESHIBU | |
| FNC00007 | SUPURU | |
| | TAMATTE | 溜まって (ACCUMULATED) |
| FNC00008 | SHOUKAI | 紹介 (INTRODUCTION) |
| | HERUPU | |
| | GAIDO | |
| | INTORO | |

⋮

| FNC00016 | RENRAKU | 連絡 (CONTACT) |
|---|---|---|
| | DENTATSU | 伝達 (TRANSMISSION) |
| FNC00021 | WARIKOMI | 割り込み (INTERRUPT) |
| FNC00022 | YUUSEN | 優先 (PRIORITY) |

FIG. 11F

| GROUP ID | VOICE RECOGNITION RESULT | |
|---|---|---|
| | KANA | KANA/KANJI |
| POS00000 | ICHI | 位置 (POSITION) |
| | POJISHON | |
| POS00001 | BASHO | 場所 (LOCATION) |
| | RYOUIKI | 領域 (AREA) |
| | ERIA | |
| | BUROKKU | |
| POS00010 | UE | 上 (UPPER) |
| | REIDO | 0° |
| | ZERODO | 0° |
| POS00011 | MIGIUE | 右上 (UPPER RIGHT) |
| | YONJUGODO | 45° |
| POS00012 | MIGI | 右 (RIGHT) |
| | KYUJYUDO | 90° |
| POS00013 | MIGISHITA | 右下 (BOTTOM RIGHT) |
| | HYAKUSANJYUGODO | 135° |
| POS00014 | SHITA | 下 (BOTTOM) |
| | HYAKUHACHIJUDO | 180° |
| POS00015 | HIDARISHITA | 左下 (BOTTOM LEFT) |
| | NIHYAKUNIJYUGODO | 225° |
| POS00016 | HIDARI | 左 (LEFT) |
| | NIHYAKUNANAJUDO | 270° |
| POS00017 | HIDARIUE | 左上 (UPPER LEFT) |
| | SANBYAKUJYUGODO | 315° |
| POS00018 | CHUUOU | 中央 (CENTER) |
| | SENTA | Center |
| | MANNAKA | 真ん中 (CENTER) |
| | CHUUSHIN | 中心 (CENTER) |
| POS00020 | JOBU | 上部 (UPPER PART) |
| | TEN | 天 (HEAD) |
| | JOHEN | 上辺 (UPPER SIDE) |
| POS00021 | KABU | 下部 (BOTTOM PART) |
| | CHI | 地 (GROUND) |
| | KAHEN | 下辺 (LOWER SIDE) |
| | TEIHEN | 底辺 (BASE) |
| POS00022 | JOGE | 上下 (UP AND DOWN) |
| | UESHITA | 上下 (UP AND DOWN) |
| POS00023 | SAYU | 左右 (LEFT AND RIGHT) |
| | HIDARIMIGI | 左右 (LEFT AND RIGHT) |
| | MIGIHIDARI | 右左 (RIGHT AND LEFT) |

FIG. 11G

| GROUP ID | VOICE RECOGNITION RESULT | |
| --- | --- | --- |
| | KANA | KANA/KANJI |
| FIN00000 | SHIAGE | 仕上げ (FINISHING) |
| | ATOSHORI | 後処理 (POST PROCESSING) |
| FIN00001 | SOTO | |
| | KORETO | |
| | ICHIBUGOTO | 1部ごと (FOR EACH COPY) |
| | BUTAN-I | 部単位 (IN UNITS OF COPIES) |
| FIN00002 | GURUPU | |
| FIN00003 | PEIJIGOTO | ページごと (FOR EACH PAGE) |
| | PEIJITAN-I | ページ単位 (IN UNITS OF PAGES) |
| FIN00004 | KAITEN | 回転 (ROTATION) |
| | MAWASU | 回す (ROTATE) |
| | MAWASHITE | 回して (ROTATE AND) |
| | ROTESHON | |
| | ROTETO | |
| FIN00010 | HOCHIKISU | |
| | HOCCHIKISU | |
| | STEIPURU | |
| | HARI | 針 (STAPLE) |
| | TOJI | 綴じ (STITCH) |
| FIN00011 | SHIFUTO | |
| | ZURASHI | ずらし (SHIFT) |
| | IDOU | 移動 (MOVE) |
| FIN00012 | PANCHI | |
| | ANA | 穴 (HOLE) |
| FIN00013 | SADORU | |
| FIN00014 | ORI | 折り (FOLD) |
| | FORUDO | |
| | TATAMU | 畳む (FOLD) |

FIG. 11H

| GROUP ID | VOICE RECOGNITION RESULT | |
| --- | --- | --- |
| | KANA | KANA/KANJI |
| FRA00102 | NIBUN-NO-ICHI | 1/2、二分の一 (ONE HALF) |
| FRA00202 | NIBUN-NO-NI | 2/2、二分の二 (TWO HALVES) |
| FRA00103 | SANBUN-NO-ICHI | 1/3、三分の一 (ONE THIRD) |
| FRA00203 | SANBUN-NO-NI | 2/3、三分の二 (TWO THIRDS) |
| FRA00303 | SANBU-NO-SAN | 3/3、三分の三 (THREE THIRDS) |
| FRA00104 | YONBUN-NO-ICHI | 1/4、四分の一 (ONE FOURTH) |
| FRA00204 | YONBUN-NO-NI | 2/4、四分の二 (TWO FOURTHS) |
| FRA00304 | YONBUN-NO-SAN | 3/4、四分の三 (THREE FOURTHS) |
| FRA00404 | YONBUN-NO-YON | 4/4、四分の四 (FOUR FOURTHS) |
| FRA00105 | GOBUN-NO-ICHI | 1/5、五分の一 (ONE FIFTH) |
| FRA00205 | GOBUN-NO-NI | 2/5、五分の二 (TWO FIFTHS) |
| FRA00305 | GOBUN-NO-SAN | 3/5、五分の三 (THREE FIFTHS) |
| | ⋮ | |
| FRA09999 | KYUJUUKYUBUN-NO-KYU | 99/99、九十九分の九十九 (NINETY-NINE NINETY-NINTHS) |

FIG. 12B

| No. | USER OPERABLE UI COMPONENT | | SCREEN CONTROL TO BE PERFORMED | INTERNAL PROCESSING TO BE PERFORMED |
|---|---|---|---|---|
| | TYPE | LABEL | | |
| 1101 | BUTTON | Auto (Color/Black) | HIGHLIGHT THE BUTTON | |
| 1102 | BUTTON | Full Color | HIGHLIGHT THE BUTTON | |
| 1103 | BUTTON | Black | HIGHLIGHT THE BUTTON | |
| 1104 | BUTTON | Single Color | TRANSITION TO ADVANCED SETTINGS SCREEN FOR SINGLE COLOR | |
| 1105 | BUTTON | Two Colors | TRANSITION TO ADVANCED SETTINGS SCREEN FOR TWO COLORS | |
| 1111 | BUTTON | Cancel | TRANSITION TO COPY TOP SCREEN | |
| 1112 | BUTTON | OK | TRANSITION TO COPY TOP SCREEN | |
| 1113 | BUTTON | | TRANSITION TO HELP SCREEN | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 12C

| No. | GROUP ID | EXAMPLE OF PHRASE UTTERED BY USER IN OPERATION | OPERATION ON OPERATION PANEL |
|---|---|---|---|
| 1101 | DGR00008/ DGR00008+COL0000+COL00102 | ・自動 (AUTO)<br>・自動カラー白黒 (AUTO, COLOR, BLACK AND WHITE) | PRESS BUTTON<br>(TOUCH THE BUTTON COORDINATE AREA) |
| 1102 | COL00201 | ・フルカラー (FULL COLOR) | PRESS BUTTON<br>(TOUCH THE BUTTON COORDINATE AREA) |
| 1103 | COL00102 | ・白黒 (BLACK AND WHITE) | PRESS BUTTON<br>(TOUCH THE BUTTON COORDINATE AREA) |
| 1104 | COL00110+COL00000 | ・単色カラー (SINGLE COLOR) | PRESS BUTTON<br>(TOUCH THE BUTTON COORDINATE AREA) |
| 1105 | COL00111+COL00000 | ・2色カラー (TWO COLORS) | PRESS BUTTON<br>(TOUCH THE BUTTON COORDINATE AREA) |
| 1111 | OPR00013 | ・キャンセル (CANCEL) | PRESS BUTTON<br>(TOUCH THE BUTTON COORDINATE AREA) |
| 1112 | OPR00010 | ・OK (OK) | PRESS BUTTON<br>(TOUCH THE BUTTON COORDINATE AREA) |
| 1113 | FNC00008 | ・ヘルプ (HELP) | PRESS BUTTON<br>(TOUCH THE BUTTON COORDINATE AREA) |
| 203 | OPR00045 | ・リセット (RESET) | PRESS HARDWARE KEY |
| 207 | OPR00011 | ・スタート (START) | PRESS HARDWARE KEY |

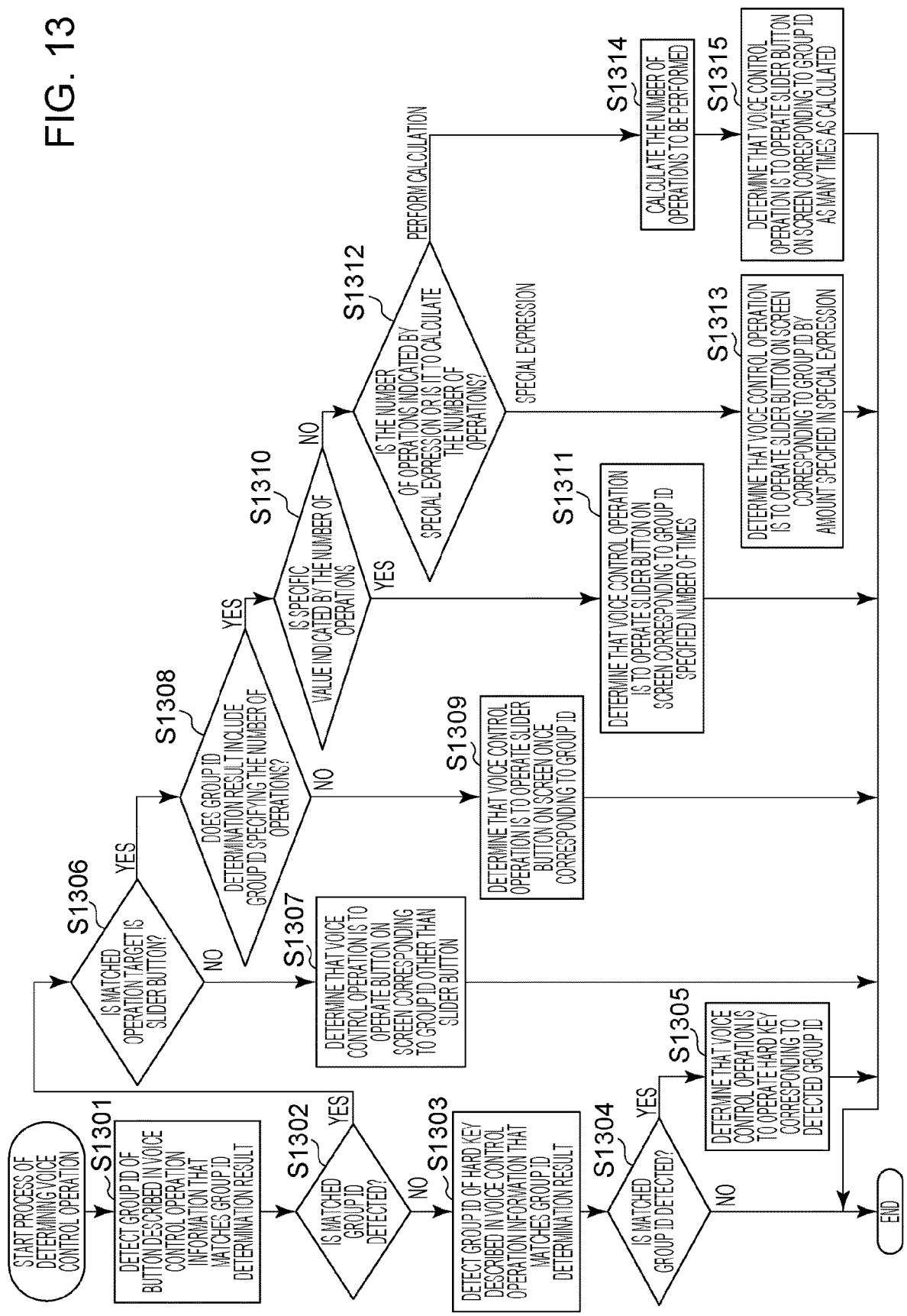

FIG. 14A

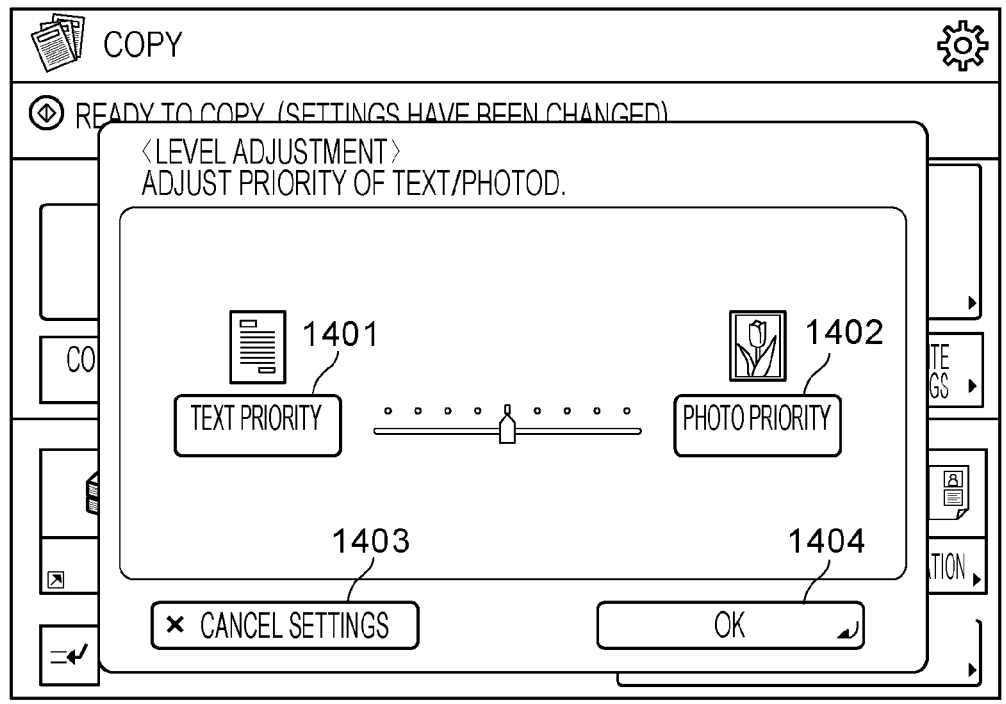

FIG. 14B

| OPERABLE UI COMPONENT | | | SCREEN CONTROL TO BE PERFORMED | INTERNAL PROCESS TO BE PERFORMED |
|---|---|---|---|---|
| No. | TYPE | LABEL | | |
| 1401 | SLIDER BUTTON | TEXT PRIORITY | MOVE SLIDER TO LEFT BY ONE SCALE DIVISION | |
| 1402 | SLIDER BUTTON | PHOTO PRIORITY | MOVE SLIDER TO RIGHT BY ONE SCALE DIVISION | |
| 1403 | BUTTON | CANCEL SETTINGS | TRANSITION TO COPY TOP SCREEN | |
| 1404 | BUTTON | OK | TRANSITION TO COPY TOP SCREEN | |
| 203 | HARD KEY | | TRANSITION TO COPY TOP SCREEN | RESET JOB PARAMETERS TO DEFAULT VALUES |
| 207 | HARD KEY | | TRANSITION TO COPY JOB EXECUTION START SCREEN | START COPY JOB EXECUTION |

FIG. 14C

| | No. | GROUP ID INFORMATION OF DISPLAY SCREEN | EXAMPLE OF PHRASE UTTERED BY USER | OPERATION PERFORMED ON OPERATION PANEL |
|---|---|---|---|---|
| 1405 | 1401 | · IMG00001 + FNC00022 + OPR00040<br>· POS00016 + FIN00011<br>· UIP00009 + POS00016<br>· UIP00009 + POS00016 + FIN00011 | · SELECT TEXT PRIORITY<br>· MOVE TO LEFT<br>· (MOVE) SLIDER TO LEFT | PRESS BUTTON<br>(TOUCH COORDINATE AREA ASSIGNED TO THE BUTTON) |
| 1406 | 1401 | · IMG00001 + FNC00022 + NUM0000# + OPR00040<br>· NUM0000# + POS00016 + FIN00011<br>· UIP00009 + NUM0000# + POS00016<br>· UIP00009 + NUM0000# + POS00016 + FIN00011 | · SELECT TEXT PRIORITY # TIMES<br>· (MOVE) TO LEFT BY #<br>· (MOVE) SLIDER TO LEFT BY # | PRESS BUTTON # TIMES<br>(TOUCH COORDINATE AREA ASSIGNED TO THE BUTTON # TIMES) |
| 1407 | 1401 | · DGR00018 + POS00016<br>· DGR00018 + POS00016 + FIN00011 | · (MOVE) SLIGHTLY TO LEFT | PRESS BUTTON TWICE<br>(TOUCH TWICE COORDINATE AREA ASSIGNED TO THE BUTTON) |
| 1408 | 1401 | · FRA0$^?% + POS00016<br>· FRA0$^?% + POS00016 + FIN00011 | · (MOVE) TO LEFT BY ABOUT $^/?% | PRESS BUTTON # TIMES<br>(TOUCH COORDINATE AREA ASSIGNED TO THE BUTTON) |
| 1409 | 1402 | · IMG00002 + FNC00022 + OPR00040<br>· POS00012 + FIN00011<br>· UIP00009 + POS00012<br>· UIP00009 + POS00012 + FIN00011 | · SELECT PHOTO PRIORITY BUTTON<br>· MOVE TO RIGHT<br>· (MOVE) SLIDER TO RIGHT | PRESS BUTTON<br>(TOUCH COORDINATE AREA ASSIGNED TO THE BUTTON) |

FROM FIG. 14C

| ID | | | |
|---|---|---|---|
| 1410 | · IMG00002 + FNC00022 + NUM0000# + OPR00040<br>· NUM0000# + POS00012 + FIN00011<br>· UIP00009 + NUM0000# + POS00012<br>· UIP00009 + NUM0000# + POS00012 + FIN00011 | · SELECT PHOTO PRIORITY BUTTON # TIMES<br>· MOVE TO RIGHT BY #<br>· (MOVE) SLIDER TO RIGHT BY # | PRESS BUTTON # TIMES<br>(TOUCH COORDINATE AREA ASSIGNED TO THE BUTTON # TIMES) |
| 1411 | · DGR00018 + POS00012<br>· DGR00018 + POS00012 + FIN00011 | · MOVE SLIGHTLY TO RIGHT | PRESS BUTTON TWICE<br>(TOUCH COORDINATE AREA ASSIGNED TO THE BUTTON TWICE) |
| 1412 | · FRA0$^?% + POS00012<br>· FRA0$^?% + POS00012 + FIN00011 | · (MOVE) TO RIGHT BY ABOUT $^/?% | PRESS BUTTON # TIMES<br>(TOUCH COORDINATE AREA ASSIGNED TO THE BUTTON) |
| 1413 | · OPR00044<br>· OPR00040 + OPR00044 | · CANCEL SETTINGS | PRESS BUTTON<br>(TOUCH COORDINATE AREA ASSIGNED TO THE BUTTON) |
| 1414 | · OPR00010 | · OK | PRESS BUTTON<br>(TOUCH COORDINATE AREA ASSIGNED TO THE BUTTON) |
| 203 1415 | · OPR00045 | · RESET | PRESS HARD KEY |
| 207 1416 | · OPR00011 | · START | PRESS HARD KEY |

*# IS A NUMERAL IN THE RANGE FROM 1 TO 8.
*$^?% IS AN ARBITRARY POSITIVE VALUE IN THE RANGE OF $^ ≤ ?%.

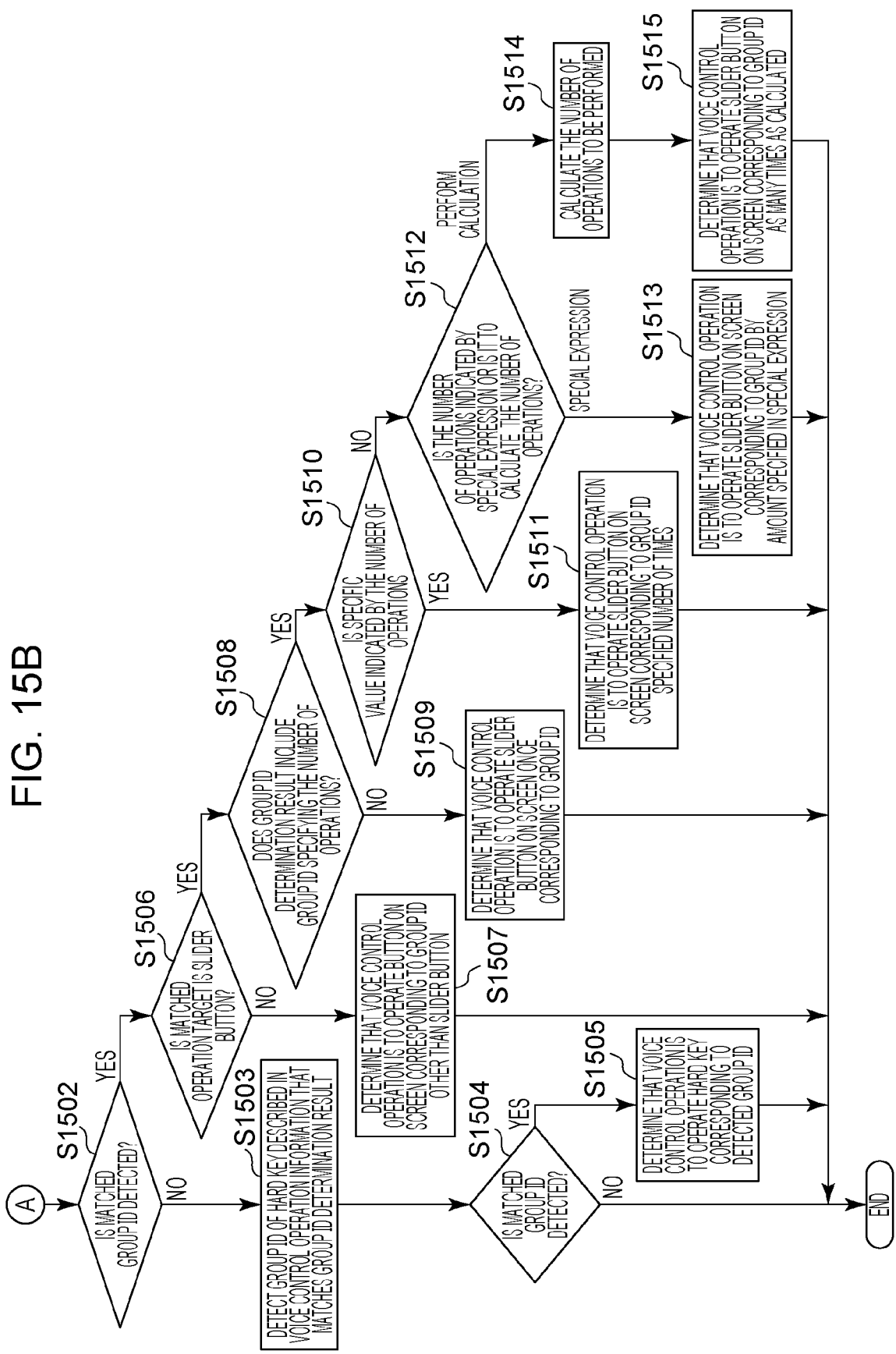

FIG. 16B

| No. | OPERABLE UI COMPONENT | | SCREEN CONTROL TO BE PERFORMED | INTERNAL PROCESS TO BE PERFORMED |
|---|---|---|---|---|
| | TYPE | LABEL | | |
| 1601 | SLIDER BUTTON | LOWER | MOVE ALL SLIDERS TO LEFT BY ONE SCALE DIVISION | |
| 1602 | SLIDER BUTTON | HIGHER | MOVE ALL SLIDERS TO RIGHT BY ONE SCALE DIVISION | |
| 1603 | SLIDER BUTTON | LOWER | MOVE CORRESPONDING SLIDER TO LEFT BY ONE SCALE DIVISION | |
| 1604 | SLIDER BUTTON | HIGHER | MOVE CORRESPONDING SLIDER TO RIGHT BY ONE SCALE DIVISION | |
| 1605 | SLIDER BUTTON | LOWER | MOVE CORRESPONDING SLIDER TO LEFT BY ONE SCALE DIVISION | |
| 1606 | SLIDER BUTTON | HIGHER | MOVE CORRESPONDING SLIDER TO RIGHT BY ONE SCALE DIVISION | |
| 1607 | SLIDER BUTTON | LOWER | MOVE CORRESPONDING SLIDER TO LEFT BY ONE SCALE DIVISION | |
| 1608 | SLIDER BUTTON | HIGHER | MOVE CORRESPONDING SLIDER TO RIGHT BY ONE SCALE DIVISION | |
| 1609 | SLIDER BUTTON | LOWER | MOVE CORRESPONDING SLIDER TO LEFT BY ONE SCALE DIVISION | |
| 1610 | SLIDER BUTTON | HIGHER | MOVE CORRESPONDING SLIDER TO RIGHT BY ONE SCALE DIVISION | |
| 1611 | SLIDER BUTTON | LOWER | MOVE CORRESPONDING SLIDER TO LEFT BY ONE SCALE DIVISION | |
| 1612 | SLIDER BUTTON | HIGHER | MOVE CORRESPONDING SLIDER TO RIGHT BY ONE SCALE DIVISION | |
| 1613 | SLIDER BUTTON | LOWER | MOVE CORRESPONDING SLIDER TO LEFT BY ONE SCALE DIVISION | |
| 1614 | SLIDER BUTTON | HIGHER | MOVE CORRESPONDING SLIDER TO RIGHT BY ONE SCALE DIVISION | |
| 1615 | BUTTON | CANCEL SETTINGS | TRANSITION TO COPY TOP SCREEN | |
| 1616 | BUTTON | OK | TRANSITION TO COPY TOP SCREEN | |
| 203 | HARD KEY | | | RESET JOB PARAMETERS TO DEFAULT VALUES |
| 207 | HARD KEY | | TRANSITION TO COPY JOB EXECUTION START SCREEN | START COPY JOB EXECUTION |

FIG. 16C

| No. | GROUP ID INFORMATION OF DISPLAY SCREEN | EXAMPLE OF PHRASE UTTERED BY USER | OPERATION PERFORMED ON OPERATION PANEL |
|---|---|---|---|
| 1601 | · COL00201 + NUM0000# + DRG00014<br>· COL00201 + NUM0000# + DRG00014 + OPR00040<br>· COL00201 + NUM0000# + POS00016<br>· COL00201 + NUM0000# + POS00016 + FIN00011 | · (SELECT BUTTON TO)<br>MAKE ALL COLORS LOWER BY #<br>· (MOVE)<br>TO LEFT BY # FOR ALL COLORS | PRESS BUTTON # TIMES<br>(TOUCH COORDINATE AREA ASSIGNED TO THE BUTTON # TIMES) |
| 1602 | · COL00201 + NUM0000# + DRG00013<br>· COL00201 + NUM0000# + DRG00013 + OPR00040<br>· COL00201 + NUM0000# + POS00012<br>· COL00201 + NUM0000# + POS00012 + FIN00011 | · (SELECT BUTTON TO)<br>MAKE ALL COLORS HIGHER BY #<br>· (MOVE)<br>TO RIGHT BY # FOR ALL COLORS | PRESS BUTTON # TIMES<br>(TOUCH COORDINATE AREA ASSIGNED TO THE BUTTON # TIMES) |
| 1603 | · COL00004 + NUM0000# + DRG00014<br>· COL00004 + NUM0000# + DRG00014 + OPR00040<br>· COL00004 + NUM0000# + POS00016<br>· COL00004 + NUM0000# + POS00016 + FIN00011 | · (SELECT BUTTON TO)<br>MAKE YELLOW LOWER BY #<br>· (MOVE)<br>TO LEFT YELLOW BY # | PRESS BUTTON # TIMES<br>(TOUCH COORDINATE AREA ASSIGNED TO THE BUTTON # TIMES) |
| 1604 | · COL00004 + NUM0000# + DRG00013<br>· COL00004 + NUM0000# + DRG00013 + OPR00040<br>· COL00004 + NUM0000# + POS00012<br>· COL00004 + NUM0000# + POS00012 + FIN00011 | · (SELECT BUTTON TO)<br>MAKE YELLOW HIGHER BY #<br>· (MOVE)<br>TO RIGHT YELLOW BY # | PRESS BUTTON # TIMES<br>(TOUCH COORDINATE AREA ASSIGNED TO THE BUTTON # TIMES) |
| 1605 | · COL00002 + NUM0000# + DRG00014<br>· COL00002 + NUM0000# + DRG00014 + OPR00040<br>· COL00002 + NUM0000# + POS00016<br>· COL00002 + NUM0000# + POS00016 + FIN00011 | · (SELECT BUTTON TO)<br>MAKE GREEN LOWER BY #<br>· (MOVE)<br>TO LEFT GREEN BY # | PRESS BUTTON # TIMES<br>(TOUCH COORDINATE AREA ASSIGNED TO THE BUTTON # TIMES) |
| 1606 | · COL00002 + NUM0000# + DRG00013<br>· COL00002 + NUM0000# + DRG00013 + OPR00040<br>· COL00002 + NUM0000# + POS00012<br>· COL00002 + NUM0000# + POS00012 + FIN00011 | · (SELECT BUTTON TO)<br>MAKE GREEN HIGHER BY #<br>· (MOVE)<br>TO RIGHT GREEN BY # | PRESS BUTTON # TIMES<br>(TOUCH COORDINATE AREA ASSIGNED TO THE BUTTON # TIMES) |
| 1607 | · COL00006 + NUM0000# + DRG00014<br>· COL00006 + NUM0000# + DRG00014 + OPR00040<br>· COL00006 + NUM0000# + POS00016<br>· COL00006 + NUM0000# + POS00016 + FIN00011 | · (SELECT BUTTON TO)<br>MAKE CYAN LOWER BY #<br>· (MOVE)<br>TO LEFT CYAN BY # | PRESS BUTTON # TIMES<br>(TOUCH COORDINATE AREA ASSIGNED TO THE BUTTON # TIMES) |
| 1608 | · COL00006 + NUM0000# + DRG00013<br>· COL00006 + NUM0000# + DRG00013 + OPR00040<br>· COL00006 + NUM0000# + POS00012<br>· COL00006 + NUM0000# + POS00012 + FIN00011 | · (SELECT BUTTON TO)<br>MAKE CYAN HIGHER BY #<br>· (MOVE)<br>TO RIGHT CYAN BY # | PRESS BUTTON # TIMES<br>(TOUCH COORDINATE AREA ASSIGNED TO THE BUTTON # TIMES) |

FROM FIG. 16C

| | | | | |
|---|---|---|---|---|
| 1625 | 1609 | · COL00003 + NUM0000# + DRG00014<br>· COL00003 + NUM0000# + DRG00014 + OPR00040<br>· COL00003 + NUM0000# + POS00016<br>· COL00003 + NUM0000# + POS00016 + FIN00011 | · (SELECT BUTTON TO)<br>MAKE BLUE LOWER BY #<br>· (MOVE)<br>TO LEFT BLUE BY # | PRESS BUTTON # TIMES<br>(TOUCH COORDINATE AREA ASSIGNED TO THE BUTTON # TIMES) |
| 1626 | 1610 | · COL00003 + NUM0000# + DRG00013<br>· COL00003 + NUM0000# + DRG00013 + OPR00040<br>· COL00003 + NUM0000# + POS00012<br>· COL00003 + NUM0000# + POS00012 + FIN00011 | · (SELECT BUTTON TO)<br>MAKE BLUE HIGHER BY #<br>· (MOVE)<br>TO RIGHT BLUE BY # | PRESS BUTTON # TIMES<br>(TOUCH COORDINATE AREA ASSIGNED TO THE BUTTON # TIMES) |
| 1627 | 1611 | · COL00005 + NUM0000# + DRG00014<br>· COL00005 + NUM0000# + DRG00014 + OPR00040<br>· COL00005 + NUM0000# + POS00016<br>· COL00005 + NUM0000# + POS00016 + FIN00011 | · (SELECT BUTTON TO)<br>MAKE MAGENTA LOWER BY #<br>· (MOVE)<br>TO LEFT MAGENTA BY # | PRESS BUTTON # TIMES<br>(TOUCH COORDINATE AREA ASSIGNED TO THE BUTTON # TIMES) |
| 1628 | 1612 | · COL00005 + NUM0000# + DRG00013<br>· COL00005 + NUM0000# + DRG00013 + OPR00040<br>· COL00005 + NUM0000# + POS00012<br>· COL00005 + NUM0000# + POS00012 + FIN00011 | · (SELECT BUTTON TO)<br>MAKE MAGENTA HIGHER BY #<br>· (MOVE)<br>TO RIGHT MAGENTA BY # | PRESS BUTTON # TIMES<br>(TOUCH COORDINATE AREA ASSIGNED TO THE BUTTON # TIMES) |
| 1629 | 1613 | · COL00001 + NUM0000# + DRG00014<br>· COL00001 + NUM0000# + DRG00014 + OPR00040<br>· COL00001 + NUM0000# + POS00016<br>· COL00001 + NUM0000# + POS00016 + FIN00011 | · (SELECT BUTTON TO)<br>MAKE RED LOWER BY #<br>· (MOVE)<br>TO LEFT RED BY # | PRESS BUTTON # TIMES<br>(TOUCH COORDINATE AREA ASSIGNED TO THE BUTTON # TIMES) |
| 1630 | 1614 | · COL00001 + NUM0000# + DRG00013<br>· COL00001 + NUM0000# + DRG00013 + OPR00040<br>· COL00001 + NUM0000# + POS00012<br>· COL00001 + NUM0000# + POS00012 + FIN00011 | · (SELECT BUTTON TO)<br>MAKE RED HIGHER BY #<br>· (MOVE)<br>TO RIGHT RED BY # | PRESS BUTTON # TIMES<br>(TOUCH COORDINATE AREA ASSIGNED TO THE BUTTON # TIMES) |
| 1631 | 1615 | · OPR00044<br>· OPR00040 + OPR00044 | · CANCEL SETTINGS | PRESS BUTTON # TIMES<br>(TOUCH COORDINATE AREA ASSIGNED TO THE BUTTON # TIMES) |
| 1632 | 1616 | · OPR00010 | · OK | PRESS BUTTON # TIMES<br>(TOUCH COORDINATE AREA ASSIGNED TO THE BUTTON # TIMES) |
| 1633 | 203 | · OPR00045 | · RESET | PRESS HARD KEY |
| 1634 | 207 | · OPR00011 | · START | PRESS HARD KEY |

*# IS A NUMERAL IN THE RANGE FROM 1 TO 6.

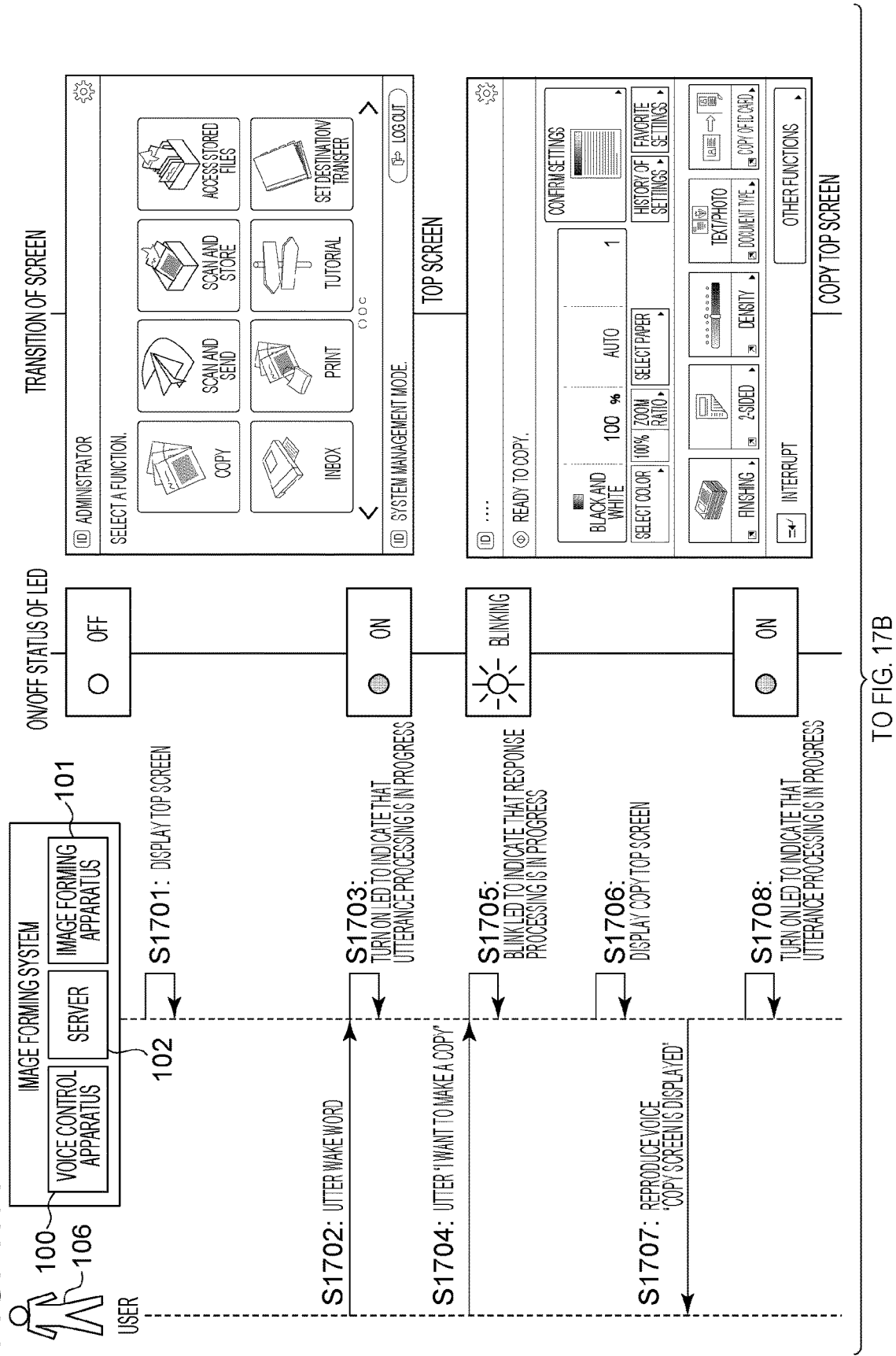

FIG. 17B
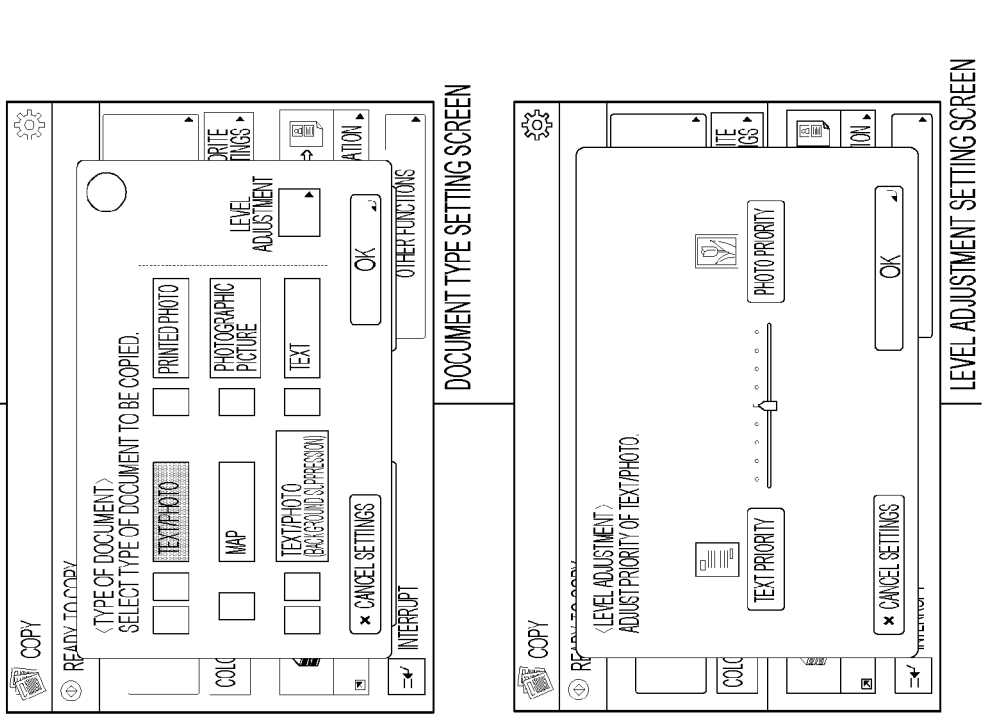
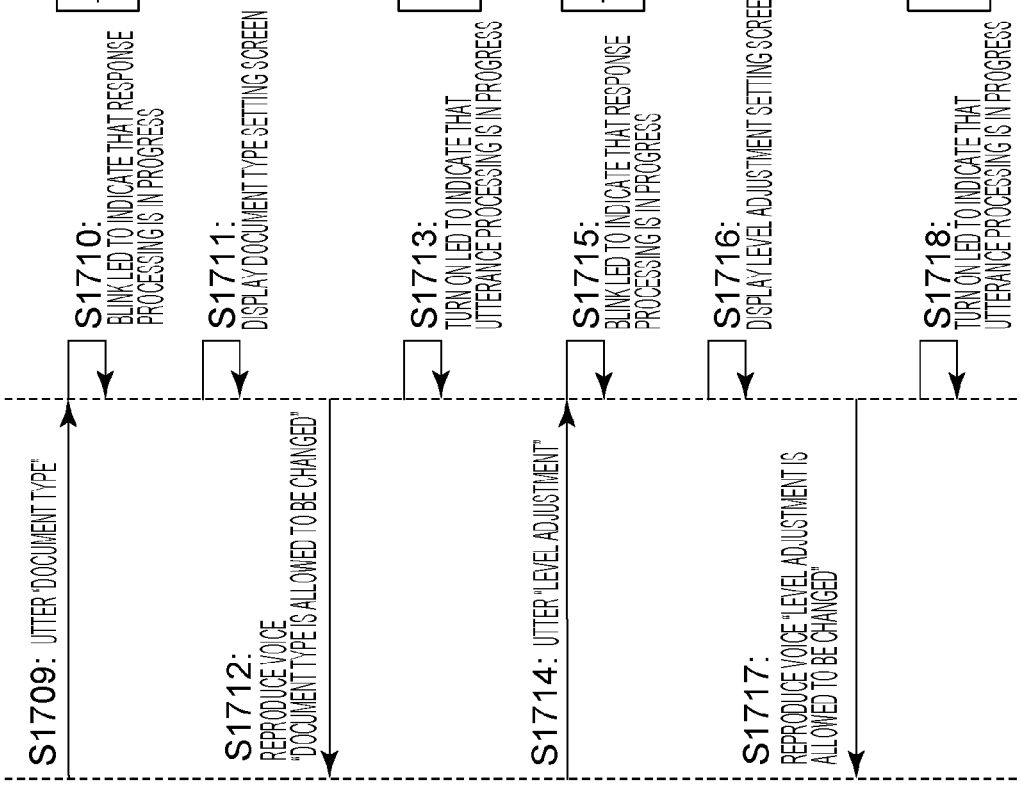

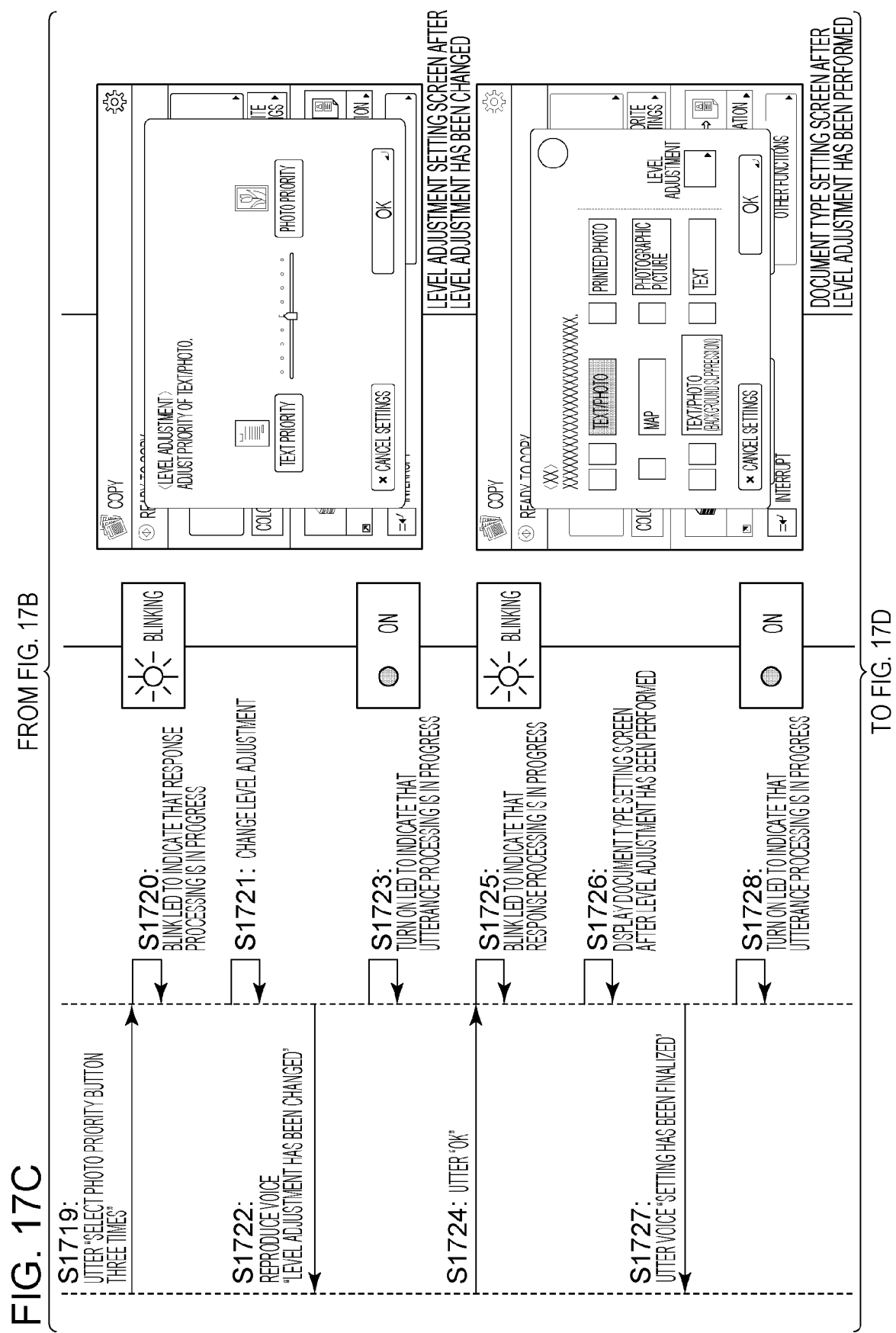

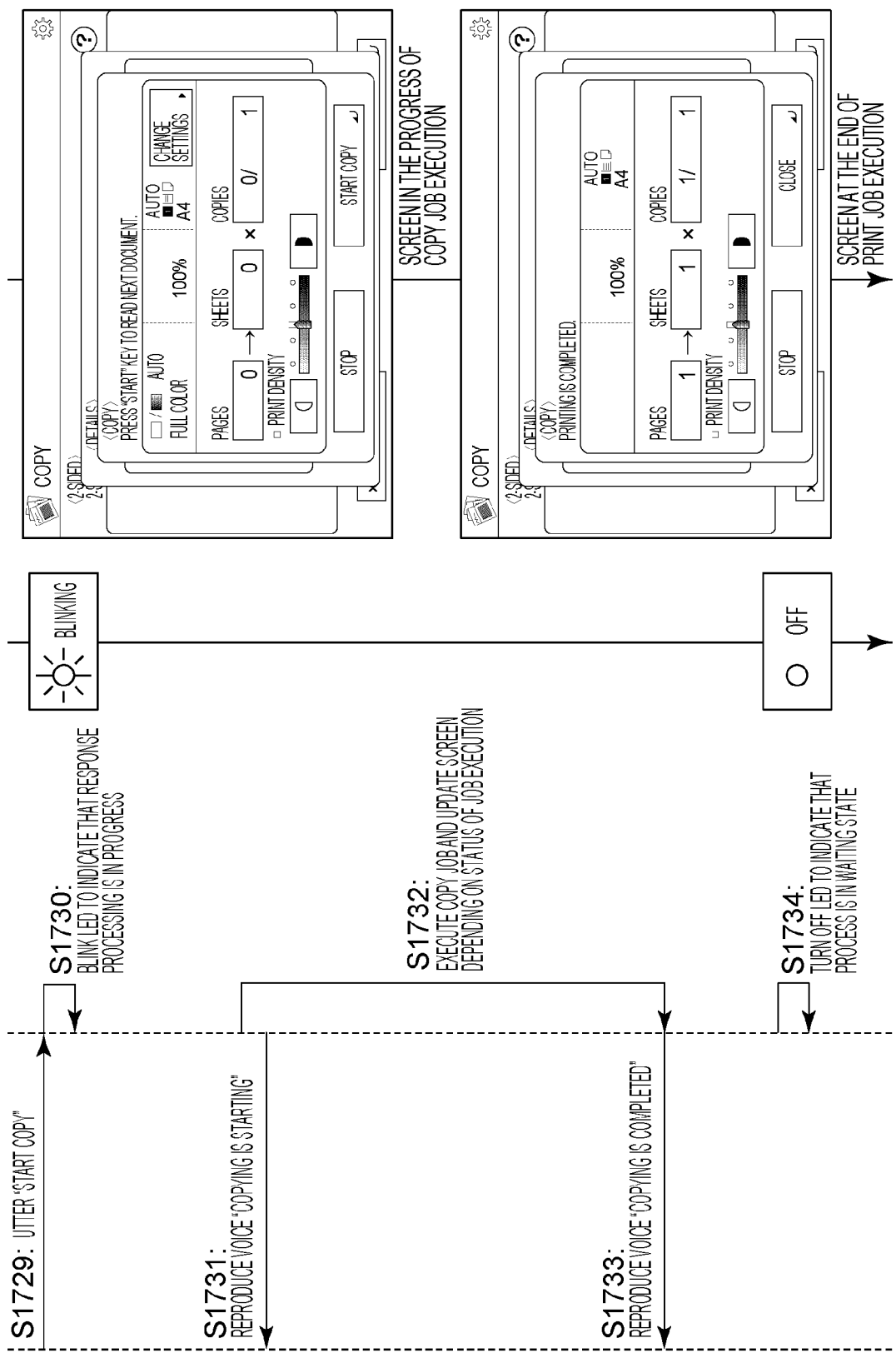

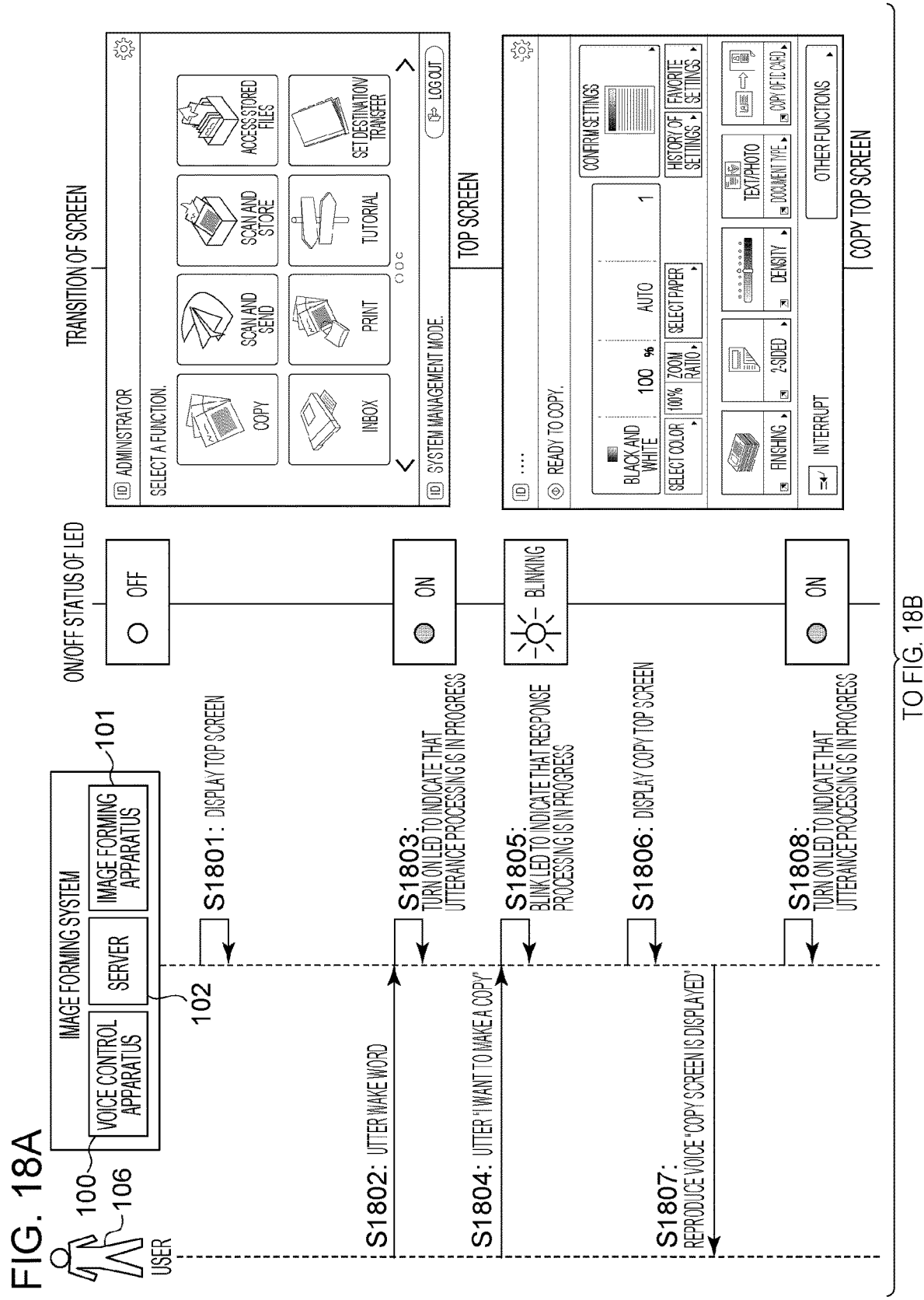

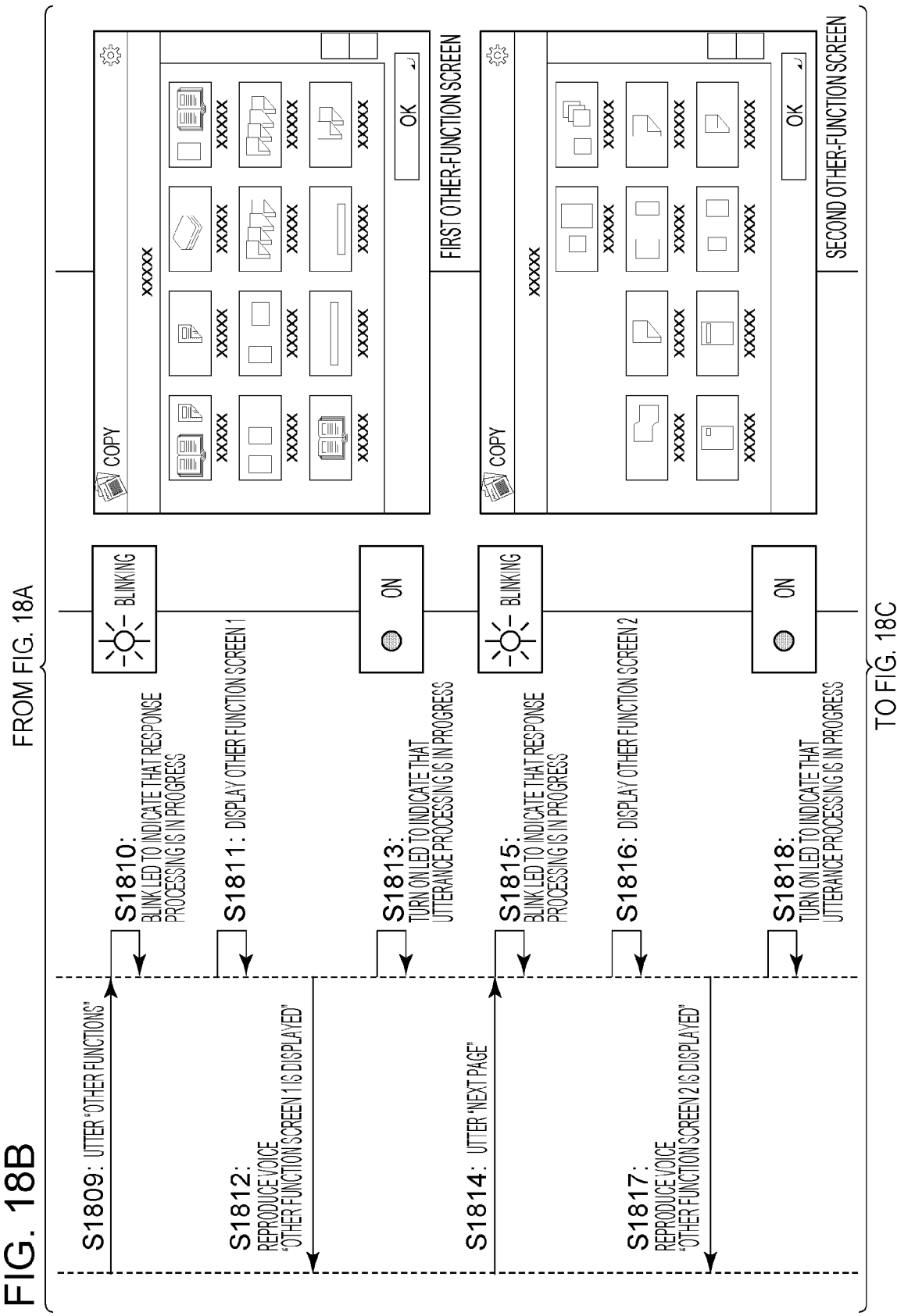

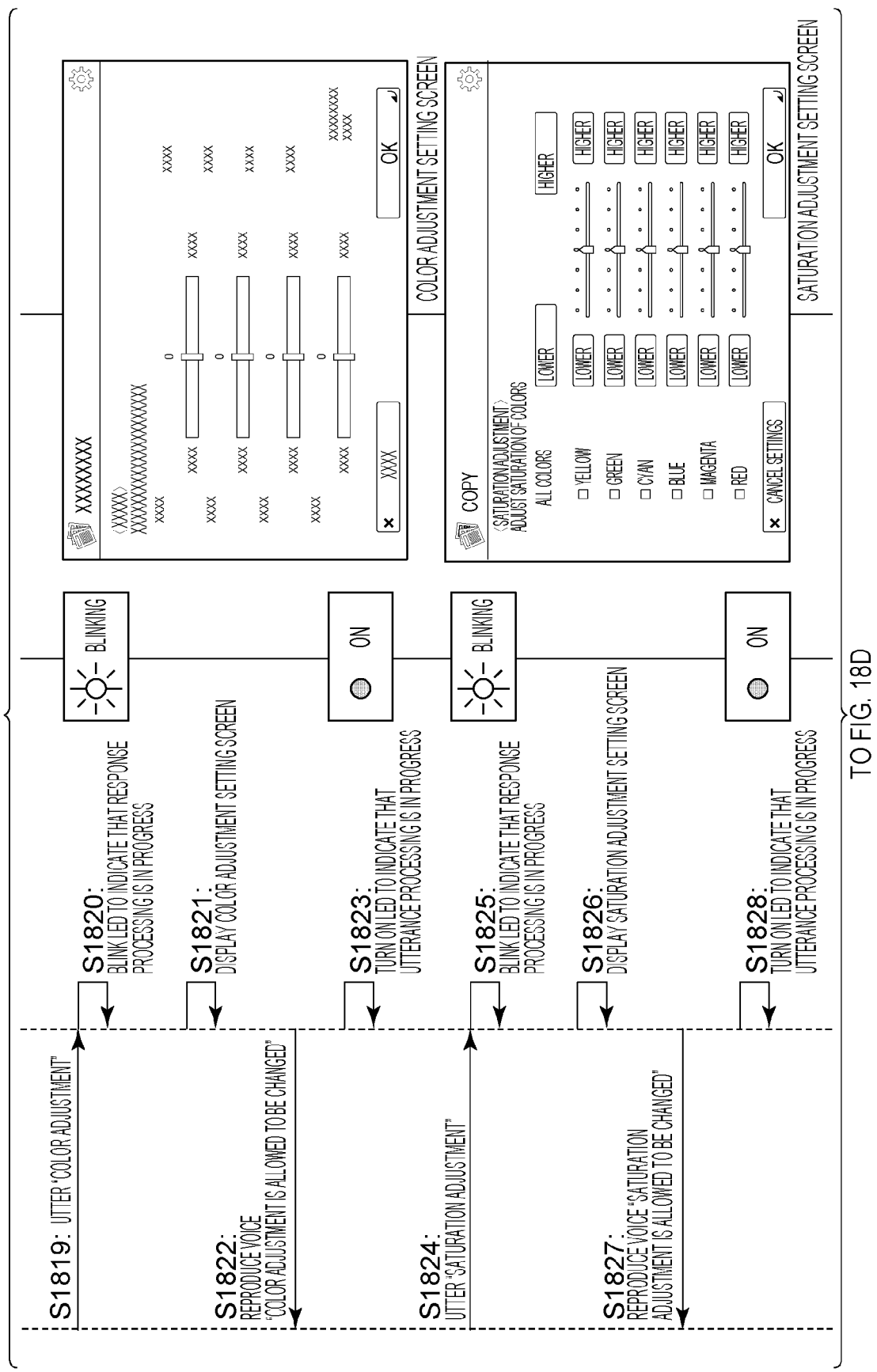

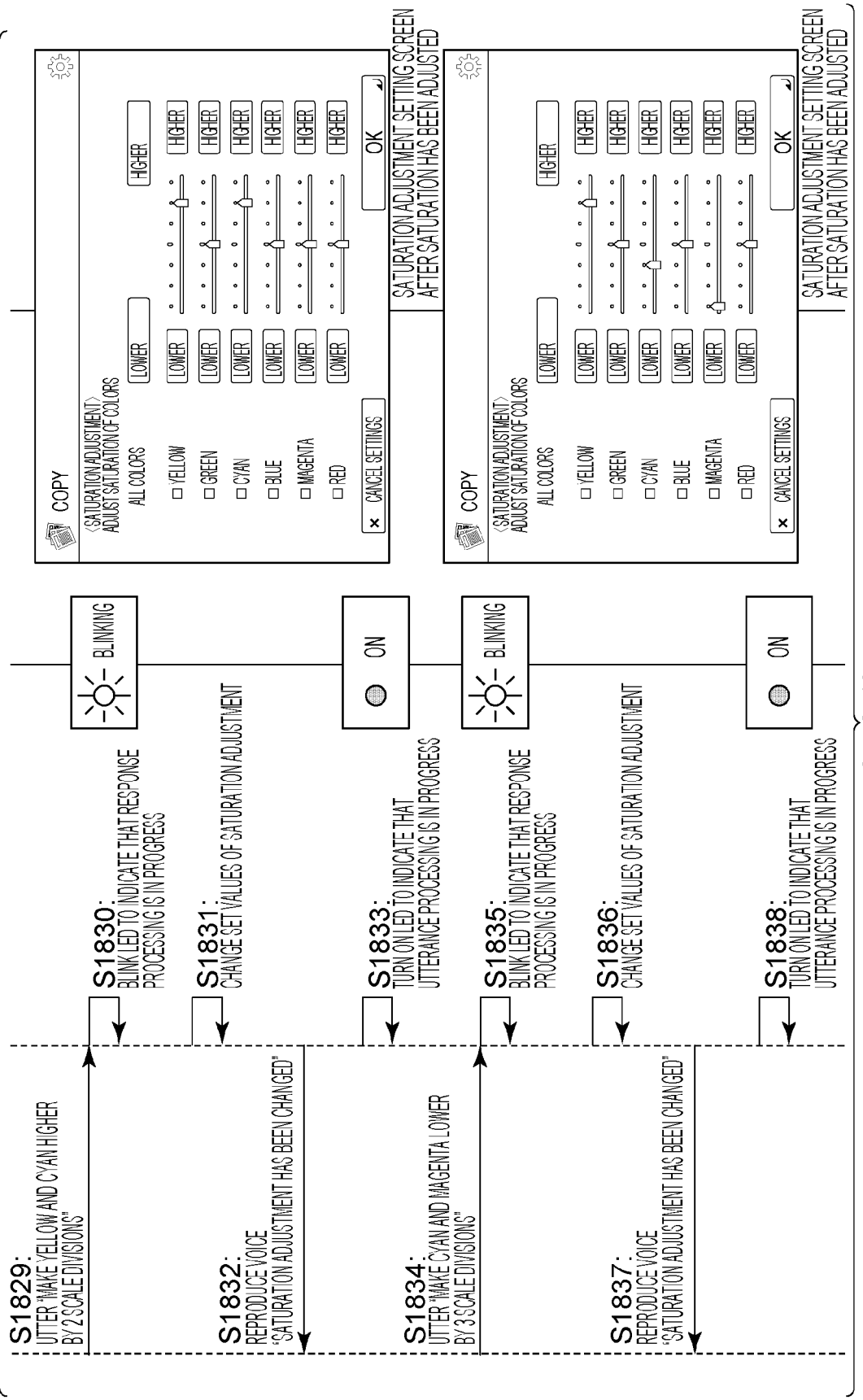

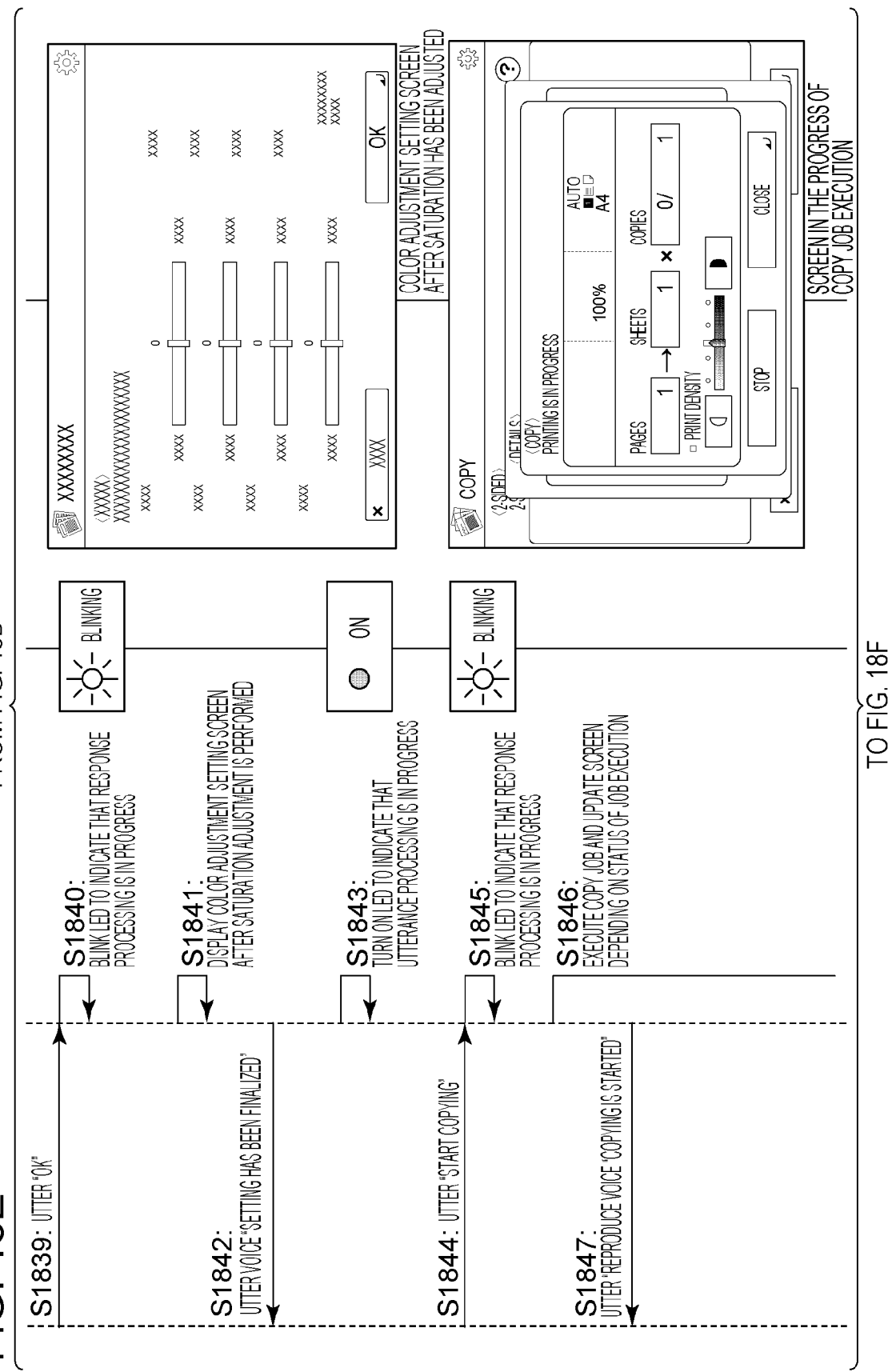

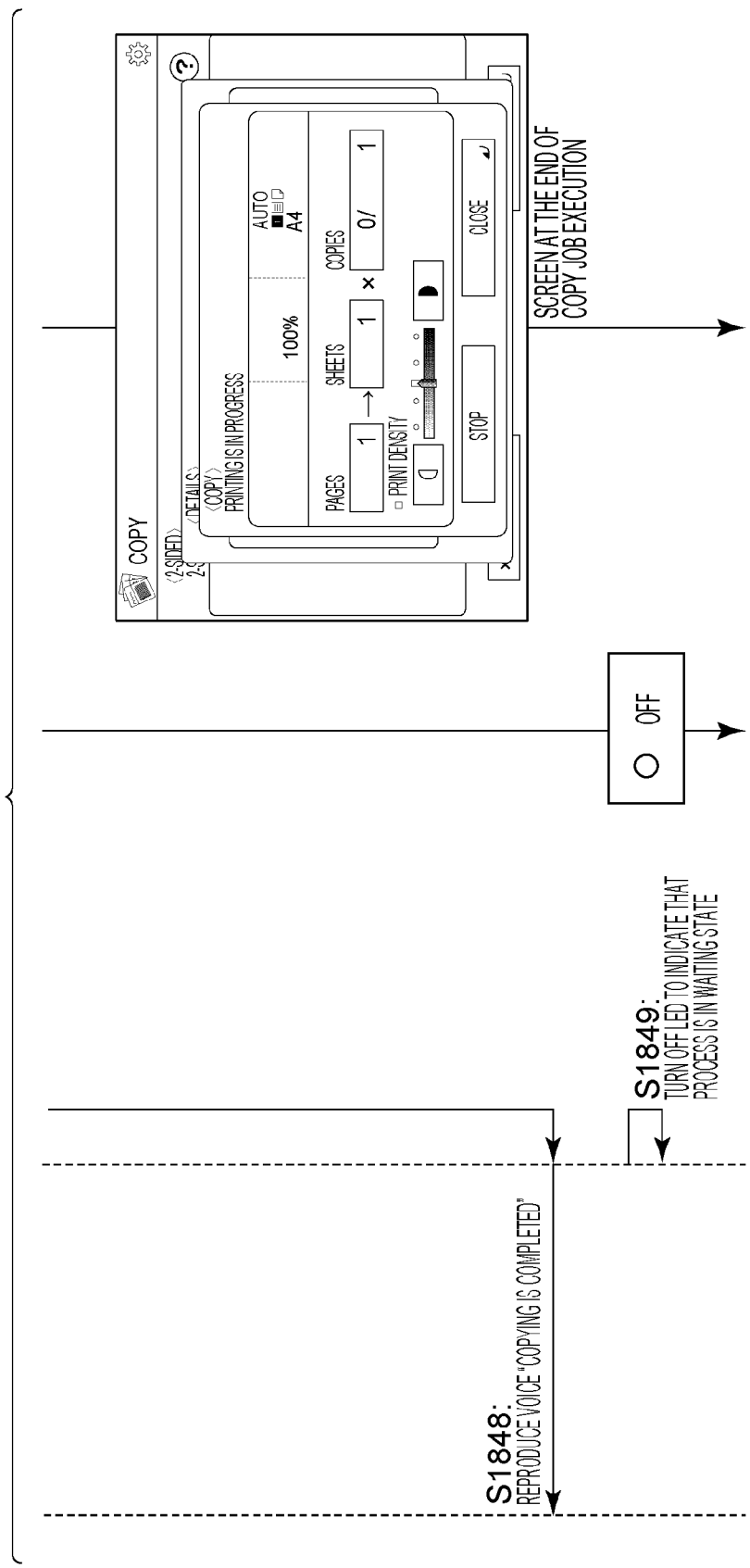

FIG. 19A

| FUNCTION | ITEM GROUP | ITEM |
|---|---|---|
| COMMON | COMMON | HELP, LOG OUT, TRANSITION TO RELEVANT SCREENS, OK, CANCEL |
| COPY | MAIN MENU | INSTRUCT TO START SCANNING, INSTRUCT TO START COPYING, INSTRUCT TO STOP SCANNING, INSTRUCT TO PRINT SAMPLE COPY, INSTRUCT TO RELOAD, INSTRUCT TO RECALL FUNCTION SCREEN (SELECT COLOR, COPY RATIO, SELECT PAPER, SPECIFY FAVORITE FUNCTION, INTERRUPT, CHECK SETTINGS, RECALL PREVIOUS SETTINGS, FAVORITE SETTINGS, BOOK → 2 PAGES, 2-SIDED, FINISHING, BOOKLET, JOB BUILD, N ON 1, ORIGINAL TYPE, TRANSPARENCY COVER SHEETS, SECURE WATERMARK, JOB LOCK, COLOR BALANCE, ONE TOUCH COLOR MODE, PAGE NUMBERING, COPY SET NUMBERING, SHARPNESS, ERASE FRAME, WATERMARK, PRINT DATE, SHIFT, GUTTER, PRINT AND CHECK, NEGATIVE/POSITIVE, REPEAT IMAGES, MERGE JOB BLOCKS, JOB DONE NOTICE, MIRROR IMAGE, AREA DESIGNATION, PRINT ON TAB, STORE IN MAIL BOX, SUPERIMPOSE IMAGE, ID CARD COPY, DOUBLE FEED DETECTION, CUSTOM SIZE ORIGINAL, PAPER SAVE) |
| COPY | OPTIONS | INSTRUCT TO RECALL FUNCTION SCREEN (SELECT COLOR, COPY RATIO, SELECT PAPER, SPECIFY FAVORITE FUNCTION, INTERRUPT, CHECK SETTINGS, RECALL PREVIOUS SETTINGS, FAVORITE SETTINGS, BOOK → 2 PAGES, 2-SIDED, FINISHING, BOOKLET, JOB BUILD, N ON 1, ORIGINAL TYPE, TRANSPARENCY COVER SHEETS, SECURE WATERMARK, JOB LOCK, COLOR BALANCE, ONE TOUCH COLOR MODE, PAGE NUMBERING, COPY SET NUMBERING, SHARPNESS, ERASE FRAME, WATERMARK, PRINT DATE, SHIFT, GUTTER, PRINT AND CHECK, NEGATIVE/POSITIVE, REPEAT IMAGES, MERGE JOB BLOCKS, JOB DONE NOTICE, MIRROR IMAGE, AREA DESIGNATION, PRINT ON TAB, STORE IN MAIL BOX, SUPERIMPOSE IMAGE, ID CARD COPY, DOUBLE FEED DETECTION, CUSTOM SIZE ORIGINAL, PAPER SAVE) |
| COPY | COPY RATIO | ENTER RATIO, SELECT FROM PRESET RATIOS, SET BY LENGTH, XY SAME RATIO OR INDEPENDENT, SPECIFY RATIO FOR POSTER BY % OR NUMBER OF SHEETS, USE NUMERIC KEYS |
| COPY | SELECT COLOR | AUTO, FULL COLOR, BLACK, SINGLE COLOR, TWO COLORS |
| COPY | SELECT PAPER | MANUAL PAPER FEED, SPECIFY CASSETTE, AUTO-FEED, CHECK PAPER DETAILS |
| COPY | CHECK SETTINGS | SELECT PRESET VALUE, SPECIFY CHANGES |
| COPY | PREVIOUS SETTINGS | SELECT SETTING FROM PREVIOUS SETTINGS |
| COPY | FINISHING | SELECT COLLATING, SELECT GROUPING, SET SHEET SIZE FOR OUTPUT IN ROTATE MODE, SELECT STAPLER, SELECT OFFSET, SET NUMBER OF COPIES FOR OFFSET, SELECT HOLE PUNCH, SPECIFY FOLD POSITION, SPECIFY NUMBER OF SHEETS FOR SADDLE FOLD, SPECIFY FIRST PAGE FOR SADDLE FOLD |
| COPY | FAVORITE SETTINGS | SELECT REGISTERED ICON, REGISTER, RENAME, DELETE |

FROM FIG. 19A

| | | |
|---|---|---|
| COPY | 2-SIDED | 1-SIDED → 2-SIDED, 2-SIDED → 2-SIDED, 2-SIDED → 1-SIDED, BOOK → 2-SIDED, ORIGINAL FORMAT (BOOK TYPE, CALENDAR TYPE), COPY FORMAT (BOOK TYPE, CALENDAR TYPE), RIGHT/LEFT PAGES → 2-SIDED, FRONT/BACK PAGES → 2-SIDED |
| COPY | BACKGROUND | SPECIFY DENSITY FOR EACH COLOR, SPECIFY OVERALL DENSITY, AUTO DENSITY ADJUSTMENT, PREVENT BLEED-THRU |
| COPY | ORIGINAL TYPE | TEXT/PHOTO, PRINTED IMAGE, MAP, PHOTO PRINTOUT, TEXT/PHOTO (NON-BLEED-THROUGH), LEVEL ADJUSTMENT |
| COPY | N ON 1 | 2 ON 1, 4 ON 1, 8 ON 1, SET PAGE LAYOUT POSITION, SET PAGE LAYOUT ORDER |
| COPY | BOOKLET | BOOKLET LAYOUT (ON/OFF) SELECT OPENING TYPE, FOLD+SADDLE STITCH, DO NOT FOLD, FOLD ONLY, SPECIFY WHETHER TO PRINT ON FRONT/BACK SIDE OF FRONT/BACK COVER, DIVIDED BOOKLET, CREEP CORRECTION CHANGE SADDLE STITCH POSITION, ADJUST FOLD POSITION |
| COPY | ADD COVER | SET FRONT COVER (LEAVE BLANK, PRINT ON FRONT SIDE, PRINT ON BACK SIDE, PRINT ON BOTH SIDES), SET BACK COVER (LEAVE BLANK, PRINT ON FRONT SIDE, PRINT ON BACK SIDE, PRINT ON BOTH SIDES), SELECT PAPER |
| COPY | INSERT SHEETS | SPECIFY SHEETS, SPECIFY CHAPTER PAGES, ADD, DETAILS/EDIT, DELETE, SCROLL THROUGH LIST, SPECIFY PAGE TO INSERT, ENTER WITH NUMERIC KEYS, SPECIFY WHETHER TO PRINT ON INSERTED SHEETS, SPECIFY THE NUMBER OF SHEETS TO INSERT, ADJUST IMAGE POSITION ON INSERTED SHEETS |
| COPY | DIFFERENT SIZE ORIGINALS | SELECT ORIGINALS OF SAME WIDTH OR DIFFERENT WIDTHS |
| COPY | TRANSPARENCY COVER SHEETS | SELECT INTERLEAF SHEETS, SELECT TRANSPARENCY SIZE, SELECT WHETHER TO PRINT ON INTERLEAF SHEETS |
| COPY | COLOR BALANCE | ADJUST SATURATION, ADJUST HUE, FINE ADJUST YMCK DENSITY, ADJUST BLACK HUE, RECALL SETTINGS, REGISTER SETTINGS, DELETE SETTINGS, RENAME SETTINGS, ADJUST HUE THROUGH NUANCE OF WORDS |
| COPY | PAGE NUMBERING | SET POSITION, ENTER NUMBERS FOR POSITION ADJUSTMENT, SET POSITION FOR 2-SIDED PRINT, SET IMAGE ORIENTATION, SET PRINT COLOR, SET PRINT PAGE RANGE, ADD CHARACTER STRING, REGISTER CHARACTER STRING, COUNT THE NUMBER OF SHEETS TO INSERT (ON/OFF), SET PRINT SIZE, SET PRINT START NUMBER, SET NUMBER TYPE (NUMBERS ONLY, NUMBERS WITH HYPHENS, NUMBERED CHAPTERS, TOTAL PAGE NUMBERING), SET PAGE NUMBERING DIGITS, NUMERIC KEYS |
| COPY | SHARPNESS | TEXT (HIGH/LOW), PHOTO/IMAGE (HIGH/LOW) |
| COPY | ERASE FRAME | ERASE ORIGINAL FRAME, ERASE BOOK FRAME, ERASE BINDING, SPECIFY VALUE, INDEPENDENTLY ADJUST UP/DOWN/RIGHT/LEFT |

FROM FIG. 19B

| | | |
|---|---|---|
| COPY | WATERMARK | SET WATERMARK POSITION, SET IMAGE ORIENTATION, SET PRINT SIZE, SET PRINT COLOR, SET WATERMARK TYPE, SET PRINT PAGE TYPE (HEADER, FULL PAGE), SET PRINT TYPE (TRANSPARENT, SOLID), SET DENSITY FOR TRANSPARENCY MODE |
| COPY | PRINT DATE | SET PRINT DATE POSITION, SET IMAGE ORIENTATION, SET PRINT SIZE, SET PRINT COLOR, SET DATE FORMAT, SPECIFY DATE, SET PRINT TYPE (TRANSPARENT, SOLID), SET DENSITY FOR TRANSPARENCY MODE |
| COPY | SHIFT IMAGE POSITION | SELECT POSITION (UPPER, UPPER-RIGHT, RIGHT, LOWER-RIGHT, LOWER, LOWER-LEFT, LEFT, UPPER-LEFT), SET SHIFT WIDTH BY NUMERIC KEYS, SET FRONT SIDE, SET BACK SIDE, NUMERIC KEYS |
| COPY | GUTTER | SELECT GUTTER POSITION (LEFT, RIGHT, TOP, BOTTOM), FRONT SIDE, BACK SIDE, SPECIFY GUTTER WIDTH |
| COPY | REPEAT IMAGES | SPECIFY NUMBER OF TIMES TO REPEAT (VERTICAL), SPECIFY NUMBER OF TIMES TO REPEAT (HORIZONTAL), SELECT AUTO SETTING, SPECIFY AREA BY TOUCH, SPECIFY AREA BY NUMERIC KEYS, SET MARGINS |
| COPY | MERGE JOB BLOCKS | FINISHING, JOB SEPARATOR, PAGE NUMBERING, COPY SET NUMBERING, WATERMARK, PRINT DATE, JOB DONE NOTICE, STORE IN MAIL BOX, SPECIFY JOB DONE NOTICE DESTINATION, SPECIFY INDEX, ENTER SEARCH NAME |
| COPY | AREA DESIGNATION | INSTRUCT TO START SCANNING, DESIGNATE AREA, FRAMING, BLANKING, ENTER AREA COORDINATES |
| COPY | PRINT ON TAB | SPECIFY NUMBER OF TABS, SELECT PAPER |
| COPY | STORE IN MAIL BOX | SELECT FILE NAME, SELECT BOX NUMBER, COPY UPON STORING |
| COPY | SUPERIMPOSE IMAGE | SPECIFY SIDE TO COMBINE (FRONT SIDE, BACK SIDE), SPECIFY FORM, SPECIFY COMPOSITION TYPE (SOLID, TRANSPARENT), SPECIFY DENSITY FOR TRANSPARENCY MODE, SELECT COLOR |
| COPY | ID CARD COPY | SPECIFY PAPER SIZE TO MAKE ID CARD COPIES |
| COPY | PAPER SAVE | SELECT COLOR OF ORIGINALS TO SKIP (WHITE/COLOR, WHITE ONLY), ADJUST BLANK PAGE DETECTION LEVEL |

FIG. 20A

| FUNCTION | ITEM GROUP | ITEM |
|---|---|---|
| SEND | MAIN MENU | INSTRUCT TO START SCANNING, INSTRUCT TO STOP SCANNING, INSTRUCT TO CHECK JOB STATUS, INSTRUCT TO START SENDING, INSTRUCT TO RECALL CANCEL CONFIRMATION SCREEN (ADDRESS BOOK, ONE-TOUCH, REGISTER DESTINATIONS, MOBILE PORTAL, PREVIOUS SETTINGS, FAVORITE SETTINGS, SCAN SETTINGS (COLOR, RESOLUTION, SIZE, FILE FORMAT), OPTIONS, ORIGINAL TYPE, 2-SIDED ORIGINAL, BOOK →2 PAGES, DIFFERENT SIZE ORIGINALS, DENSITY, SHARPNESS, COPY RATIO, ERASE FRAME, JOB BUILD, DELAYED SEND PREVIEW, FINISHED STAMP, JOB DONE NOTICE, FILE NAME, SUBJECT/MESSAGE, REPLY-TO, E-MAIL PRIORITY, TX REPORT, ORIGINAL CONTENT ORIENTATION, SKIP BLANK PAGES, DOUBLE FEED DETECTION) |
| SEND | ADDRESS BOOK | SELECT ADDRESS LIST FILTERING METHOD (SEARCH BY INITIAL, SEARCH BY TYPE), CHANGE ADDRESS TABLE, DETAILED ADDRESS INFORMATION, SPECIFY DESTINATION ADDRESS, ENTER SEARCH NAME, USE SOFTWARE KEYBOARD, REGISTER IN ONE-TOUCH BUTTON, REGISTER NEW DESTINATIONS (E-MAIL ADDRESS, I-FAX ADDRESS, FILE, GROUP), SPECIFY REGISTERED DESTINATION NAME, SPECIFY REGISTERED DESTINATION ADDRESS, BROWSE FOLDERS, ADD TO ADDRESS BOOK |
| SEND | ONE-TOUCH | SELECT ITEM, SCROLL, SELECT NUMERIC KEY, REGISTER, EDIT, DELETE, CONFIRM DELETION, ENTER NAME, ENTER ONE-TOUCH NAME, ENTER ADDRESS, DIVIDE DATA |
| SEND | MOBILE PORTAL | SELECT LAN CONNECTION, SELECT DIRECT WIRELESS CONNECTION, START DIRECT CONNECTION |
| SEND | REGISTER E-MAIL ADDRESS | ENTER E-MAIL ADDRESS, DIVIDE DATA, STORE IN ADDRESS BOOK |
| SEND | REGISTER I-FAX ADDRESS | DIVIDE DATA, REGISTER TEMPLATE, SELECT "SEND VIA I-FAX SERVER", SET I-FAX DESTINATION CONDITIONS (PAPER SIZE, COMPRESSION METHOD, RESOLUTION, DIVIDE DATA, RECEIVE IN COLOR), SELECT I-FAX MODE |
| SEND | REGISTER FILE (NETWORK FOLDER) | FILE SETTINGS (SELECT PROTOCOL, ENTER HOST NAME, ENTER FOLDER PATH, ENTER USER NAME, ENTER PASSWORD, SEARCH FOR HOST (ENTER WORK GROUP NAME, ENTER HOST NAME), SELECT "DISPLAY CONFIRMATION SCREEN BEFORE SENDING" FOR EACH FOLDER |
| SEND | REGISTER GROUP ADDRESS | STORE IN MAIL BOX, SPECIFY BOX NUMBER |
| SEND | CC & BCC | SPECIFY CC DESTINATIONS, SPECIFY BCC DESTINATIONS |

FROM FIG. 20A

| SEND | CHECK SETTINGS | SPECIFY SETTINGS TO BE CHECKED, INSTRUCT TO CHANGE SETTINGS |
|---|---|---|
| SEND | PREVIOUS SETTINGS | PREVIOUS SETTINGS, SPECIFY PREVIOUS SETTING, SCROLL |
| SEND | FAVORITE SETTINGS | SPECIFY FAVORITE SETTINGS, REGISTER, EDIT, SCROLL, SHOW COMMENTS (ON/OFF), DISPLAY CONFIRMATION FOR RECALLING (ON/OFF), ALLOW/REJECT REGISTRATION, SELECT REGISTRATION DESTINATION, ENTER NAME, ENTER COMMENT |
| SEND | SELECT COLOR | AUTO (COLOR/GRAY), AUTO (COLOR/BLACK), FULL COLOR, GRAYSCALE, BLACK & WHITE BINARY |
| SEND | RESOLUTION | 100×100 dpi TO 600×600 dpi |
| SEND | SCAN SIZE | A/B SIZE, AUTO, CUSTOM (X-VALUE, Y-VALUE, NUMERIC KEYS, REGISTERED SIZE), LONG ORIGINAL, FREE SIZE |
| SEND | FILE FORMAT | JPEG, TIFF, AUTO JPEG/TIFF, PDF, XPS, LIMITED COLOR, COMPACT, PDF/A COMPLIANT, DIVIDE INTO PAGES (SPECIFY NUMBER OF PAGES) |
| SEND | ORIGINAL TYPE | TEXT, PHOTO, TEXT/PHOTO, ADJUST LEVEL |
| SEND | 2-SIDED ORIGINAL | BOOK TYPE, CALENDAR TYPE |
| SEND | BOOK → 2 PAGES | LEFT OPENING BOOK, RIGHT OPENING BOOK |
| SEND | DIFFERENT SIZE ORIGINALS | SAME WIDTH, DIFFERENT WIDTHS |
| SEND | DENSITY | ADJUST DENSITY, ADJUST BACKGROUND (AUTO), ADJUST BACKGROUND (RGB, BATCH) |
| SEND | SHARPNESS | HIGH/LOW |
| SEND | COPY RATIO | ENTER RATIO, SELECT PLUS/MINUS, SELECT FROM PRESET RATIOS, SET BY LENGTH, XY SAME RATIO OR INDEPENDENT, SPECIFY RATIO FOR POSTER BY % OR NUMBER OF SHEETS, USE NUMERIC KEYS |
| SEND | ERASE FRAME | ERASE ORIGINAL FRAME, ERASE BOOK FRAME, ERASE BINDING, SPECIFY VALUE, ADJUST UP/DOWN/RIGHT/LEFT/CENTER, SPECIFY CENTER, SPECIFY BOOKLET |

FROM FIG. 20B

| | | |
|---|---|---|
| SEND | DELAYED SEND | ENTER SEND TIME |
| SEND | PREVIEW | PREVIEW |
| SEND | JOB DONE NOTICE | NOTICE FOR ANY RESULT, NOTICE ONLY FOR ERRORS, SPECIFY DESTINATION TO NOTIFY, ATTACH TX IMAGE |
| SEND | FILE NAME | SPECIFY FILE NAME, REMOVE DATE/JOB NUMBER, OVERWRITE EXISTING FILE |
| SEND | SUBJECT/MESSAGE | ENTER SUBJECT, ENTER MESSAGE |
| SEND | E-MAIL PRIORITY | SET PRIORITY (LOW, NORMAL, HIGH) |
| SEND | ORIGINAL CONTENT ORIENTATION | TOP AT FAR EDGE, TOP AT SIDE EDGE |
| SEND | SKIP BLANK PAGES | SELECT COLOR OF ORIGINALS TO SKIP (WHITE/COLOR, WHITE ONLY), PREVIEW (ON/OFF), ADJUST DETECTION LEVEL |
| PRINT | MAIN MENU | FILTER JOBS (WAITING JOBS, PRINTED JOBS, PERSONAL, SHARED), SELECT JOB, CANCEL JOB SELECTION, UPDATE JOB LIST, PRINT SETTINGS, DISPLAY IMAGE, DELETE JOB, SPECIFY NUMBER OF COPIES, START PRINTING, PREVIEW (SPECIFY PAGE, DISPLAY ENLARGED/REDUCED PREVIEW) |
| PRINT | PRINT SETTINGS | SELECT COLOR (AUTO (COLOR/BLACK), BLACK, TWO COLORS), SELECT TONER SAVER MODE, SPECIFY TWO COLORS, 2-SIDED PRINTING (NO BINDING, LONG-EDGE BINDING, SHORT-EDGE BINDING), ENTER PIN FOR SECURED PRINTING, SPECIFY STAPLE POSITION, SPECIFY PUNCH HOLE POSITION |

FIG. 21A

| FUNCTION | ITEM GROUP | ITEM |
|---|---|---|
| SETTINGS | PREFERENCES | PAPER SETTINGS, DISPLAY SETTINGS, TIMER/ENERGY SETTINGS, NETWORK SETTINGS, EXTERNAL INTERFACE SETTINGS, SCROLL |
| SETTINGS | PREFERENCES > PAPER SETTINGS | PAPER SETTINGS FOR EACH CASSETTE, SELECT PAPER TYPE, SELECT ENVELOPE TYPE, ENTER ENVELOPE FLAP LENGTH, PAPER CASSETTE AUTO DETECTION SIZE, DISTINGUISH BETWEEN SIMILAR PAPER TYPES, PAPER TYPE MANAGEMENT SETTINGS, REGISTER FAVORITE PAPER TYPE, SPECIFY SORTING OF LISTED PAPER TYPES, SPECIFY PAPER LIST FILTER, SCROLL, ENTER NAME, SOFTWARE KEYBOARD |
| SETTINGS | PREFERENCES > DISPLAY SETTINGS | DEFAULT SCREEN AFTER STARTUP/RESTORATION (MAIN MENU, COPY, SCAN AND STORE, USE SAVED FILE, REMOTE SCANNER, SHOW USEFUL FUNCTIONS, PRINT, HOLD), CHANGE DEFAULT SCREEN, COPY SCREEN DISPLAY SETTINGS (SIMPLE/QUICK), STORE LOCATION DISPLAY SETTINGS ON/OFF (BOX, NETWORK SHARED BOX, MEMORY MEDIA), DISPLAY LANGUAGE SETTINGS, KEYBOARD SETTINGS, LOGIN USER NAME SETTINGS |
| SETTINGS | PREFERENCES > TIMER/ENERGY SETTINGS | ADJUST TIME, DATE/TIME SETTINGS (TIME ZONE, SUMMER TIME, ENTER TIME AND DATE), TIME FORMAT, STARTUP SETTINGS, AUTO CLEAR SETTINGS, AUTO SLEEP SETTINGS, SLEEP MODE EXIT TIME SETTINGS, HUMAN-PRESENCE SENSOR SETTINGS |
| SETTINGS | PREFERENCES > NETWORK | OUTPUT REPORT, NETWORK SETTINGS, CONFIRM CONNECTION, TCP/IP SETTINGS, SERVER SETTINGS, PORT SETTINGS, DRIVER SETTINGS, INDIVIDUAL COMMUNICATION STANDARD SETTINGS, FIREWALL SETTINGS, DEVICE POSITION INFORMATION SETTINGS |
| SETTINGS | PREFERENCES > EXTERNAL INTERFACE | USB SETTINGS (USB DEVICE USE SETTINGS, USB INPUT DEVICE/USB EXTERNAL STORAGE DEVICE DRIVER SETTINGS, USB EXTERNAL STORAGE DEVICE USE SETTINGS), KEY REPETITION SETTINGS, AUDIO MODE SETTINGS, AUDIO GUIDE VOLUME/SPEED SETTINGS, MICROPHONE TUNING |
| SETTINGS | ADJUSTMENT/MAINTENANCE | ADJUST IMAGE QUALITY, ADJUST ACTION, MAINTENANCE |
| SETTINGS | ADJUSTMENT/MAINTENANCE > ADJUST IMAGE QUALITY | CORRECT DENSITY FOR EACH APPLICATION, SPECIFY UNEVEN DENSITY CORRECTION METHOD, SPECIFY JOB TYPE TO APPLY TO UNEVEN DENSITY CORRECTION, VIVIDNESS SETTINGS, FINE ADJUST ZOOM |
| SETTINGS | ADJUSTMENT/MAINTENANCE > ADJUST IMAGE QUALITY > AUTO COLOR CORRECTION | SPECIFY TARGET SHEET, CORRECTION TYPE, REGISTER/SELECT SHEET, SPECIFY CORRECTION LEVEL, INITIALIZATION, SPECIFY CORRECTION TARGET CASSETTE, SPECIFY TEST PRINT, INSTRUCT TO READ TEST PAGE, CHECK AUTO GRADATION CORRECTION, FINE ADJUSTMENT OF AUTO GRADATION CORRECTION (CMYK DENSITY CORRECTION), CHANGE CORRECTION LEVEL |
| SETTINGS | ADJUSTMENT/MAINTENANCE > ACTION ADJUSTMENT | ADJUST SADDLE STITCH POSITION, SELECT FINISHER ACTION MODE, ADJUST FOLD POSITION, SET STAPLER EXECUTION TIME |

FROM FIG. 21A

| | | |
|---|---|---|
| SETTINGS | ADJUSTMENT/MAINTENANCE > MAINTENANCE | INSTRUCTION TO START CLEANING INSIDE MAIN UNIT, INSTRUCTION TO START CLEANING FEEDER, INSTRUCTION TO PLAY VIDEO ON CLEANING METHOD |
| SETTINGS | FUNCTION SETTINGS | COMMON, COPY, PRINTER, SEND, RECEIVE/FORWARD, STORE/ACCESS FILES |
| SETTINGS | FUNCTION > COMMON | PAPER FEED ACTION, PAPER OUTPUT ACTION, PRINT ACTION, SCAN ACTION, GENERATE FILE |
| SETTINGS | FUNCTION > COMMON > PAPER FEED ACTION | PAPER FEED ACTION (PAPER CASSETTE AUTO SELECTION ON/OFF, "SELECTED COLOR"-DEPENDENT SETTINGS, "PAPER TYPE"-DEPENDENT SETTINGS, SWITCH PAPER FEED METHOD, JOB INTERRUPTION TIMEOUT SETTINGS) |
| SETTINGS | FUNCTION > COMMON > PAPER OUTPUT ACTION | OUTPUT TRAY SETTINGS (SET PRIORITY FOR EACH FUNCTION), OFFSET JOBS, JOB SEPARATOR BETWEEN JOBS, INSERT JOB SEPARATION SHEET BETWEEN COPIES (SELECT PAPER, SET NUMBER OF COPIES, ON/OFF), UNFINISHED TAB PAPER FORCED OUTPUT |
| SETTINGS | FUNCTION > COMMON > PRINT ACTION | PRINT PRIORITY, PRODUCTIVITY/IMAGE QUALITY PRIORITY SETTINGS, TEXT/PHOTO PRIORITY IN BLACK-AND-WHITE ORIGINAL, OUTPUT REPORT SETTINGS, SUPERIMPOSITION FORM SETTINGS, IDENTIFICATION INFORMATION FORCED PRINT SETTINGS |
| SETTINGS | FUNCTION > COMMON > SCAN ACTION | FEEDER JAM RECOVERY METHOD, DOUBLE FEED DETECTION DEFAULT SETTINGS, STREAK REMOVAL SETTINGS, BLACK SCAN SPEED/IMAGE QUALITY PRIORITY, DISTINGUISH BETWEEN SIMILAR ORIGINALS, SET GAMMA VALUE FOR REMOTE SCANS |
| SETTINGS | FUNCTION > COMMON > FILE SETTINGS | IMAGE QUALITY LEVEL FOR HIGH COMPRESSION/LIMITED COLOR, SPECIFY MINIMUM PDF VERSION, CREATE PDF/A COMPLIANT FILES, OPTIMIZE PDF FOR WEB VIEW, SET DOCUMENT OPERATION AUTHORIZED SERVER |
| SETTINGS | FUNCTION > COPY | REGISTER/EDIT FAVORITE SETTINGS, CHANGE DEFAULT SETTINGS, REGISTER OPTIONS SHORTCUTS, AUTO COLLATE, AUTO ORIENTATION |
| SETTINGS | FUNCTION > PRINTER | SET PRINTER SPECIFICATIONS, PRINTER UTILITY (INITIALIZATION SETTING), RESTRICT PRINTER JOBS, PDL SELECTION |
| SETTINGS | FUNCTION > PRINTER > PRINTER SPECIFICATION SETTINGS | TONER DENSITY, TONER SAVER MODE, RESOLUTION, CMYK TONER DENSITY, LAYOUT, AUTO ERROR SKIP, TIMEOUT, PRINT AFTER COMPLETING RIP, SPECIFY BINDING MARGIN, FINISHING (COLLATE, STAPLE, SHIFT, STAPLE FREE BINDING), NUMBER OF PUNCH HOLES, BOOKLET, SADDLE STITCH CREEP CORRECTION, TRANSPARENCY INTERLEAVING, COPY SET NUMBERING (PRINT POSITION, PRINT SIZE, PRINT COLOR), PDL ADVANCED SETTINGS (HALFTONE SELECTION, MATCHING METHOD, GRAY COMPENSATION) |

FROM FIG. 21B

| | | |
|---|---|---|
| SETTINGS | FUNCTION > STORE/ACCESS FILES | SCAN AND STORE SETTINGS (DEFAULT SETTINGS, FAVORITE SETTINGS), ACCESS STORED FILES SETTINGS (DEFAULT SETTINGS, FAVORITE SETTINGS), COMMON SETTINGS, MAIL BOX SETTINGS, SHARED BOX SETTINGS, NETWORK SETTINGS, MEMORY MEDIA SETTINGS |
| SETTINGS | FUNCTION > STORE/ACCESS FILES > MAIL BOX SETTINGS | SET/REGISTER BOXES (NAME, PIN, AUTO DELETE, AUTO PRINT), SETTINGS FOR ALL BOXES, BOX SECURITY SETTINGS |
| SETTINGS | FUNCTION > STORE/ACCESS FILES > SHARED BOX SETTINGS | SET/REGISTER BOXES, SETTINGS FOR ALL BOXES (PUBLIC MODE, AUTHENTICATION MANAGEMENT, PERSONAL USE, WRITE FROM OUTSIDE, SAVED FILE FORMAT), BOX SECURITY SETTINGS |
| SETTINGS | FUNCTION > STORE/ACCESS FILES > NETWORK SETTINGS | NETWORK PLACE SETTINGS, COMMUNICATION PROTOCOL FOR EXTERNAL REFERENCE, CONFIRM CERTIFICATE |
| SETTINGS | FUNCTION > RECEIVE/FORWARD | OUTPUT REPORT, DEFAULT SETTINGS, FAVORITE SETTINGS, SAVING FORMAT SETTINGS, ERROR TIME SETTINGS, FAX SETTINGS |
| SETTINGS | FUNCTION > SEND | OUTPUT REPORT, DEFAULT SETTINGS, FAVORITE SETTINGS, TRANSMISSION METHOD SETTINGS, E-MAIL SETTINGS, I-FAX SETTINGS, FAX SETTINGS |
| SETTINGS | MANAGEMENT SETTINGS | DEVICE MANAGEMENT, USER MANAGEMENT, SECURITY, SET LICENSE/OTHERS, DATA MANAGEMENT |
| SETTINGS | MANAGEMENT SETTINGS > USER MANAGEMENT | AUTHENTICATION SETTINGS FOR FUNCTION EXECUTION, AUTHENTICATION SETTINGS FOR PRINTING |
| SETTINGS | MANAGEMENT SETTINGS > DEVICE MANAGEMENT | DEVICE INFORMATION SETTINGS (DEVICE NAME, LOCATION), DEVICE INFORMATION DISTRIBUTION SETTINGS (REGISTER DESTINATIONS, AUTO DISTRIBUTION SETTINGS, RECEIPT RESTRICTION SETTINGS), FUNCTION RESTRICTION, CERTIFICATE SETTINGS (KEY GENERATION, CERTIFICATE LIST, CONFIRM CERTIFICATE INFORMATION) |
| SETTINGS | MANAGEMENT SETTINGS > LICENSE/OTHERS | REGISTER LICENSE (ENTER LICENSE NUMBER), REMOTE UI SETTINGS, UPDATE SOFTWARE |
| SETTINGS | MANAGEMENT SETTINGS > DATA MANAGEMENT | IMPORT/EXPORT (USB MEMORY IMPORT/EXPORT, WEB IMPORT/EXPORT) |
| SETTINGS | MANAGEMENT SETTINGS > SECURITY SETTINGS | AUTHENTICATION FUNCTION SETTINGS, PASSWORD SETTINGS |

FIG. 23A
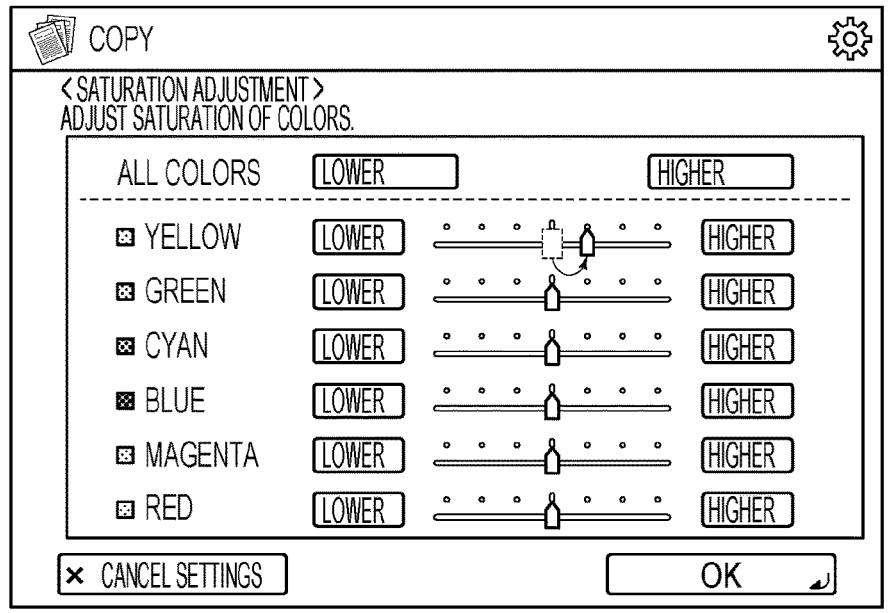
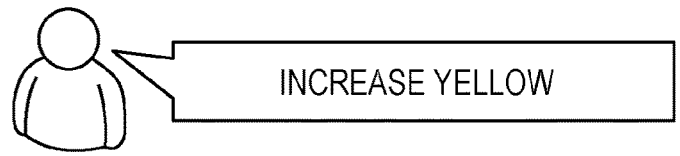
FIG. 23B
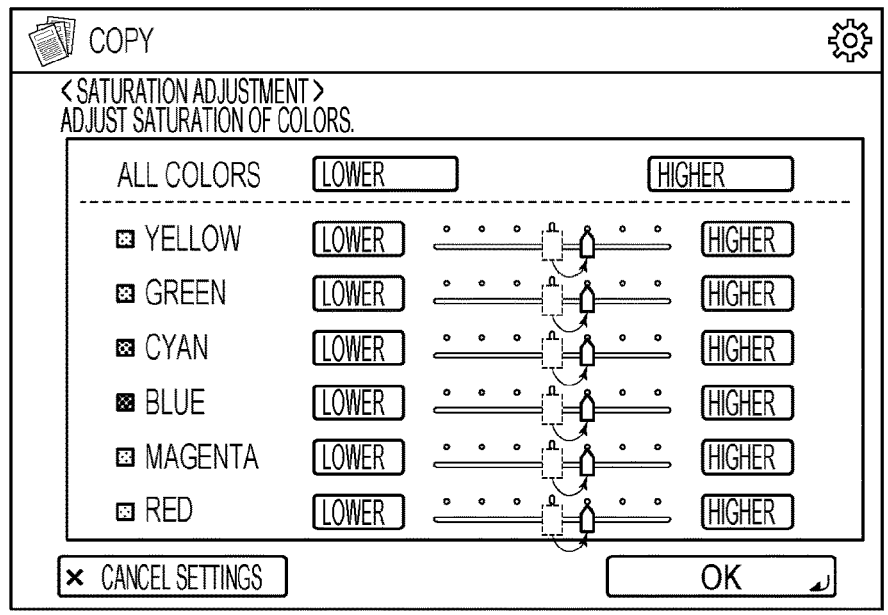
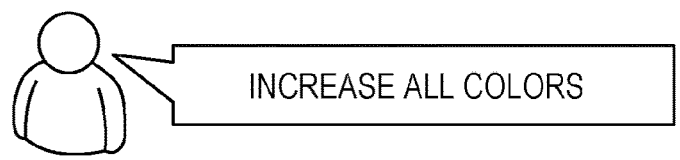

FIG. 25A

| GROUP ID | VOICE RECOGNITION RESULT | |
|---|---|---|
| | KANA | KANA/KANJI |
| COL00000 | KARA | |
| | IRO | 色(COLOR) |
| COL00001 | REDDO | |
| | AKA | 赤(RED) |
| | AKAIRO | 赤色(RED COLOR) |
| COL00002 | GURIN | |
| | MIDORI | 緑(GREEN) |
| | MIDORIIRO | 緑色(GREEN COLOR) |
| COL00003 | BURU | |
| | AO | 青(BLUE) |
| | AOIRO | 青色(BLUE COLOR) |
| COL00004 | IERO | |
| | KI | 黄(YELLOW) |
| | KIRO | 黄色(YELLOW COLOR) |
| COL00005 | MAZENTA | |
| | MAZENDA | |
| COL00006 | SIAN | |
| COL00100 | BURAKKU | |
| | KURO | 黒(BLACK) |
| | KUROIRO | 黒色(BLACK COLOR) |
| COL00101 | GURE | |
| | GURESUKERU | |
| | SHIROKUROTACHI | 白黒多値(MULTILEVEL BLACK AND WHITE) |
| COL00102 | SHIROKURO | 白黒(BLACK AND WHITE) |
| | BIDABURYU | BW |
| | MONOKURO | |
| COL00103 | SHIROKURONICHI | 白黒2値、白黒二値(BINARY BLACK AND WHITE) |
| COL00110 | TANSHOKU | 単色(SINGLE COLOR) |
| | MONOKARA | |
| COL00111 | NISHOKU | 2色、二色(TWO COLOR) |
| | BAIKARA | |
| COL00200 | IROBETSU | 色別(FOR EACH COLOR) |
| | IROGOTO | 色ごと(FOR EACH COLOR) |
| | KAKUSHOKU | 各色(EACH COLOR) |
| COL00201 | ZENSHOKU | 全色(ALL COLORS) |
| | FURUKARA | |

FIG. 25B

| GROUP ID | VOICE RECOGNITION RESULT | |
|---|---|---|
| | KANA | KANA/KANJI |
| UIP00001 | BOTAN | |
| | KI | |
| UIP00002 | PURUDAUN | |
| | DOROPPUDAUN | |
| UIP00003 | AIKON | |
| UIP00004 | FOMU | |
| UIP00005 | BOKKUSU | |
| UIP00006 | GAMEN | 画面 (SCREEN) |
| | UINDO | |
| UIP00007 | POPPUAPPU | |
| | POPPUOBA | |
| | MODARU | |
| | DAIAROGU | |
| UIP00008 | MENYU | |
| UIP00009 | SURAIDA | |
| UIP00010 | SUICCHI | |
| UIP00011 | HYO | 表 (TABLE) |
| | RISUTO | |
| | ICHIRAN | 一覧 (LIST) |
| UIP00012 | FOKASU | |

FIG. 25C

| GROUP ID | VOICE RECOGNITION RESULT | |
|---|---|---|
| | KANA | KANA/KANJI |
| IMG00000 | IMEGI | |
| | GAZO | 画像 (IMAGE) |
| IMG00001 | MOJI | 文字 (TEXT) |
| | JI | 字 (TEXT) |
| IMG00002 | SHASHIN | 写真 (PHOTO) |
| | FOTO | |
| IMG00003 | CHIZU | 地図 (MAP) |
| | MAPPU | |
| IMG00004 | NODO | 濃度 (DENSITY) |
| | KOSA | 濃さ (DENSITY) |
| IMG00005 | KOI | 濃い (DARK) |
| | KOKU | 濃く (DARK) |
| | KOYUKU | こゆく (DARK) |
| IMG00006 | USUI | 薄い (LIGHT) |
| | USUKU | 薄く (LIGHT) |

FIG. 25D

| GROUP ID | VOICE RECOGNITION RESULT | |
|---|---|---|
| | KANA | KANA/KANJI |
| DGR00000 | REBERU | |
| | SUIJUN | 水準 (LEVEL) |
| | DOAI | 度合い (DEGREE) |
| DGR00001 | SAISHO | 最小 (MINIMUM) |
| | MINIMAMU | |
| DGR00002 | SAIDAI | 最大 (MAXIMUM) |
| | MAKKUSU | |
| DGR00003 | GENSHO | 減少 (DECREASE) |
| | HERASU | 減らす (REDUCE) |
| | CHIISAKU | 小さく (SMALL) |
| | SYUKUSHO | 縮小 (REDUCTION) |
| | SUKUNAKU | 少なく (SMALLER) |
| | MIJIKAKU | 短く (SHORT) |
| DGR00004 | ZOKA | 増加 (INCREASE) |
| | FUYASU | 増やす (INCREASE) |
| | OOKIKU | 大きく (LARGE) |
| | KAKUDAI | 拡大 (EXPAND) |
| | OOKU | 多く (MUCH) |
| | NAGAKU | 長く (LONG) |
| DGR00005 | ONAJI | 同じ (SAME) |
| | ISSHO | いっしょ (SAME) |
| | KAWARANAI | 変わらない (NO DIFFERENCE) |
| | KINITSU | 均一 (UNIFORM) |
| DGR00006 | CHIGAU | 違う (DIFFERENT) |
| | KOTONARU | 異なる (DIFFERENT) |
| DGR00007 | SONOMAMA | そのまま (DON'T CHANGE) |
| DGR00008 | JIDO | 自動 (AUTO) |
| | OTO | |

⋮

| DGR00021 | MAINASU | |
| DGR00022 | PURASU | |

FIG. 25E

| GROUP ID | VOICE RECOGNITION RESULT | |
|---|---|---|
| | KANA | KANA/KANJI |
| LEN00000 | NAGASA | 長さ (LENGTH) |
| | RENGUSU | |
| LEN00001 | KYORI | 距離 (DISTANCE) |
| | EKKUSU | X |
| LEN00002 | HABA | 幅 (WIDTH) |
| | WAI | Y |
| | TAKASA | 高さ (HEIGHT) |
| LEN00003 | POINTO | |
| LEN00004 | INCHI | |
| LEN00005 | METORU | |
| LEN00006 | BAIRITSU | 倍率 (ZOOM RATIO) |
| | ZUMU | |
| LEN00007 | TOBAI | 等倍 (100%) |

FIG. 25F

| GROUP ID | VOICE RECOGNITION RESULT | |
|---|---|---|
| | KANA | KANA/KANJI |
| FNC00000 | KINOU | 機能 (FUNCTION) |
| | FANKUSHON | |
| FNC00001 | KOPI | |
| | FUKUSYA | 複写 (COPY) |
| | FUKUSEI | 複製 (DUPLICATION) |
| FNC00002 | INSATSU | 印刷 (PRINT) |
| | PURINTO | |
| FNC00003 | SUKYAN | |
| | YOMITORI | 読み取り (READ) |
| | YOMIKOMI | 読み込み (READ) |
| FNC00004 | HOZON | 保存 (SAVE) |
| | HOKAN | 保管 (KEEP) |
| | KAKUNOU | 格納 (STORAGE) |
| | NOKOSU | 残す (LEAVE) |
| | HORUDO | |
| | KIROKU | 記録 (RECORD) |
| | KAKIKOMI | 書き込み (WRITE) |
| FNC00005 | SOUSHIN | 送信 (TRANSMISSION) |
| | SENDO | |
| FNC00006 | JUSHIN | 受信 (RECEPTION) |
| | RESHIBU | |
| FNC00007 | SUPURU | |
| | TAMATTE | 溜まって (ACCUMULATED) |
| FNC00008 | SHOUKAI | 紹介 (INTRODUCTION) |
| | HERUPU | |
| | GAIDO | |
| | INTORO | |

FIG. 25G

| GROUP ID | VOICE RECOGNITION RESULT | |
|---|---|---|
| | KANA | KANA/KANJI |
| POS00000 | ICHI | 位置 (POSITION) |
| | POJISHON | |
| POS00001 | BASHO | 場所 (LOCATION) |
| | RYOUIKI | 領域 (AREA) |
| | ERIA | |
| | BUROKKU | |
| POS00010 | UE | 上 (UPPER) |
| | REIDO | 0° |
| | ZERODO | 0° |
| POS00011 | MIGIUE | 右上 (UPPER RIGHT) |
| | YONJUGODO | 45° |
| POS00012 | MIGI | 右 (RIGHT) |
| | KYUJYUDO | 90° |
| POS00013 | MIGISHITA | 右下 (BOTTOM RIGHT) |
| | HYAKUSANJYUGODO | 135° |
| POS00014 | SHITA | 下 (BOTTOM) |
| | HYAKUHACHIJUDO | 180° |
| POS00015 | HIDARISHITA | 左下 (BOTTOM LEFT) |
| | NIHYAKUNIJYUGODO | 225° |
| POS00016 | HIDARI | 左 (LEFT) |
| | NIHYAKUNANAJUDO | 270° |
| POS00017 | HIDARIUE | 左上 (UPPER LEFT) |
| | SANBYAKUJYUGODO | 315° |
| POS00018 | CHUUOU | 中央 (CENTER) |
| | SENTA | Center |
| | MANNAKA | 真ん中 (CENTER) |
| | CHUUSHIN | 中心 (CENTER) |
| POS00020 | JOBU | 上部 (UPPER PART) |
| | TEN | 天 (HEAD) |
| | JOHEN | 上辺 (UPPER SIDE) |
| POS00021 | KABU | 下部 (BOTTOM PART) |
| | CHI | 地 (GROUND) |
| | KAHEN | 下辺 (LOWER SIDE) |
| | TEIHEN | 底辺 (BASE) |
| POS00022 | JOGE | 上下 (UP AND DOWN) |
| | UESHITA | 上下 (UP AND DOWN) |
| POS00023 | SAYU | 左右 (LEFT AND RIGHT) |
| | HIDARIMIGI | 左右 (LEFT AND RIGHT) |
| | MIGIHIDARI | 右左 (RIGHT AND LEFT) |

FIG. 25H

| GROUP ID | VOICE RECOGNITION RESULT | |
|---|---|---|
| | KANA | KANA/KANJI |
| FIN00000 | SHIAGE | 仕上げ (FINISHING) |
| | ATOSHORI | 後処理 (POST PROCESSING) |
| FIN00001 | SOTO | |
| | KORETO | |
| | ICHIBUGOTO | 1部ごと (FOR EACH COPY) |
| | BUTAN-I | 部単位 (IN UNITS OF COPIES) |
| FIN00002 | GURUPU | |
| FIN00003 | PEIJIGOTO | ページごと (FOR EACH PAGE) |
| | PEIJITAN-I | ページ単位 (IN UNITS OF PAGES) |
| FIN00004 | KAITEN | 回転 (ROTATION) |
| | MAWASU | 回す (ROTATE) |
| | MAWASHITE | 回して (ROTATE AND) |
| | ROTESHON | |
| | ROTETO | |
| FIN00010 | HOCHIKISU | |
| | HOCCHIKISU | |
| | STEIPURU | |
| | HARI | 針 (STAPLE) |
| | TOJI | 綴じ (STITCH) |
| FIN00011 | SHIFUTO | |
| | ZURASHI | ずらし (SHIFT) |
| | IDOU | 移動 (MOVE) |
| FIN00012 | PANCHI | |
| | ANA | 穴 (HOLE) |
| FIN00013 | SADORU | |
| FIN00014 | ORI | 折り (FOLD) |
| | FORUDO | |
| | TATAMU | 畳む (FOLD) |

FIG. 25I

| GROUP ID | VOICE RECOGNITION RESULT | |
|---|---|---|
| | KANA | KANA/KANJI |
| DEV00000 | SOUCHI | 装置 (DEVICE) |
| | DEBAISU | |
| | KIKI | 機器 (EQUIPMENT) |
| | KIKAI | 機械 (MACHINE) |
| DEV00001 | TEZASHI | 手差し (MANUAL FEED) |
| | SASHIKOMI | 差し込み (INSERT) |
| DEV00002 | TORE | |
| | TOREI | |
| | KUCHI | 口 (SLOT) |
| | OKI | 置き (PUT) |
| DEV00003 | KASETTO | |

FIG. 27C

| No. | OPERABLE UI COMPONENT | | SCREEN CONTROL TO BE PERFORMED | INTERNAL PROCESS TO BE PERFORMED |
|---|---|---|---|---|
| | TYPE | LABEL | | |
| 11401 | FOCUS | | DISPLAY FOCUS FRAME SO AS TO BE SUPERIMPOSED ON BUTTON | |
| 11402 | BUTTON | 100% | HIGHLIGHT BUTTON | |
| 11403 | BUTTON | – | HIGHLIGHT BUTTON | |
| 11404 | BUTTON | REDUCE | HIGHLIGHT BUTTON | |
| 11405 | BUTTON | MANUAL FEED | HIGHLIGHT BUTTON | |
| 11406 | BUTTON | DENSITY | HIGHLIGHT BUTTON | |
| 203 | HARD KEY | | TRANSITION TO COPY TOP SCREEN | RESET JOB PARAMETERS TO DEFAULT VALUES |
| 207 | HARD KEY | | TRANSITION TO COPY JOB EXECUTION START SCREEN | START COPY JOB EXECUTION |

FIG. 27D

| No. | GROUP ID INFORMATION OF DISPLAY SCREEN | EXAMPLE OF PHRASE UTTERED BY USER | OPERATION PERFORMED ON OPERATION PANEL |
|---|---|---|---|
| 11407 / 11401 | · UIP00012 + POS000∗∗<br>· UIP00012 + POS000∗∗ + FIN00011 | · (MOVE) FOCUS TO LEFT (UP, TO RIGHT, DOWN) | OPERATIONS THAT ARE NOT BY VOICE CONTROL ARE DISABLED |
| 11408 / 11401 | · UIP00012 + NUM0000# + POS000∗∗<br>· UIP00012 + NUM0000# + POS000∗∗ + FIN00011 | · (MOVE) FOCUS TO LEFT (UP, TO RIGHT, DOWN) BY # | OPERATIONS THAT ARE NOT BY VOICE CONTROL ARE DISABLED |
| 11409 / 11401 | · UIP00012 + OPR00040<br>· UIP00012 + UIP00001 + OPR00040 | · FOCUS (SELECT FOCUS, SELECT BUTTON TO BE FOCUSED) | BUTTON LOCATED AT POSITION OF FOCUS IS PRESSED<br>(COORDINATE AREA ASSIGNED TO THE FOCUSED BUTTON IS TOUCHED) |
| 11410 / 11402 | · LEN00007<br>· LEN00007 + UIP00001<br>· LEN00007 + OPR00040<br>· LEN00007 + UIP00001 + OPR00040 | · 100% (BUTTON OF 100%, SELECT 100%, SELECT BUTTON OF 100%) | BUTTON IS PRESSED<br>(COORDINATE AREA ASSIGNED TO THE BUTTON IS TOUCHED) |
| 11411 / 11403 | · DGR00021<br>· DGR00021 + UIP00001<br>· DGR00021 + OPR00040<br>· DGR00021 + UIP00001 + OPR00040 | · MINUS (BUTTON OF MINUS, SELECT MINUS, SELECT BUTTON OF MINUS) | BUTTON IS PRESSED<br>(COORDINATE AREA ASSIGNED TO THE BUTTON IS TOUCHED) |
| 11412 / 11404 | · DGR00003<br>· DGR00003 + UIP00001<br>· DGR00003 + OPR00040<br>· DGR00003 + UIP00001 + OPR00040 | · REDUCE (BUTTON OF REDUCTION, SELECT REDUCTION, SELECT BUTTON OF REDUCTION) | BUTTON IS PRESSED<br>(COORDINATE AREA ASSIGNED TO THE BUTTON IS TOUCHED) |
| 11413 / 11405 | · DEV00001<br>· DEV00001 + UIP00001<br>· DEV00001 + OPR00040<br>· DEV00001 + UIP00001 + OPR00040 | · MANUAL FEED (BUTTON OF MANUAL FEED, SELECT MANUAL FEED, SELECT BUTTON OF MANUAL FEED) | BUTTON IS PRESSED<br>(COORDINATE AREA ASSIGNED TO THE BUTTON IS TOUCHED) |
| 11414 / 11406 | · IMG00004<br>· IMG00004 + UIP00001<br>· IMG00004 + OPR00040<br>· IMG00004 + UIP00001 + OPR00040 | · DENSITY (BUTTON OF DENSITY, SELECT DENSITY, SELECT BUTTON OF DENSITY) | BUTTON IS PRESSED<br>(COORDINATE AREA ASSIGNED TO THE BUTTON IS TOUCHED) |
| 11415 / 203 | · OPR00045 | · RESET | HARD KEY IS PRESSED |
| 11416 / 207 | · OPR00011 | · START | HARD KEY IS PRESSED |

*# IS A NUMERAL IN THE RANGE FROM 1 TO 8.
** IS A NUMERAL IN THE RANGE FROM 16, 10, 12, 14.

FIG. 28B
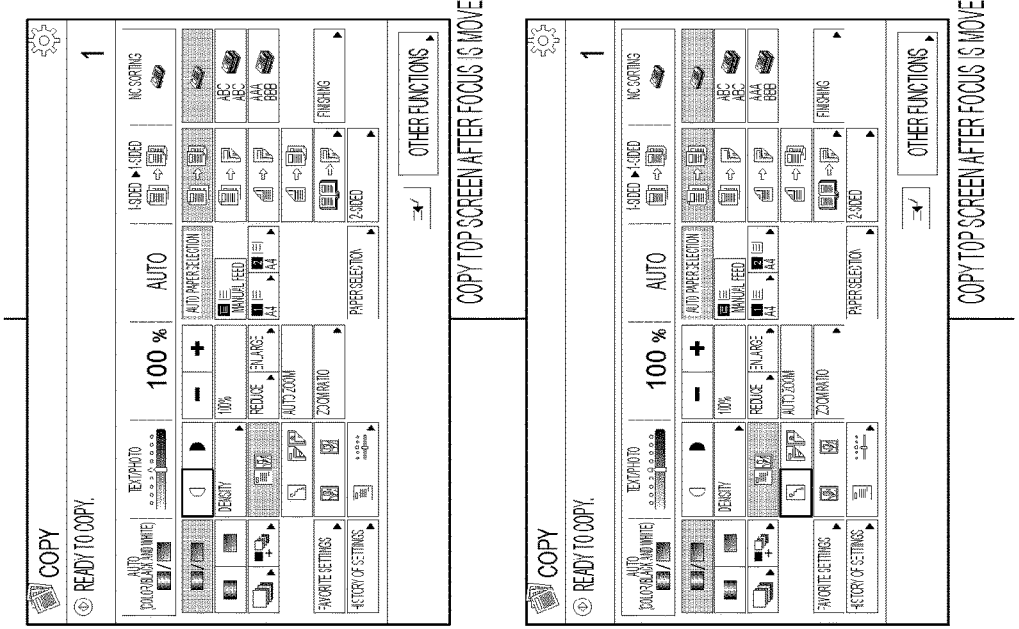
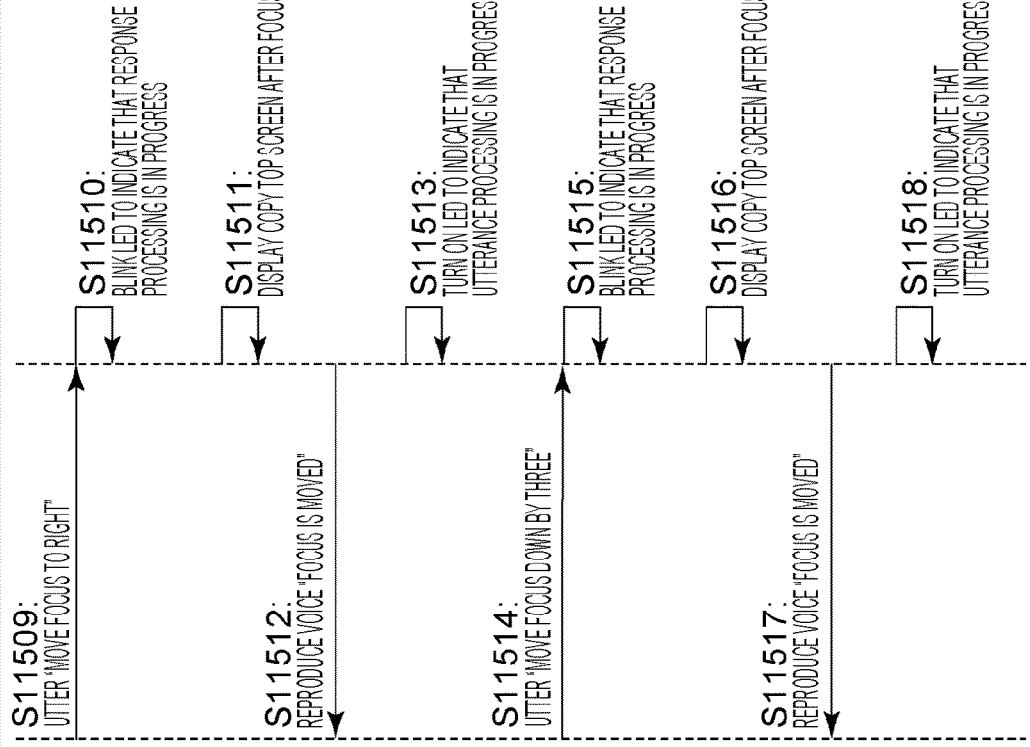

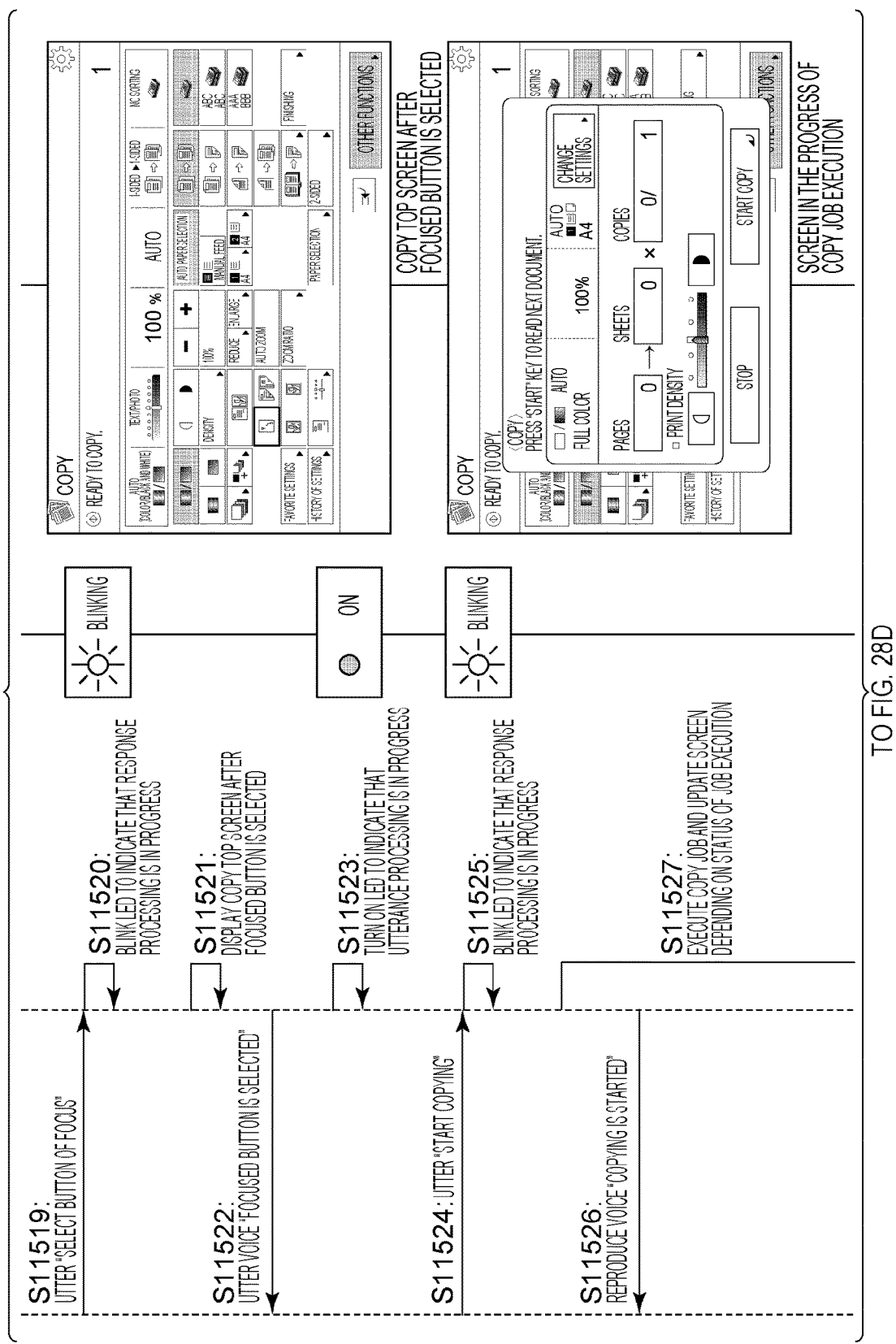

INFORMATION PROCESSING SYSTEM, INFORMATION PROCESSING APPARATUS, AND INFORMATION PROCESSING METHOD

BACKGROUND OF THE INVENTION

Field of the Invention

The present disclosure relates to an information processing system that can operate according to a voice. The information processing system includes an information processing apparatus such as a printer, a scanner, a facsimile device, a multifunction peripheral having a plurality of these functions, a personal computer, a mobile terminal, or the like.

Description of the Related Art

In recent years, with the development of voice recognition technology, apparatuses that execute processing according to voice instructions have become widespread.

Japanese Patent Laid-Open No. 2019-67258 discloses a system configured to execute print processing according to a print instruction given by a voice by a user. Japanese Patent Application Laid-Open No. 2019-67258 exemplifies a method of giving main instructions such as a print instruction to a printing apparatus by a voice, but no consideration is made as to a method of giving detailed instructions such as setting change by a voice. In addition, in such an apparatus, there are various types of setting items, and there are various screen configurations and instruction methods depending on the types. Therefore, in order to provide a system with better operability, it is desirable to allow various voice instruction methods to be used depending on the configuration of the setting screen.

SUMMARY OF THE INVENTION

In view of the above, the present disclosure provides an information processing system capable of operating according to a voice instruction which may be given in various different manners depending on a configuration of a setting screen. In particular, the present disclosure provides an information processing system capable of operating according to a voice instruction to operate a setting screen including a slider-shaped operation object or a setting screen including a plurality of selection objects.

In view of the above, the present disclosure provides an image forming system including an image forming device configured to form an image on a sheet, display capable of displaying information, a microphone capable of acquiring a sound, and one or more controllers configured to function as a unit configured to perform control so as to display, on the display, a screen including an operation object that indicates, by a pointing position, a parameter related to a setting in forming the image, a unit configured to acquire, based on voice information representing one-phrase voice expression acquired via the microphone, first identification information corresponding to the operation object and second identification information corresponding to an updating process on the pointing position, and a unit configured to perform control, based on at least information regarding a current pointing position indicated by the operation object, the first identification information, and the second identification information, so as to display, on the display, a screen including the operation object updated in terms of the pointing position.

Further features of the present invention will become apparent from the following description of exemplary embodiments with reference to the attached drawings.

BRIEF DESCRIPTION OF THE DRAWINGS

FIG. 7B is a diagram illustrating an example of a group ID list used by a group ID determining unit to determine a group ID.

FIG. 8 is a conceptual diagram illustrating a functional configuration of a control program of an image forming apparatus.

FIGS. 9A to 9C are sequence diagrams illustrating a sequence performed among apparatuses included in the system, control programs of the apparatuses, and a user.

FIGS. 11A to 11H are diagrams illustrating examples of group ID lists managed and used by a control program.

FIG. 12B is a diagram illustrating an example of screen control information managed and used by a control program of an image forming apparatus.

FIG. 12C is a diagram illustrating an example of voice control operation determination information.

FIG. 13 is a diagram illustrating a processing flow performed by a voice control operation determination unit of an image forming apparatus.

FIG. 14A is a diagram illustrates an example of a screen (an English version) for use in a voice control operation determination process for a case where the screen includes one slider. FIG. 14B is a diagram showing configuration information of a screen.

FIGS. 14C and 14D are diagrams illustrating an example of voice control operation determination information.

FIGS. 15A-15B is a diagram illustrating a processing flow for a case where there are a plurality of sliders in a voice control operation determination unit of an image forming apparatus.

FIG. 16B is a diagram showing configuration information of a screen. FIGS. 16C and 16D are diagrams showing an example of the voice control operation determination information.

FIGS. 17A to 17D are sequence diagrams illustrating a sequence performed between a system and a user for a case where one slider is provided.

FIGS. 18A to 18F are sequence diagrams illustrating a sequence performed between a system and a user for a case where a plurality of sliders are provided.

FIGS. 19A to 19C are diagrams illustrating a list of setting items of an image forming apparatus.

FIGS. 20A to 20C are diagrams illustrating a list of setting items of an image forming apparatus.

FIGS. 21A to 21C are diagrams illustrating a list of setting items of an image forming apparatus.

FIGS. 23A to 23D are diagrams illustrating examples of manners in which a slider is moved.

FIGS. 25A to 25I are diagrams illustrating an example of a group ID list managed and used by a control program.

FIG. 27C is a diagram illustrating a screen configuration information. FIG. 27D is a diagram illustrating an example of voice control operation determination information.

FIGS. 28A to 28D are diagrams illustrating examples of interactions between a system and a user.

DESCRIPTION OF THE EMBODIMENTS

The present disclosure is described below in detail with reference to embodiments in conjunction with drawings. Note that components described in the embodiments are merely examples and are not intended to limit the scope of the present disclosure.

First Embodiment

A first embodiment described below discloses a method of controlling a setting screen by a voice in terms of a copy function of an image forming apparatus as an example of an image processing apparatus used in an image processing system. In particular, a method of controlling, by a voice, a setting screen for changing a setting value using an object such as a slider is described.

System Configuration

Figure 1:
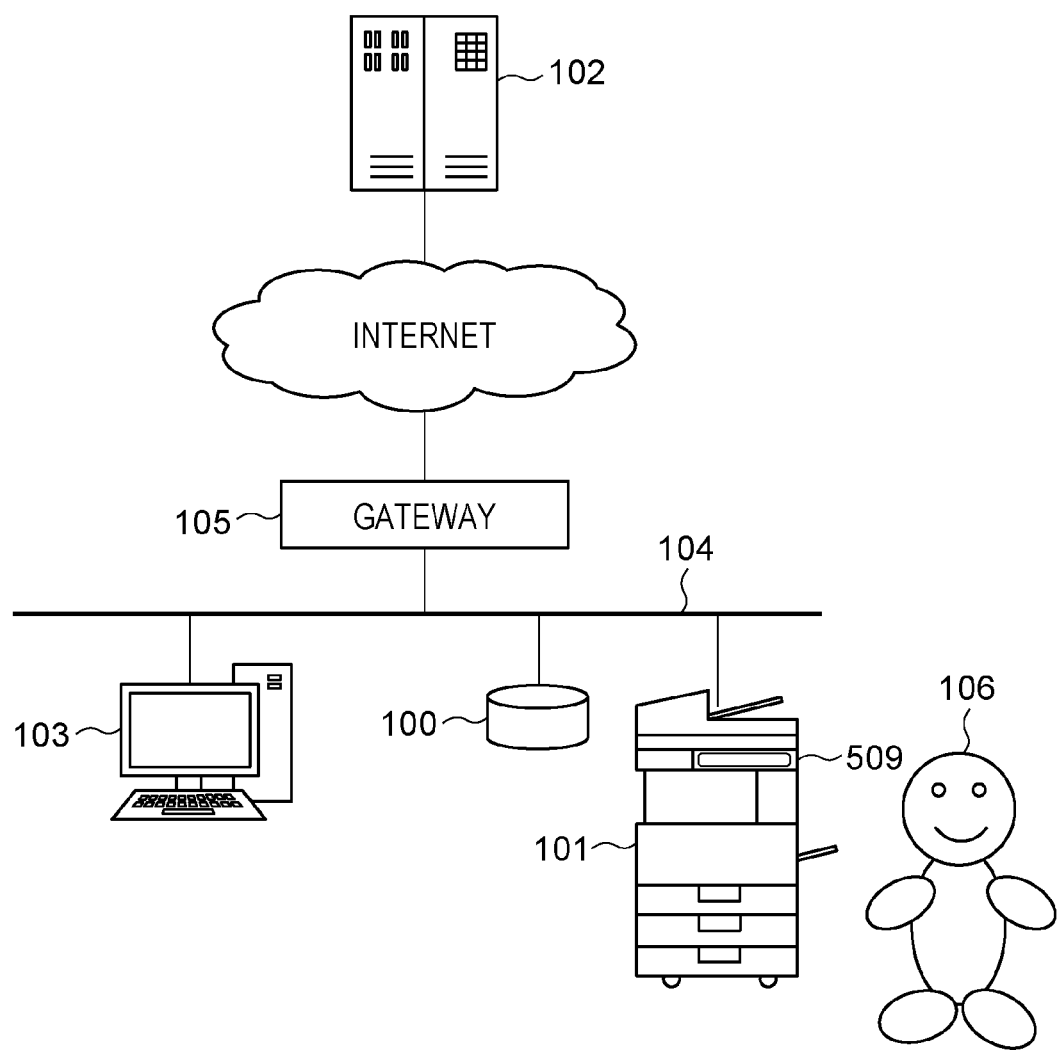
FIG. 1 is a diagram illustrating a system configuration.

FIG. 1 is a diagram illustrating an example of a system configuration according to the present embodiment. In the present embodiment, as shown in FIG. 1, the system includes, for example, a voice control apparatus 100, an image forming apparatus 101, a server 102, a client terminal 103, and a gateway 105.

The voice control apparatus 100, the image forming apparatus 101, and the client terminal 103 can communicate with each other via the gateway 105 and a network 104. Note that the configuration of the system is not limited to including one for each of the voice control apparatus 100, the image forming apparatus 101, and the client terminal 103, which are connected to each other, but the system may be configured to include two or more for some or each of voice control apparatus 100, the image forming apparatus 101, and the client terminal 103. Note that the voice control apparatus 100, the image forming apparatus 101, and the client terminal 103 can communicate with the server 102 via the gateway 105 and the Internet.

The voice control apparatus 100 (a voice input device) acquires a voice uttered by a user 106 and transmits encoded voice data to the server 102 according to a voice control operation start instruction given by the user 106. The voice control apparatus 100 is, for example, a smart speaker. In the configuration of the present example, the voice control apparatus 100 and the image forming apparatus 101 are independent separate apparatuses. However, the configuration is not limited to this example. For example, some of the hardware units (described as hardware blocks in FIG. 3) and/or software functions (described as software blocks in FIG. 6) of the voice control apparatus 100 may be included in the image forming apparatus 101.

The image forming apparatus 101 (an information processing apparatus, an image processing apparatus) is a multifunction peripheral having a plurality of functions such as a copy function, a scan function, a print function, a facsimile function, and/or the like. The image forming apparatus 101 may be an apparatus having a single function such as a printer or a scanner. The operation panel 509 will be described later with reference to FIG. 2 and FIG. 5. In the following description, it is assumed by way of example that the image forming apparatus 101 is a color laser beam multifunction peripheral.

The server 102 (an information processing apparatus) performs voice recognition of voice data of the user 106 acquired by the voice control apparatus 100, and determines a word related to setting operation and job execution of the image forming apparatus 101 from a result of the voice recognition. Furthermore, the image forming apparatus 101 generates a text in accordance with the voice recognition result or the word determination result, and synthesizes voice data for use by the voice control apparatus 100 in reproducing a voice representing the content of the text. Note that the job is a unit of a series of image forming processes (for example, copying, scanning, printing, and the like) realized by the image forming apparatus 101 using the print engine 513 and the scanner 515.

The client terminal 103 is, for example, a personal computer (a PC) used by the user 106. The client terminal 103 issues a print job for printing an electronic file by the image forming apparatus 101. The electronic file may be stored in the client terminal 103, or may be stored on some server (not shown) on the Internet, or may be stored in the external storage device 505 of the image forming apparatus 101. The client terminal 103 can also receive image data obtained via scanning by the image forming apparatus 101. The operation of the client terminal 103 is not directly related to the subject matter of the present embodiment, and thus a further detailed description is omitted.

The network 104 connects the voice control apparatus 100, the image forming apparatus 101, the client terminal 103, and the gateway 105 to each other. The network 104 transmits and receives various data such as voice data acquired by the voice control apparatus 100 and transmitted to the server 102, various kinds of data transmitted from the server 102, and various kinds of data related to prints job and scanjobs or the like.

The gateway 105 is, for example, a wireless LAN router compliant with the IEEE 802.11 standard series. The gateway 105 may have a capability of operating according to other wireless communication schemes. The gateway 105 may be, instead of a wireless LAN router, a wired LAN router that conforms to the Ethernet standard typified by 10BASE-T, 100BASE-T, 1000BASE-T, etc. The gateway 105 may have a capability of operating according to other wired communication methods. Note that the IEEE 802.11 standard series includes a series of standards, such as IEEE 802.11a and IEEE 802.11b, belonging to IEEE 802.11.

Operation Panel of Image Forming Apparatus

Figure 2:
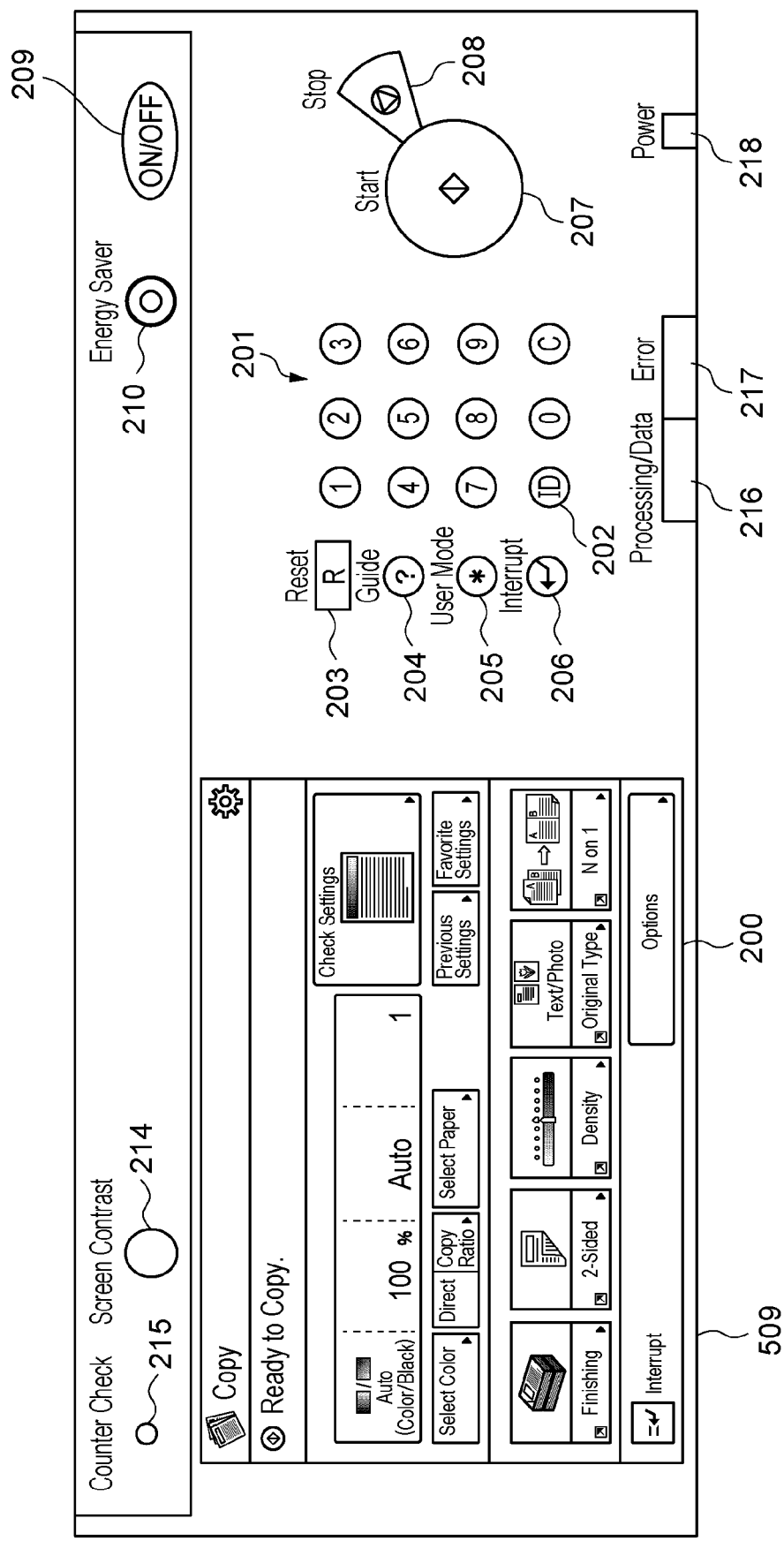
FIG. 2 is a diagram illustrating a configuration of an operation panel.

FIG. 2 is a diagram illustrating an example of a configuration of the operation panel 509 of the image forming apparatus 101.

The operation panel 509 includes an LED (Light Emitting Diode) and an LCD (Liquid Crystal Display) display, and functions as a display unit that displays contents of operations performed by the user 106 and also displays the internal state of the apparatus. The operation panel 509 also functions as a receiving unit that receives an operation performed by the user 106. The operation panel 509 includes not only a plurality of hardware keys but also a touch panel 200 integrated with the LCD display.

The LCD touch panel 200 is a display that allows a touch operation. Setting of modes and displaying of states are performed on this LCD touch panel 200.

The hardware keys 201 to 210 are input units for inputting information. For example, tact switches are used as the hardware keys 201 to 210.

Numeric keys 201 are keys for inputting numerical values from 0 to 9. The ID key 202 is a key used in performing an authentication operation (such as a login/logout operation) when using the apparatus is protected by user/department authentication management.

A reset key 203 is a key for resetting a set mode. The guide key 204 is a key for displaying an explanation screen for each mode. A user mode key 205 is a key for entering a user mode screen. A key 206 is a key for performing interrupt copying.

A start key 207 is a key for starting a copy operation. A stop key 208 is a key for stopping a copy job being executed.

A power switch 209 is a soft switch. When the power switch 209 is pressed, a backlight of the LCD touch panel 200 is turned off, and the apparatus goes into a low power state. The power saving key 210 is a key. When this key is pressed, the apparatus goes into a power saving state. When this key is pressed again, the state returns back from the power saving state.

An adjustment key 214 is a key for adjusting the contrast of the LCD touch panel 200.

When a counter confirmation key 215 is pressed, a count screen is displayed and the total number of copies which have been made up to this time is indicated on the LCD touch panel 200.

An LED 216 is for indicating that a job is being executed, and an image is being stored in an image memory. An LED 217 is an error LED for indicating that an apparatus is in an error state such as a jam or a door open state. An LED 218 is a power supply LED for indicating that the main switch of the apparatus is in an ON state.

Hardware Configuration of Voice Control Apparatus

Figure 3:
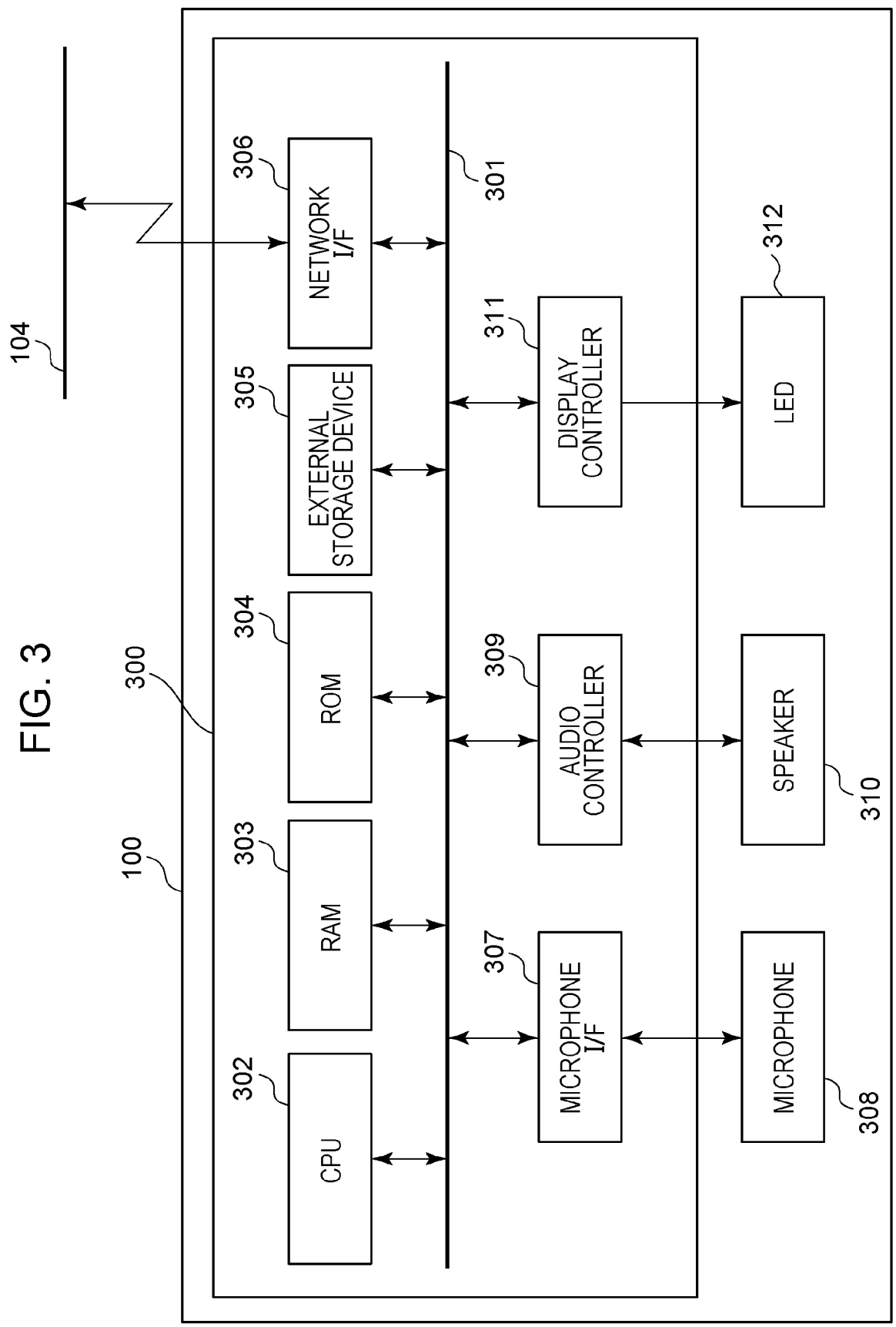
FIG. 3 is a conceptual diagram illustrating a hardware configuration of a voice control apparatus.

FIG. 3 is a diagram illustrating an example of a hardware configuration of a controller unit 300 of the voice control apparatus 100 and devices included in the voice control apparatus 100.

As shown in FIG. 3, the controller unit 300 includes a CPU 302, a RAM 303, a ROM 304, an external storage device 305, a network I/F 306, a microphone i/F 307, an audio controller 309, and a display controller 311. These components are connected to the system bus 301 such that they can communicate with each other. The voice control apparatus 100 includes devices provided on or attached to the controller unit 300 such as a microphone 308, a speaker 310, and an LED 312.

The CPU 302 is a central processing unit that controls the operation of the entire controller unit 300. The RAM 303 is a volatile memory. The ROM 304 is a nonvolatile memory, and stores a boot program for starting the CPU 302. The external storage device 305 is a storage device (for example, an SD card) having a larger capacity than the RAM 303. The external storage device 305 stores a control program executed by the controller unit 300 to control the voice control apparatus 100. Note that the external storage device 305 may be replaced with a flash ROM or the like other than the SD card, or may be replaced with another storage device having the same function as the SD card.

The CPU 302 executes a boot program stored in the ROM 304 when the power is turned on or the like. This boot program is for reading out a control program stored in the external storage device 305 and loading it in the RAM 303. After the CPU 302 executes the boot program, the CPU 302 subsequently executes the control program loaded in the RAM 303 thereby performing control. The CPU 302 stores data in the RAM 303 and reads and writes the data from/to the RAM 303 in executing the control program. Various setting data and the like necessary in executing the control program may be stored in the external storage device 305. Various setting data are read and written by the CPU 302. The CPU 302 communicates with other apparatuses on the network 104 via the network I/F 306.

A network I/F 306 is configured to include a circuit, an antenna, and the like for performing communication according to a wireless communication method conforming to the IEEE 802.11 standard series. However, the communication is not limited to the wireless communication. Instead of the wireless communication method, a wired communication method conforming to the Ethernet standard may be used.

A microphone I/F 307 is connected to the microphone 308, and converts a voice uttered by the user 106 input via the microphone 308 into encoded voice data (voice information), which is stored in the RAM 303 in accordance with an instruction from the CPU 302.

The microphone 308 is, for example, a small MEMS microphone which may be of the type mounted on a smartphone or the like. Note that other types of microphone may be used as long as it is possible to acquire the voice uttered by the user 106. It is preferable that three or more microphones 308 are disposed at predetermined positions to allow it to determine a direction in which a voice uttered by the user 106 comes. However, the present embodiment can be implemented using even one microphone 308, and the number of microphones does not necessarily need to be three or more.

The audio controller 309 is connected to the speaker 310. Under the control of the CPU 302, the audio controller 309 converts voice data into an analog voice signal, and outputs a voice/sound corresponding to the resultant analog voice signal via the speaker 310.

The speaker 310 reproduces (informs) an apparatus response sound indicating that the voice control apparatus 100 is responding, and also reproduces a voice synthesized by the server 102. The speaker 310 is a general-purpose apparatus for reproducing a voice/sound, and its mechanism is not the subject matter of the present embodiment, and thus a further description thereof is omitted.

The display controller 311 is connected to the LED 312 and controls displaying of the LED 312 according to an instruction given by the CPU 302. The display controller 311 mainly performs control to turn on the LED 312 to indicate that the voice control apparatus 100 is correctly inputting the voice uttered by the user 106.

The LED 312 is, for example, a blue LED or the like that is visible to the user 106. The LED 312 is a general-purpose apparatus and is not the subject matter of the present embodiment, and thus a further description thereof is omitted. Note that, instead of the LED 312, a display apparatus capable of displaying characters or pictures may be used.

Hardware Configuration of Server

Figure 4:
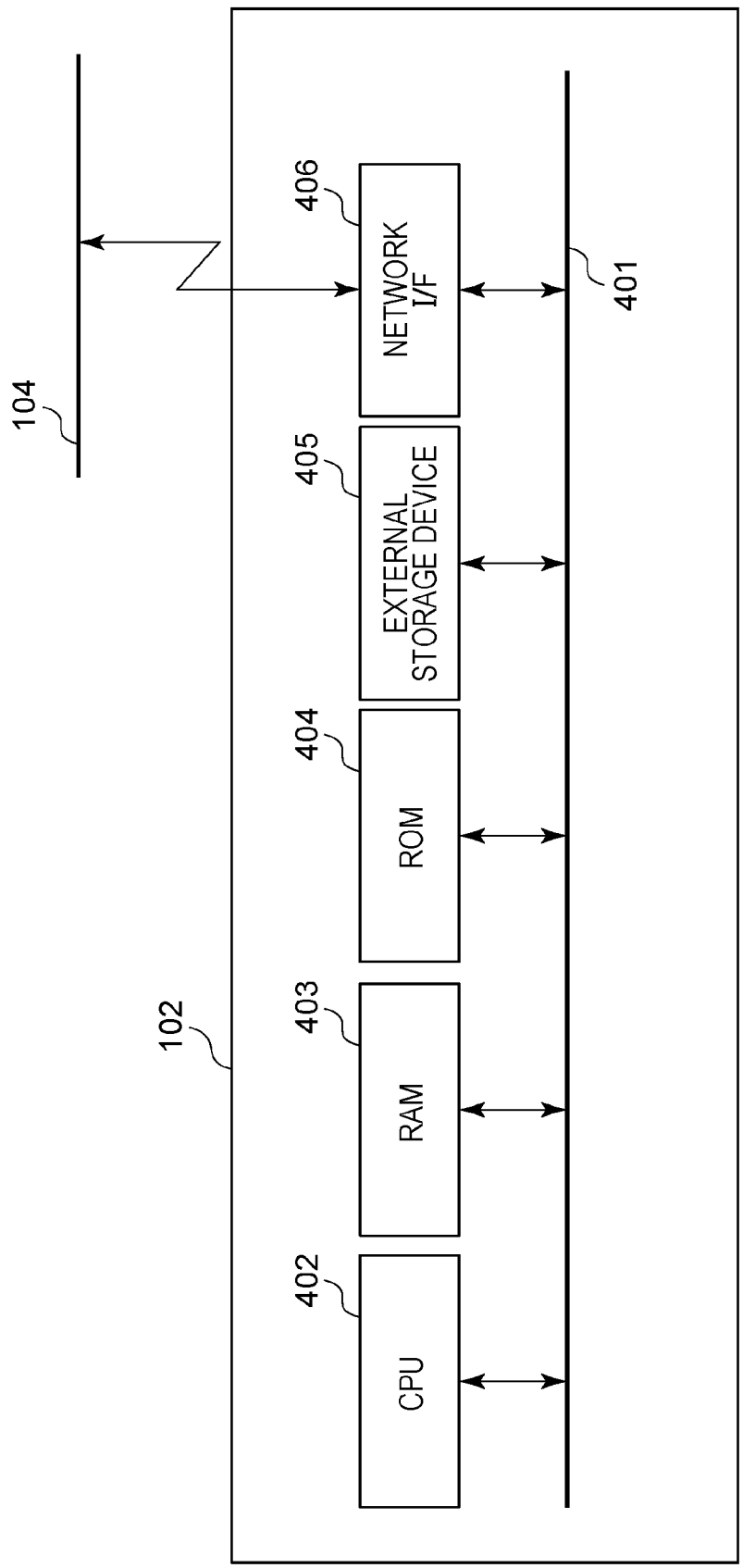
FIG. 4 is a conceptual diagram illustrating a hardware configuration of a server.

FIG. 4 is a diagram illustrating an example of a hardware configuration of a controller unit of the server 102.

As shown in FIG. 4, the controller unit includes a CPU 402, a RAM 403, a ROM 404, an external storage device 405, and a network I/F 406 connected to a system bus 401.

The CPU 402 is a central processing unit that controls the operation of the entire controller unit. The RAM 403 is a volatile memory. The ROM 404 is a non-volatile memory, and a boot program for starting the CPU 402 is stored in the ROM 404. The external storage device 405 is a storage device (for example, a hard disk drive (HDD)) having a larger capacity than the RAM 403. The external storage device 405 stores a control program executed by the controller unit to control the server 102. Note that the external storage device 405 may be replaced with another storage device having the same function as a hard disk drive. For example, a solid state drive (SSD) or the like may be used.

The CPU 402 executes a boot program stored in the ROM 404 when the power is turned on or the like. This boot program is for reading out the control program stored in the external storage device 405 and loading it in the RAM 403. After the CPU 402 executes the boot program, the CPU 402 subsequently executes the control program loaded in the RAM 403 thereby performing control. The CPU 402 stores data in the RAM 403 and reads and writes the data from/to the RAM 403 in executing the control program. The external storage device 405 can further store various settings required when the control program is executed. Various setting data are read and written by the CPU 402. The CPU 402 communicates with other apparatuses on the network 104 via the network I/F 406.

Hardware Configuration of Image Forming Apparatus

Figure 5:
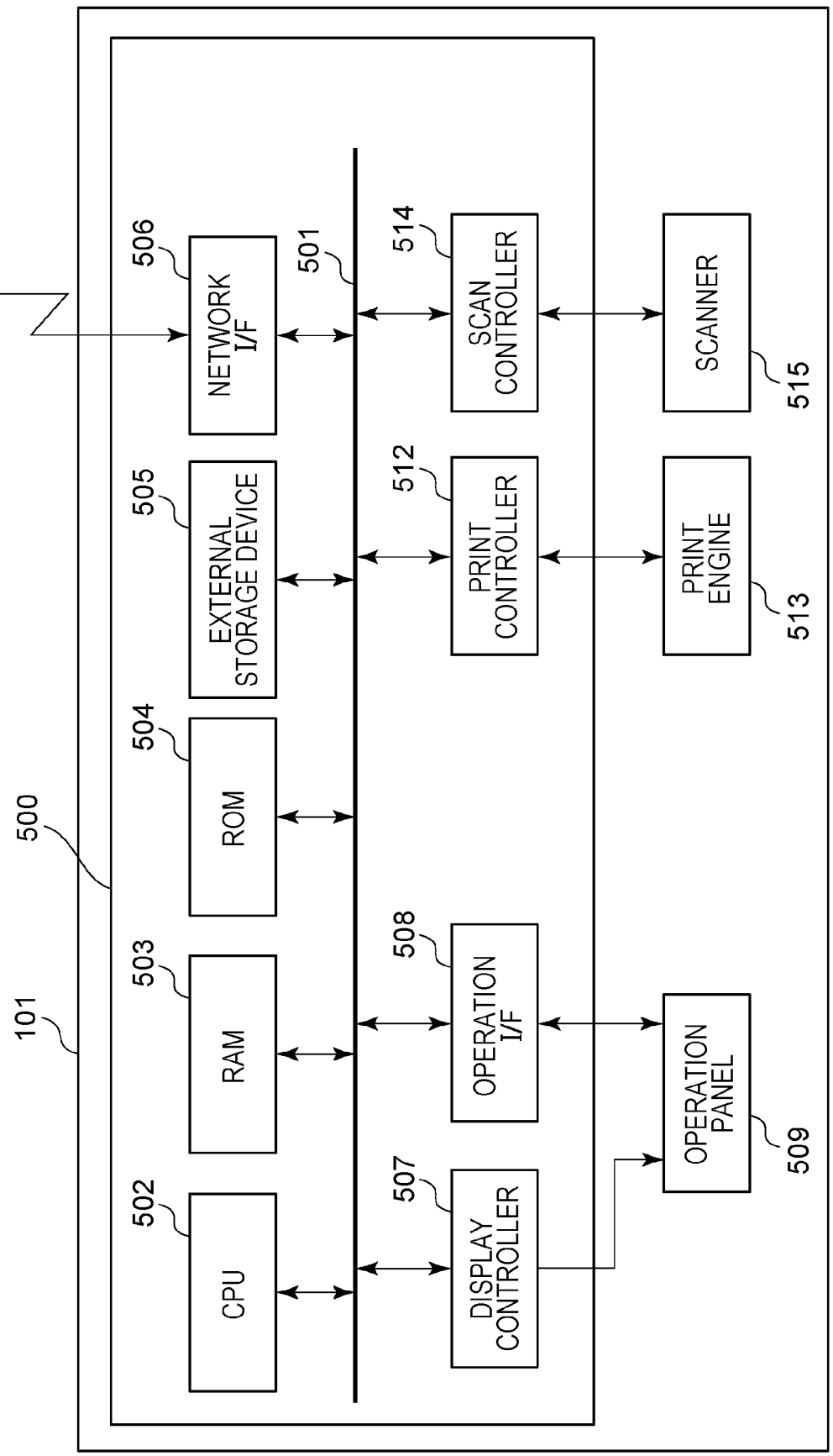
FIG. 5 is a conceptual diagram illustrating a hardware configuration of an image forming apparatus.

FIG. 5 is a diagram illustrating an example of a hardware configuration of a controller unit 500 of the image forming apparatus 101 and devices included in the image forming apparatus 101.

As shown in FIG. 5, the controller unit 500 includes a CPU 502, a RAM 503, a ROM 504, an external storage device 505, a network I/F 506, a display controller 507, an operation I/F 508, a print controller 512, and a scan controller 514. These components are connected to the system bus 501 such that they can communicate with each other.

The CPU 502 is a central processing unit that controls the operation of the entire controller unit 500. RAM 503 is a volatile memory. The ROM 504 is a non-volatile memory, and a boot program for starting the CPU 502 is stored in the ROM 504. The external storage device 505 is a storage device (for example, a hard disk drive (HDD)) having a larger capacity than the RAM 503. The external storage device 505 stores a control program executed by the CPU 502 to control the image forming apparatus 101. Note that the external storage device 505 may be replaced with another storage device having the same function as a hard disk drive. For example, a solid state drive (SSD) or the like may be used.

The CPU 502 executes a boot program stored in the ROM 504 when the power is turned on or the like. This boot program is for reading out the control program stored in the external storage device 505 and loading it in the RAM 503. After the CPU 502 executes the boot program, the CPU 502 subsequently executes the control program loaded in the RAM 503 thereby performing control. The CPU 502 stores data in the RAM 503 and reads and writes the data from/to the RAM 503 in executing the control program. The external storage device 505 may further store various setting data necessary in executing the control program and image data read by the scanner 515. These data are read and written by the CPU 502. The CPU 502 communicates with other apparatuses on the network 104 via the network I/F 506.

The display controller 507 controls displaying a screen of the LCD touch panel 200 of the connected operation panel 509 under the control of the CPU 502.

The operation I/F 508 inputs and outputs operation signals. The operation IF 508 is connected to the operation panel 509. When the LCD touch panel 200 is pressed, the CPU 502 acquires, via the operation I/F 508, coordinates of a pressed position on the LCD touch panel 200. The operation I/F 508 also detects pressing of the hardware keys 201 to 210 on the operation panel 509.

The print controller 512 transmits a control command and image data to the connected print engine 513 in response to an instruction issued by the CPU 502.

The print engine 513 prints the received image data on a sheet according to the control command received from the print controller 512. The details of the print engine 513 are not the subject matter of the present embodiment, and thus a further description thereof is omitted.

The scan controller 514 transmits a control command to the connected scanner 515 according to an instruction issued by the CPU 502, and writes image data received from the scanner 515 in the RAM 503.

The scanner 515 reads a document placed on platen glass (not shown) of the image forming apparatus 101 using an optical unit according to a control command received from the scan controller 514. The detailed description of the scanner 515 is not the subject matter of the present embodiment, and thus the description is omitted.

Functional Configuration of Voice Control Program of Voice Control Apparatus

Figure 6:
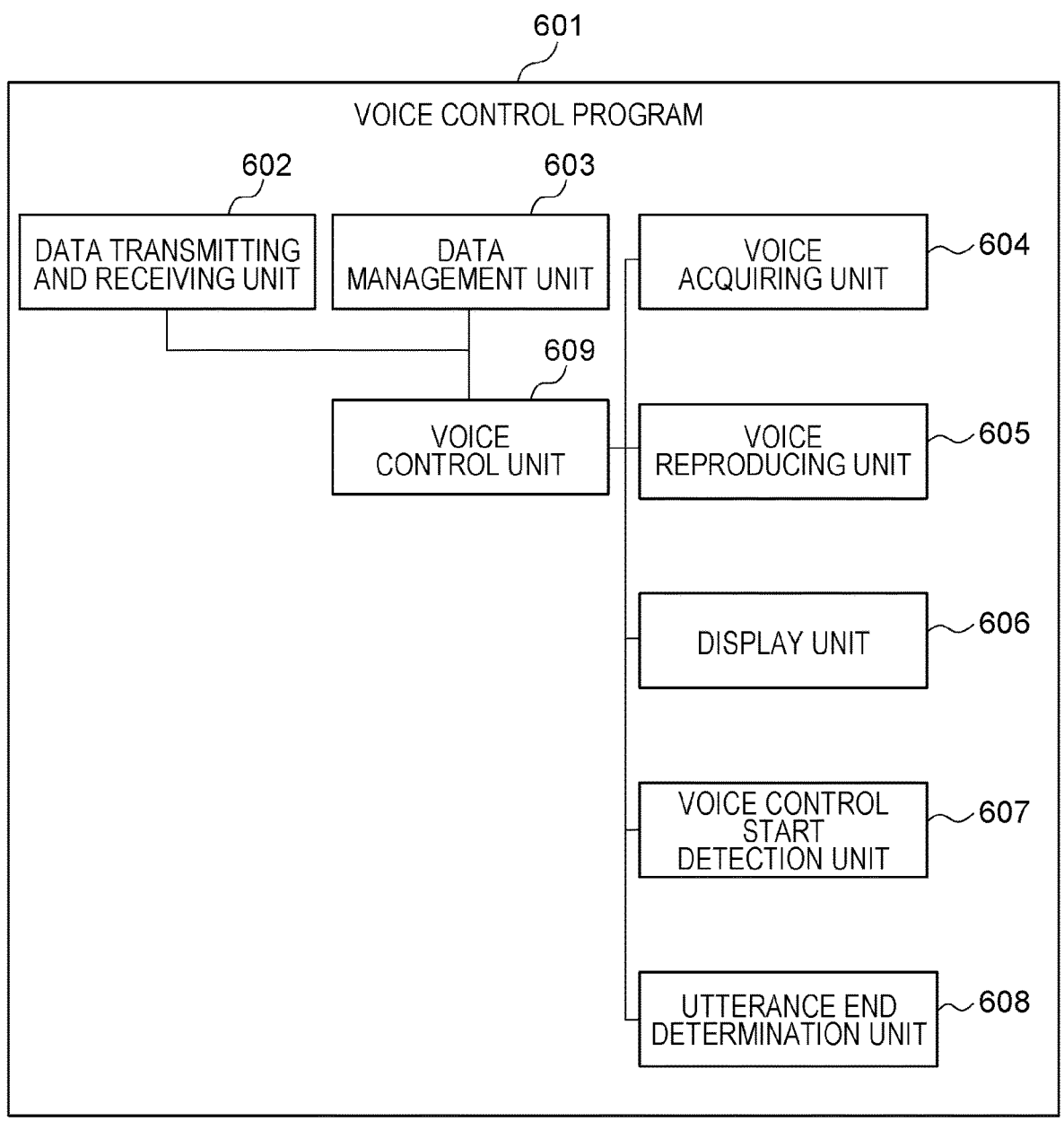
FIG. 6 is a conceptual diagram illustrating a functional configuration of a control program of a voice control apparatus.

FIG. 6 is a block diagram showing a functional configuration of a voice control program 601 of the voice control apparatus 100 executed by the CPU 302.

The voice control program 601 of the voice control apparatus 100 is stored in the external storage device 305 as described above. When the voice control program 601 is started, the voice control program 601 is loaded into the RAM 303 by the CPU 302 and executed.

The data transmitting and receiving unit 602 transmits/receives data to/from other apparatuses on the network 104 by TCP/IP via the network I/F 306. The data transmitting and receiving unit 602 transmits to the server 102 the voice data of a voice uttered by the user 106 acquired by the voice acquisition unit 604 described later. Furthermore, the data transmitting and receiving unit 602 receives synthesized voice data (synthesized voice) generated, as a response to the user 106, by the server 102.

The data management unit 603 stores various kinds of data, such as work data generated in the execution of the voice control program 601, in a predetermined area of the external storage device 305 and manages these pieces of data. Examples of such data stored and managed include volume setting data related to a voice reproduced by the voice reproducing unit 605 described later, authentication information necessary for communication with the gateway 105, device information necessary for communicating with the image forming apparatus 101 and the server 102.

The voice acquisition unit 604, the analog voice of the user 106 near the voice control apparatus 100 acquired by the microphone 308 is converted into voice data and is temporarily stored. The voice of the user 106 is converted into a predetermined format such as MP3, and temporarily stored in the RAM 303 as encoded voice data to be transmitted to the server 102. The timing of starting and the timing of ending the process of the voice acquisition unit 604 are controlled by the voice control unit 609. The voice data may be encoded into in a general-purpose streaming format, and the encoded voice data may be sequentially transmitted by the data transmitting and receiving unit 602.

The voice reproducing unit 605 reproduces the synthesized voice data received by the data transmitting and receiving unit 602 by the speaker 310 via the audio controller 309. The timing of reproducing the voice by the voice reproduction unit 605 is controlled by a voice control unit 609 as described later.

The display unit 606 controls the LED 312 to turn on/off via the display controller 311. For example, in a case where a voice control operation start detection unit 607 (described later) detects a voice control operation being performed, the LED 312 is turned on. The timing of turning on the LED 312 by the display unit 606 is managed by a voice control unit 609 described later.

When the voice control operation start detection unit 607 detects a wake word uttered by the user 106 or detects pressing of an operation start key (not shown) of the voice control apparatus 100, the voice control operation start detection unit 607 transmits an operation start notification to the voice control unit 609. Note that the wake word is a predetermined voice word. The voice control operation start detection unit 607 is always performing an operation of detecting a wake word from the analog voice of the user 106 near the voice control apparatus 100 acquired by the microphone 308. The user 106 is allowed to operate the image forming apparatus 101 by uttering the wake word and then speaking to indicate what operation is to be performed. When the wake word is detected by the voice control operation start detection unit 607, the voice processing is performed as will be described later.

The utterance end determination unit 608 detects the time when the process by the voice acquisition unit 604 is ended. For example, when no voice has been uttered by the user 106 for a particular period (for example, 3 seconds), it is determined that the utterance of the user 106 has ended, and an utterance end notification is transmitted to the voice control unit 609. Note that the determination of the end of the utterance may be made based on a predetermined phrase uttered by of the user 106, instead of based on the period during which no utterance occurs (hereinafter, referred to as a blank time). For example, the predetermined phrase may be "yes", "no", "ok", "cancel", "end", "start", "begin", or the like. In a case where such a predetermined phrase is uttered, it may be determined that the utterance has ended, without waiting for the predetermined period. The determination of the end of the utterance may be performed by the server 102 instead of by the voice control apparatus 100. The end of the utterance may be determined from based on the meaning or context of the utterance of the user 106.

The voice control unit 609 plays the central roles in processing. The voice control unit 609 controls modules in the voice control program 601 so as to operate in cooperation with each other. More specifically, the voice control unit 609 controls the start and the end of the processing performed by the voice acquisition unit 604, the voice reproduction unit 605, and the display unit 606. In addition, when voice data is acquired by the voice acquisition unit 604, the voice control unit 609 performs control such that the voice data is transmitted by the data transmitting and receiving unit 602 to the server 102. Furthermore, when the data transmitting and receiving unit 602 receives synthesized voice data from the server 102, the voice control unit 609 performs control such that the synthesized voice data is reproduced by the voice reproduction unit 605.

Next, a description is given below as to the timing of the start and the end of the processing performed by the voice acquisition unit 604, the voice reproduction unit 605, and the display unit 606.

When the voice control unit 609 receives an operation start notification from the voice control operation start detection unit 607, the voice control unit 609 starts the processing of the voice acquisition unit 604. In a case where the voice control unit 609 receives an utterance end notification from the utterance end determination unit 608, the voice control unit 609 ends the processing of the voice acquisition unit 604. For example, in a case where the user 106 utters a wake word and then says "I want to make a copy", then the processing is performed as follows. In this case, when the voice control operation start detection unit. 607 detects the voice of the wake word, the voice control operation start detection unit 607 transmits an operation start notification to the voice control unit 609. When the voice control unit 609 receives the operation start notification, the voice control unit 609 performs control to start the processing of the voice acquisition unit 604. The voice acquisition unit 604 converts the subsequent analog voice saying "I want to make a copy" into voice data and temporarily stores the resultant voice data. In a case where the utterance end determination unit 608 determines that a no-utterance period with a predetermined length has occurred after the utterance of "I want to make a copy", the utterance end determination unit 608 transmits an utterance end notification to the voice control unit 609. When the voice control unit 609 receives the utterance end notification, the voice control unit 609 ends the processing of the voice acquisition unit 604. Note that a state from the start of the processing by the voice acquisition unit 604 to the end thereof is referred to as an utterance processing state. The display unit 606 turns on the LED 312 to indicate that the process is currently in the utterance processing state.

When it is determined that the utterance has ended, the voice control unit 609 performs control such that the data transmitting and receiving unit 602 transmits the voice data to the server 102 and waits for a response to be received from the server 102. The response from the server 102 is given in the form of, for example, a response message including a header indicating that the response is a response and synthesized voice data. When the voice control unit 609 receives the response message via the voice control unit 609, the voice control unit 609 performs control such that the voice reproduction unit 605 reproduces the synthesized voice data. The synthesized voice data indicates, for example, "A copy screen is going to be displayed.". The state from the end of the utterance to the end of the reproduction of the synthesized voice data is referred to as a response processing state. The display unit 606 blinks the LED 312 to indicate that the process is currently in the response processing state.

In a period in which an interaction session with the server 102 is continued after the response process, the user 106 is allowed to speak what the user wants to do without uttering a wake word. The server 102 determines whether the interaction session is completed. When the server 102 determines that the interaction session is ended, the server 102 transmits an interaction session end notification to the voice control apparatus 100. Note that the state from the end of the interaction session to the start of the next interaction session is referred to as a waiting state. It is assumed that the processing state is always in the waiting state until the voice control apparatus 100 receives an operation start notification from the voice control operation start detection unit 607. The display unit 606 performs control such that the LED 312 is in the off state during the waiting state.

Functional Configuration of Voice Data Conversion Control Program of Server

Figure 7A:
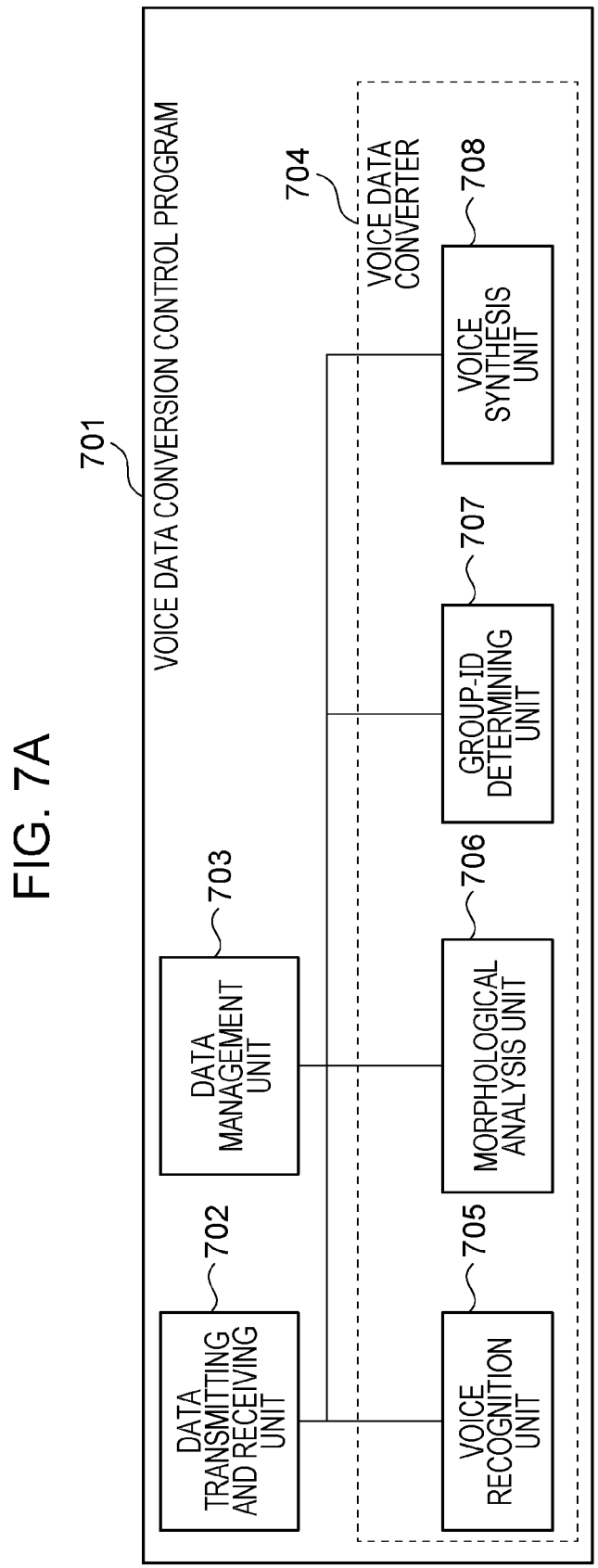
FIG. 7A is a conceptual diagram illustrating a functional configuration of a control program of a server.

FIG. 7A is a block diagram illustrating a configuration of a voice data conversion control program 701 performed by the CPU 402 in the server 102. FIG. 7B illustrates an example of a group ID list used by group ID determining unit 707 in determining a group ID. In the group ID list, words having the same meaning or intention with respect to the user operation of the image forming apparatus 101 are grouped and are assigned the same ID. Note that the word is obtained as a result of performing the voice recognition on an utterance of the user 106 given to the voice control apparatus 100.

The voice data conversion control program 701 for the server 102 is stored in the external storage device 405 as described above, and is loaded into the RAM 403 and executed by the CPU 402 when the program is started.

The data transmitting and receiving unit 702 transmits/receives data to/from other apparatuses on the network 104 using TCP/IP via the network I/F 406. The data transmitting and receiving unit 702 receives voice data of the user 106 from the voice control apparatus 100. Furthermore, the data transmitting and receiving unit 702 also transmits a result of the group ID determination made by the group ID determining unit 707 as will be described later.

The data management unit 703 stores various kinds of data, such as work data generated in the execution of the voice data conversion control program 701 and parameters necessary for the voice data converter 704 to perform the voice recognition process, in determined storage areas of the external storage device 405, and the data management unit 703 manages those various kinds of data. Some examples of such data are described below. An acoustic model and a language model used by the voice recognition unit 705 in converting the voice data received by the data transmitting and receiving unit 702 into text data (text information) are stored in particular storage areas and managed. A dictionary for use by the morphological analysis unit 706 in performing morphological analysis of text is stored in a predetermined area of the external storage device 405 and managed. A group ID list for determining a group ID by the group ID determining unit 707 is stored in a predetermined area of the external storage device 405 and managed. Voice database for use by the voice synthesis unit 708 in performing voice synthesis is stored in a predetermined area of the external storage device 405 and managed. Furthermore, in the data management unit 703, device information necessary for communicating with the voice control apparatus 100 and the image forming apparatus 101 is stored and managed.

The voice data converter 704 includes a voice recognition unit 705, a morphological analysis unit 706, a group ID determining unit 707, and a voice synthesis unit 708. The voice data converter 704 is described in further detail below.

The voice recognition unit 705 performs a voice recognition process for convert voice data of the user 106 received by the data transmitting and receiving unit 702 into text. In the voice recognition process, the voice data of the user 106 is converted into phonemes using the acoustic model, and phonemes are further converted into actual text data by pattern matching using the language model. The acoustic model may be a model using a machine learning method using a neural network like DNN-HMM, or may be a model using another method like GMM-HMM. In the machine learning using the neural network, learning of a learning model is performed based on, for example, training data including a pair of a voice and text. The language model may be a model using a machine learning method using a neural network such as RNN, or a model using another method such as an N-gram method.

In the present embodiment, the text data includes a text including one or more kanas and a text obtained by performing a "kana-kanji conversion" (including a conversion into numbers, alphabets, symbols, and the like). However, the voice recognition process for converting voice data to text data is not limited to the method described above, and another method may be used. The details of the voice recognition process are not the subject matter of the present embodiment, and thus a further description is omitted.

The morphological analysis unit 706 performs morphological analysis on the text data converted by the voice recognition unit 705. In the morphological analysis, a morpheme sequence is derived from a dictionary having information about a grammar of the language, a part of speech, and the like, and a part of speech of each morpheme is determined. The morphological analysis unit 706 may be realized using known morphological analysis software such as JUMAN, ChaSen, MeCab, or the like. For example, when text data indicating "I want to make a copy" is given as a result of the conversion by the voice recognition unit 705, the morphological analysis unit 706 analyzes the text data as a morpheme sequence of "I", "want", "to", "make", "a" "copy". In a case where text data indicating "from A3 to A4" is given, the morphological analysis unit 706 analyzes the text data as a morpheme sequence of "from", "A3", "to", and "A4".

The group ID determining unit 707 determines the group ID by matching the result of morphological analysis by morphological analysis unit 706 with the group ID list in FIG. 7B, and further generates a group ID determination result. For example, from the morpheme sequence of "kopi (copy)", "wo", "shi", "tai", "FNC00001" is detected as a group ID of "kopi (copy)", and {ID:FNC00001} is generated as a result of the group ID determination. From the morpheme sequence of "A3", "kara", "A4", "he", two group IDs "PAP00100" and "PAP00101" are detected, as group IDs of "A3" and "A4", and {ID:PAP00100, ID:PAP00101} is generated as a result of the group ID determination.

In a case where a plurality of IDs are generated as a result of the group ID determination, group ID determination results are generated in the order of the voice recognition and the morphological analysis. For example, in a case where "A4", "kara", "A3", and "he" are obtained in this order as a result of the voice recognition and the morphological analysis, {ID:PAP00101, ID:PAP00100} is generated as a result of the group ID determination. Note that a plurality of adjacent morphemes may be combined and subjected to the matching with the group ID list, and the determination may be made according to the matching result. In this case, if one morpheme that matches a group ID in the group ID list is found, and furthermore a plurality of morphemes including the first one morpheme are found to match group IDs in the group ID list, the latter result is used in generating a group ID determination result. For example, in a case where a morpheme sequence of "A", "4" is given, a group ID determination result is generated not as {ID: CHR00000, ID:NUM00004} but as {ID: PAP00101}. Note that the matching may be performed such that a text including one or more kanas obtained as a result of the voice recognition and the morphological analysis is combined with a text obtained as a result of performing a "kana-kanji conversion", and the resultant combination is subjected to matching with the group ID list. For example, first, the group ID determining unit 707 performs matching between the text obtained via the "kana-kanji conversion" and "kana-kanji" texts in the group ID list. In a case where a matched group ID is not found, matching is performed between the kana text obtained as a result of the voice recognition and the morphological analysis and "kana" texts in the group ID list to detect a group ID for the matched kana text. In a case where the same "kana" is assigned a plurality of different group ID determination ID in the group ID list, and thus the plurality of group IDs are matched, a plurality of group ID determination results may be generated as candidates. This makes it possible to generate group ID determination results in which an error in "kana-kanji conversion" and a difference in spelling of a kanji are taken into account.

The voice synthesis unit 708 performs a voice synthesis process based on the notification received from the image forming apparatus 101. In the voice synthesis process, a text corresponding to the notification is converted to voice data in a predetermined format such as MP3. Examples of combinations of received notification data and a text to be subjected to voice synthesis will be described later with reference to a sequence diagram in FIGS. 9A to 9C. In the voice synthesis process, for example, voice data is generated based on a voice database stored in the data management unit 703. The voice database is, for example, a database including a collection of voices uttered for fixed words or phrases. In the present embodiment, the voice synthesis process is performed using the voice database. However, the technique used in the voice synthesis process is not limited to this example, and another technique may be used. The details of the voice synthesis process are not the subject matter of the present embodiment, and thus a further description thereof is omitted.

Functional Configuration of Device Control Program of Image Forming Apparatus

FIG. 8 is a block diagram illustrating a functional configuration of the device control program 801 of the image forming apparatus 101 executed by the CPU 502.

The device control program 801 of the image forming apparatus 101 is stored in the external storage device 505 as described above, and is loaded into the RAM 503 and executed by the CPU 502 at the startup.

The data transmitting and receiving unit 802 transmits/receives data to/from other apparatuses on the network 104 by TCP/IP via the network I/F 506. More specifically, for example, the data transmitting and receiving unit 802 receives the group ID determination result generated by the group ID determining unit 707. Furthermore, the data transmitting and receiving unit 802 transmits, from the image forming apparatus 101 to the server 102, a screen update notification indicating that the screen display content displayed on the LCD touch panel 200 on the operation panel 509 has been updated, and a job execution state notification indicating the status of the job. A content of the notification will be described later with reference to the sequence diagram shown in FIGS. 9A to 9C.

The data management unit 803 stores and manages various kinds of data, such as work data generated in execution of the device control program 801 and setting parameters necessary for controlling various devices, in a predetermined area of the RAM 503 and the external storage device 505. For example, job data including a combination of setting items and corresponding setting values of a job executed by a device control unit 808 described later, and machine setting information in which paper attribute information and the like are set are stored and managed. Furthermore, authentication information necessary for communication with the gateway 105, device information necessary for communication with the server 102, and the like are stored and managed. Furthermore, image data processed by the image forming apparatus 101 is stored and managed. Furthermore, screen control information used by the display unit 806 in performing screen display control, and voice control operation determination information used by the voice control operation determination unit 807 in determining an operation are stored and managed. The screen control information and the voice control operation determination information are managed separately for each screen displayed by the display unit 806.

The scan unit 804 performs scanning using the scanner 515 via the scan controller 514 based on a scan job parameter setting of the device control unit 808, and stores resultant scanned image data in the data management unit 803.

The print unit 805 executes printing using the print engine 513 via the print controller 512 based on the print job parameter setting of the device control unit 808.

The display unit 806 controls the operation panel 509 via the display controller 507, and displays user-operable UI components (buttons, pull-down lists, check boxes, etc.) on the LCD touch panel 200 based on the screen display control information. Furthermore, the display unit 806 acquires touched coordinates on the LCD touch panel 200 (hereinafter, referred to as a screen or the like) via the operation I/F 508, and determines a UI component to be operated and a process to be performed when an operation on the UI component is received. Furthermore, a detection is performed as to pressing on hardware keys 201 to 210 on the operation panel 509. According to a result thereof, the content displayed on the screen is updated, and job parameters set by a user operation and an instruction to start a job are transmitted to the device control unit. Similarly, according to a result of a voice control operation determination of a voice control operation determination unit 807 described later, the content displayed on the screen is updated, and a job parameter set by a user operation and an instruction to start a job are transmitted to the device control unit.

Based on a group ID determination result received by the data transmitting and receiving unit 802, the voice control operation determination unit 807 determines, as an operation target, one of user-operable UI components proved on a screen displayed on the operation panel 509, or one of hardware keys 201 to 210 provided on the operation panel 509. The details of the voice control operation determination unit 807 will be described later with reference to FIGS. 11A to 11H.

The device control unit 808 issues control instructions to the print engine 513 and the scanner 515 via the print controller 512 and the scan controller 514. For example, in a case where the display unit 806 detects that the start key 207 has been pressed when the copy function screen is displayed, the device control unit 808 receives copy job parameters and a job start instruction from the display unit 806. Based on the job parameters, control is performed such that the print engine 513 prints the image data scanned by the scanner 515 on a sheet. Note that the scanning and print control mechanisms are not the subject matter of the present embodiment, and thus a further description thereof is omitted.

System Control Sequence

Figure 9C:
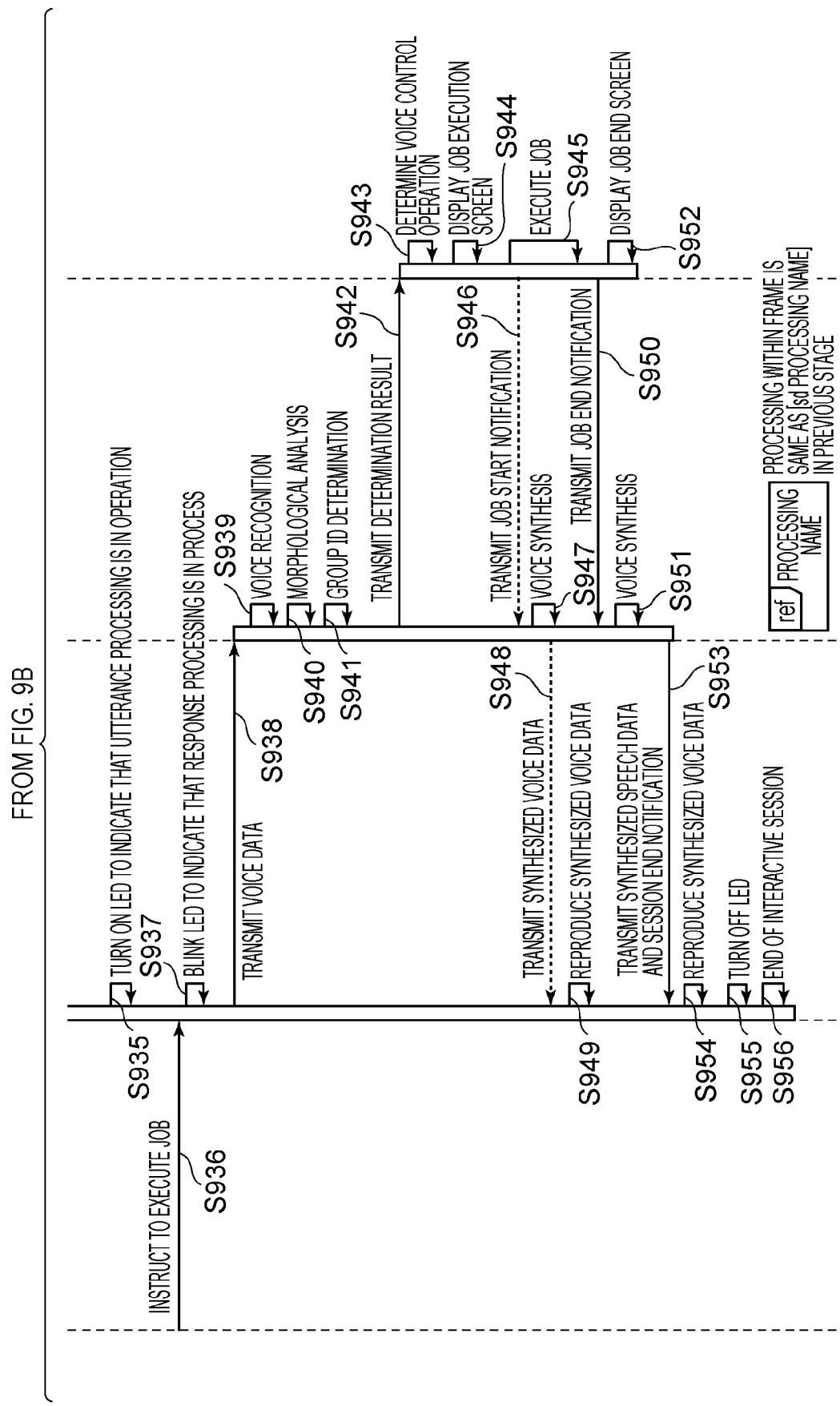

FIGS. 9A to 9C are sequence diagrams illustrating a sequence performed among the apparatuses forming the system shown in FIG. 1 and among the control programs of the apparatuses shown in FIGS. 6 to 8. More specifically, FIGS. 9A to 9C illustrate a sequence in which the voice control apparatus 100 receives a voice control operation by a voice uttered by the user 106, and the image forming apparatus 101 executes various processes according to the voice control operation and returns a voice response indicating the execution result to the user 106.

In the example of the sequence illustrated in FIGS. 9A to 9C, it is assumed that the voice control apparatus 100, the image forming apparatus 101, and the server 102 are in a state in which they can communicate with each other. It is also assumed that the image forming apparatus 101 is displaying a main menu screen that allows it to call functions such as a copy function, a scan function, and a print function after the power is turned on.

First, in step 905 (hereinafter denoted as S905), the user 106 instructs the voice control apparatus 100 to start a voice control operation. The instruction to start the voice control operation is issued by the user 106 by uttering a wake word or pressing an operation start key of the voice control apparatus 100. The voice control operation start instruction is detected by a voice control operation start detection unit 607.

When voice control operation start instruction is detected, then, in S906, the display unit 606 of the voice control program 601 turns on an LED to indicate that an utterance processing is in progress. At the same time, processing of the voice acquisition unit 604 is started.

In S907, the user 106 issues a function call instruction to the voice control apparatus 100. The function call instruction is issued by the user 106 by uttering, for example, "I want to make a copy" or "Open a copy screen" following the wake word in S905. Based on a voice acquired by the voice acquisition unit 604, voice data is generated. When a blank time for a predetermined time or longer occurs, an utterance end determination unit 608 determines that the utterance has ended.

In S908, in response to the utterance end determination, the display unit 606 of the voice control program 601 blinks the LED to indicate that response processing is in progress. At the same time, the processing of the voice acquisition unit 604 is ended.

When the voice data of the function call instruction is generated in S907, then in S909, the data transmitting and receiving unit 602 transmits the generated voice data to the server 102.

In S910, the voice recognition unit 705 performs a voice recognition process on the voice data received by the data transmitting and receiving unit 702 of the voice data conversion control program 701. As a result of the voice recognition process, for example, a voice "I want to make a copy" issued by the user 106 is converted into text.

Thereafter, in S911, the morphological analysis unit 706 of the voice data conversion control program 701 performs a morphological analysis process on the text generated in S910. As a result of the morphological analysis process, for example, the text "kopishitai (I want to make a copy)" is divided into a morphological sequence of "kopi (copy)", "shi (make)", and "tai (want)".

In S912, the group ID determining unit 707 of the voice data conversion control program 701 performs a group ID determination process on the morphological sequence text. In of the group ID determination process, a matching process is performed between the morpheme sequence "kopi (copy)", "shi (make)", "tai (want)" and a group ID list shown in FIG. 7B, and {ID:FNC00001} is generated as a group ID determination result.

In S913, the data transmitting and receiving unit 702 of the voice data conversion control program 701 transmits the group ID determination result obtained in S911 to the image forming apparatus 101.

In S914, the voice control operation determination unit 807 performs a voice control operation determination process on the group ID determination result received by the data transmitting and receiving unit 802 of the device control program 801. As a result of the voice control operation determination process, for example, it is determined from the group ID determination result {ID:FNC0001} that a "copy" button in the main menu screen has been selected.

Thereafter, in S915, the content displayed on the screen by the display unit 806 is updated according to the determination result in S914. For example, in a case where it is determined, from the voice uttered by the user "kopishitai (I want to make a copy)", that the voice control operation specifies to operate a "copy" button displayed on the screen, a copy function screen is displayed as in a case where the "copy" button on the LCD touch panel 200 is touched.

In S916, the data transmitting and receiving unit 802 transmits a screen update notification to the server 102 to notify that the content displayed on the screen has been updated. For example, in a case where the display unit 806 changed the display content from the main menu screen to the copy function screen, the display unit 806 transmits text data "the copy function screen is opened" as a screen update notification.

In S917, in response to the screen update notification received by the data transmitting and receiving unit 702 of the voice data conversion control program 701, the voice synthesis unit 708 performs a voice synthesis process to generate a synthesized voice of predetermined text data corresponding to the content of the screen update notification. For example, in the case where the screen update notification indicates that "the copy function screen is opened", the voice synthesis unit 708 synthesizes a voice "the copy screen is opened" corresponding to the text data. The voice data (synthesized voice data) generated in the voice synthesis process by the voice synthesis unit 708 is transmitted to the voice control apparatus 100 by the data transmitting and receiving unit 702.

In S918, the data transmitting and receiving unit 602 receives the synthesized voice data generated and transmitted in S917.

In S919, the voice reproduction unit 605 reproduces the synthesized voice data received in S918. For example, the synthesized voice data "the copy screen is opened" generated in S917 is reproduced through the speaker 310.

In S920, after the synthesized voice data is reproduced, the display unit 606 of the voice control program 601 again turns on the LED to indicate that the utterance processing is in progress. At the same time, the processing of the voice acquisition unit 604 is started again.

In S921, the user 106 issues a setting screen call instruction to the voice control apparatus 100. The setting screen call instruction is issued when the user 106 utters, for example, "Select paper". In response, voice data corresponding to the uttered voice is acquired by the voice acquisition unit 604. When a blank time for a predetermined time or longer occurs after the utterance by the use 106, the utterance end determination unit 608 determines that the utterance has ended.

S922 is similar to S908 described above.

In S923, a voice control operation processing is performed in a similar manner to the process from S909 to S918 described above. However, in S923, the screen is updated such that the display unit 806 displays a setting screen in response to the setting screen call instruction in S921. For example, when the copy function screen is displayed, if the group ID determination result is {ID:PAP00000, ID:OPR00040}, then a paper selection screen is displayed.

In S924, the voice reproduction unit 605 reproduces synthesized voice data generated in a voice synthesis process in S923. For example, if the paper selection screen was displayed as the setting screen in S923, a message "Paper selection screen is displayed. Make paper setting." are reproduced via the speaker 310.

S925 is similar to S920 described above.

In S926, the user 106 issues a setting change instruction to the voice control apparatus 100. The setting change instruction is issued by the user 106 by uttering, for example, "A4". When a blank time for a predetermined time or longer occurs after the utterance by the use 106, the utterance end determination unit 608 determines that the utterance has ended.

S927 is similar to S908 described above.

In S923, a voice control operation processing is performed in a similar manner to the process from S909 to S918 described above. However, in S928, a set value displayed on the setting screen is changed in accordance with the setting change instruction in S926. For example, when a paper selection screen is displayed, if the group ID determination result is {ID:PAP0001}, then the paper selection is changed to A4 on the paper selection screen and the result is displayed.

In S929, the voice reproduction unit 605 reproduces synthesized voice data generated in the voice synthesis process in S928. For example, in the case where the paper setting value is changed and displayed in S928, the synthesized voice data "Paper has been set to A4" is reproduced via the speaker 310.

S935 is similar to S920 described above.

In S936, the user 106 issues a job execution instruction to the voice control apparatus 100. The job execution instruction is issued by the user 106 by uttering, for example, "copy start". When a blank time for a predetermined time or longer occurs after the utterance by the use 106, the utterance end determination unit 608 determines that the utterance has ended.

S937 to S942 are similar to S909 to S913 described above.

In S943, the voice control operation determination unit 807 performs a voice control operation determination process on the group ID determination result received by the data transmitting and receiving unit 802 of the device control program 801. In a case where the group ID determination result is {ID:FNC00001 ID:OPP00011}, it is determined that the "copy start" button displayed on the screen or the hard start key 207 has been operated.

In S944, a job execution screen is displayed according to the determination result obtained in S943. For example, in a case where it is determined, from the voice uttered by the user "copy start", that the operation instructed to be performed is to operate the start key 207, a copy job start screen is displayed.

In S945, the job is executed according to the job parameters set on the screen of the image forming apparatus 101.

In S946, the data transmitting and receiving unit 802 transmits information (a job execution start notification) indicating that the job execution has been started to the server 102 as the content of the job execution state notification. For example, in the case where the copy job is started, text data "start copy job" is transmitted as the content of the job execution state.

In S947, the data transmitting and receiving unit 702 of the voice data conversion control program 701 receives the job execution status notification, and the voice synthesis unit 708 performs a voice synthesis process on predetermined text data corresponding to the content of the job execution status notification (a job execution start notification). For example, in the case where the content of the job execution status notification is "copy job start", the voice synthesis unit 708 synthesizes a voice "copying is started" according to the text data.

S948 is similar to S918 described above.

In S949, the voice reproduction unit 605 reproduces the synthesized voice data received in S948. For example, the synthesized voice data "copying is started" generated in S947 is reproduced via the speaker 310.

In S950, the data transmitting and receiving unit 802 transmits, to the server 102, information indicating the end of the job execution (a job execution end notification) as the content of the job execution status notification. For example, when the copy job is completed, a job execution status notification including, as its content, text data "copy job completed" is transmitted.

In S951, the data transmitting and receiving unit 702 of the voice data conversion control program 701 receives the job execution status notification, and the voice synthesis unit 708 performs a voice synthesis process on predetermined text data corresponding to the content of the job execution status notification (the job execution end notification). For example, in the case where the content of the job execution status notification is "copy job is completed", the voice synthesis unit 708 syntheses a voice "copying is completed" according to the text data.

In S952, in response to the end of the job execution process in S945, the display unit 806 displays a job execution end screen. For example, when the execution of the copy job is completed, a copy job end screen is displayed.

In S953, the data transmitting and receiving unit 602 receives the synthesized voice data generated in S951 from the server 102. Furthermore, an interactive session end notification for notifying the voice control apparatus 100 of the end of the interactive session with the user 106 is received from the server 102.

In S954, the voice reproduction unit 605 reproduces the synthesized voice data received in S953. For example, the synthesized voice data "Copying is completed" generated in S951 is reproduced via the speaker 310.

In S955, in response to the reception of the interactive session end notification in S953, the display unit 606 of the voice control program 601 turns off the LED to indicate that voice control apparatus 100 goes into the waiting state.

In S956, in response to the reception of the interaction session end notification in S953, the voice control apparatus 100 is switched into the waiting state.

Note that it is allowed to input the wake word at any time even when the LED is in a state on the sequence diagram in which the LED is blinking to indicate that the response process is in progress. The user 106 may forcibly end the interactive session by uttering "cancel" or "stop" following the utterance of the wake word.

Processing Flow of Device Control Program 801 of Image Forming Apparatus 101

Figure 10:
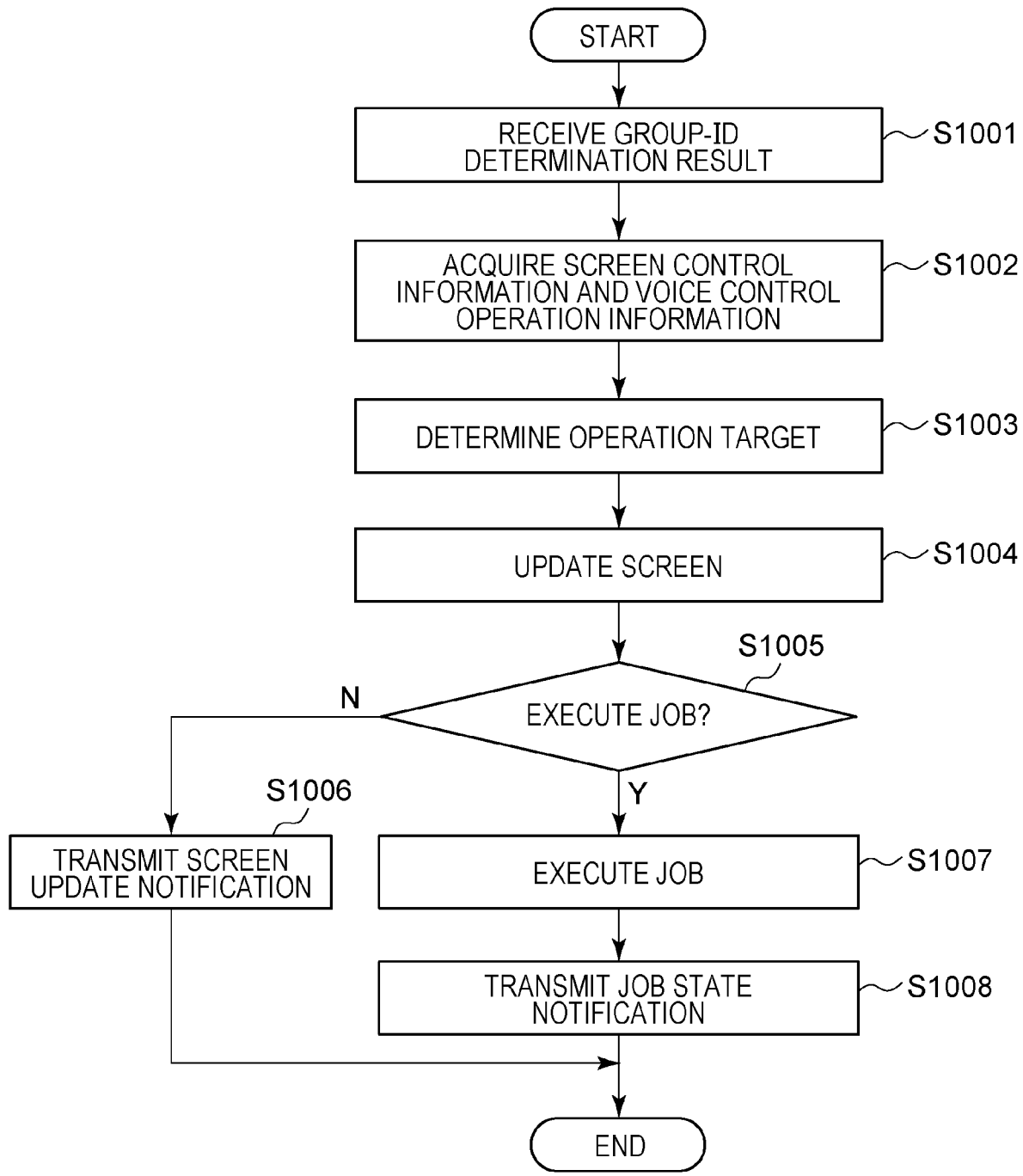
FIG. 10 is a diagram illustrating a processing flow of a device control program of an image forming apparatus.

FIG. 10 is a flow chart illustrating an outline of a processing flow of the device control program 801 of the image forming apparatus 101. More specifically, FIG. 10 shows an example of a processing flow of the device control program 801 in S914, S915, S923, S928, S933, and S943 to S952 in the sequence diagrams shown in FIGS. 9A to 9C.

Figure 12A:
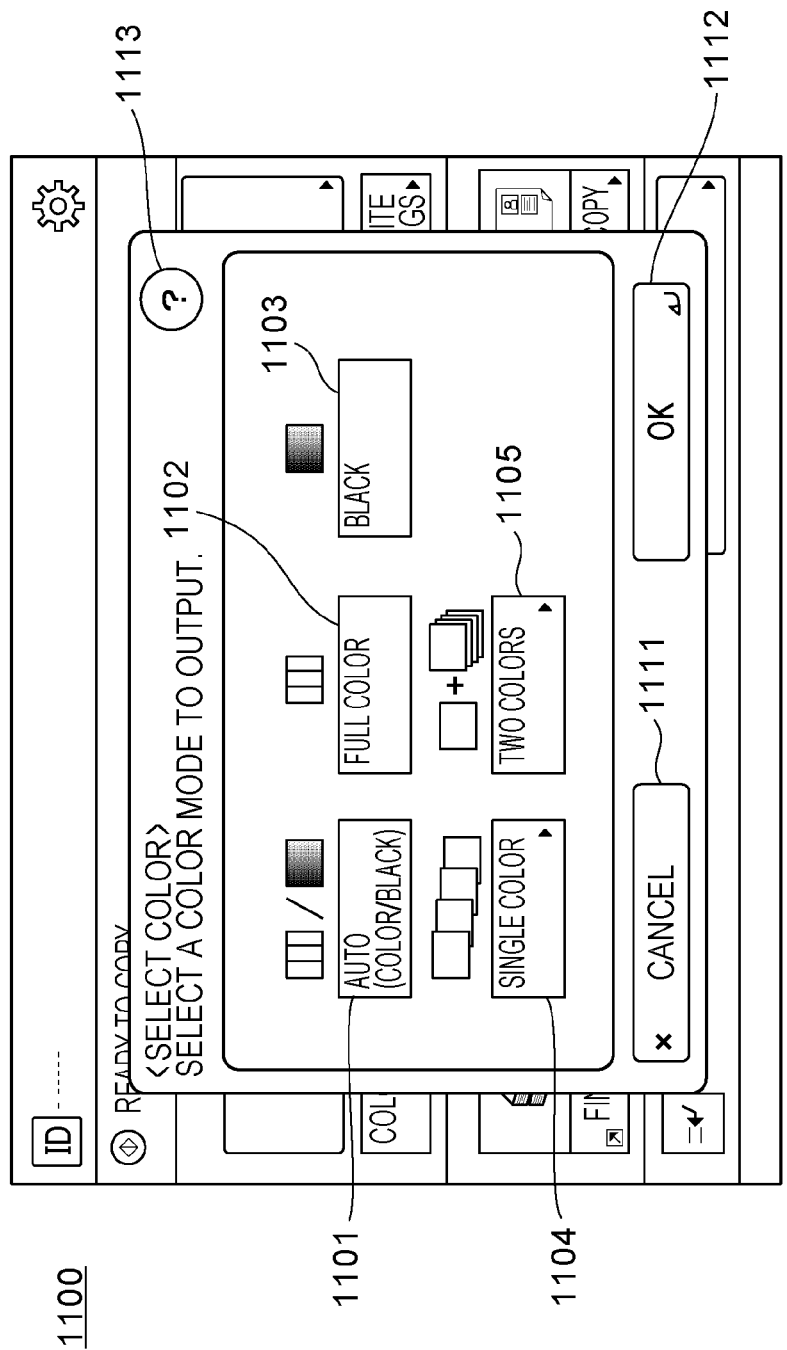
FIG. 12A is a diagram illustrating a screen displayed by a control program of an image forming apparatus, wherein this screen is an English version translated from a Japanese version shown in FIG. 12D.
Figure 12D:
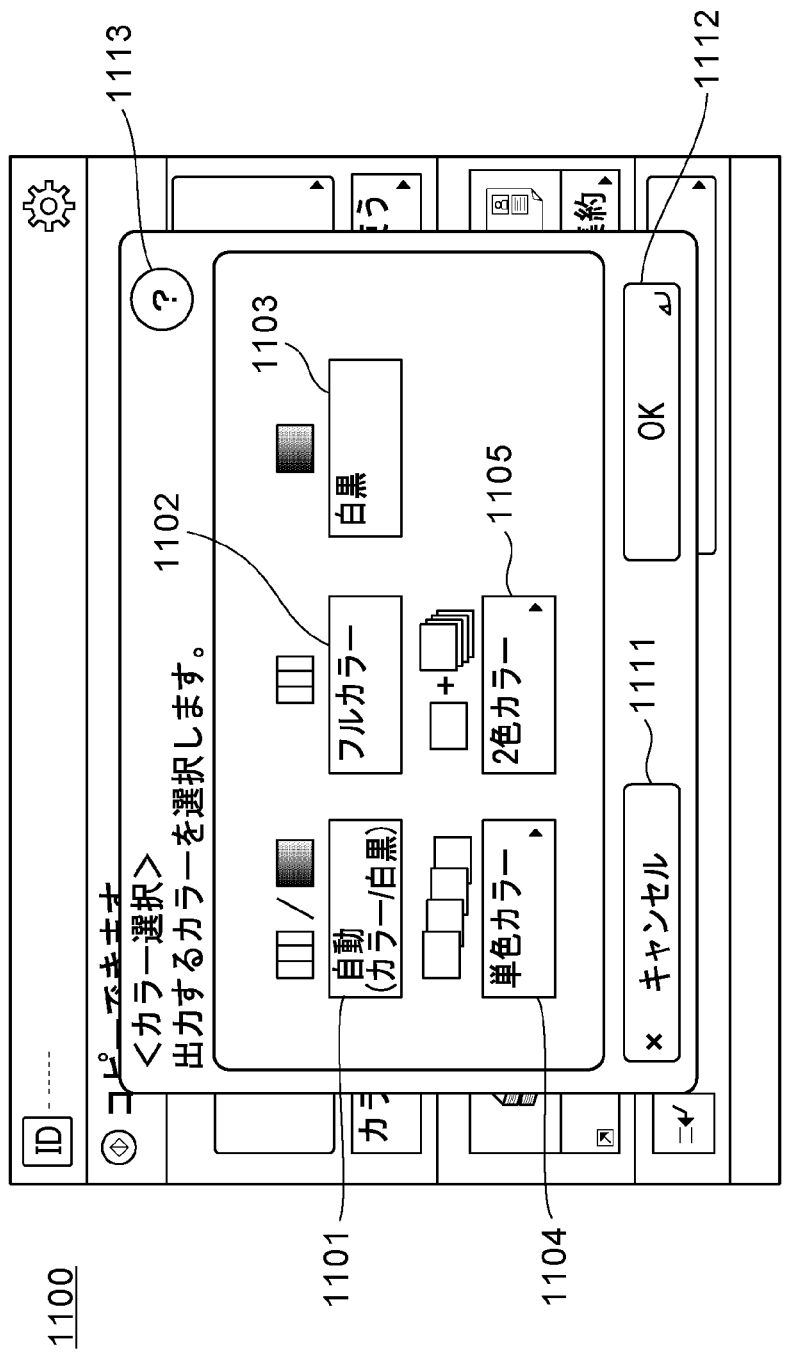
FIG. 12D is a diagram illustrating a screen displayed by a control program of an image forming apparatus, wherein this screen is a Japanese version corresponding to the English version shown in FIG. 12A.
Figure 24:
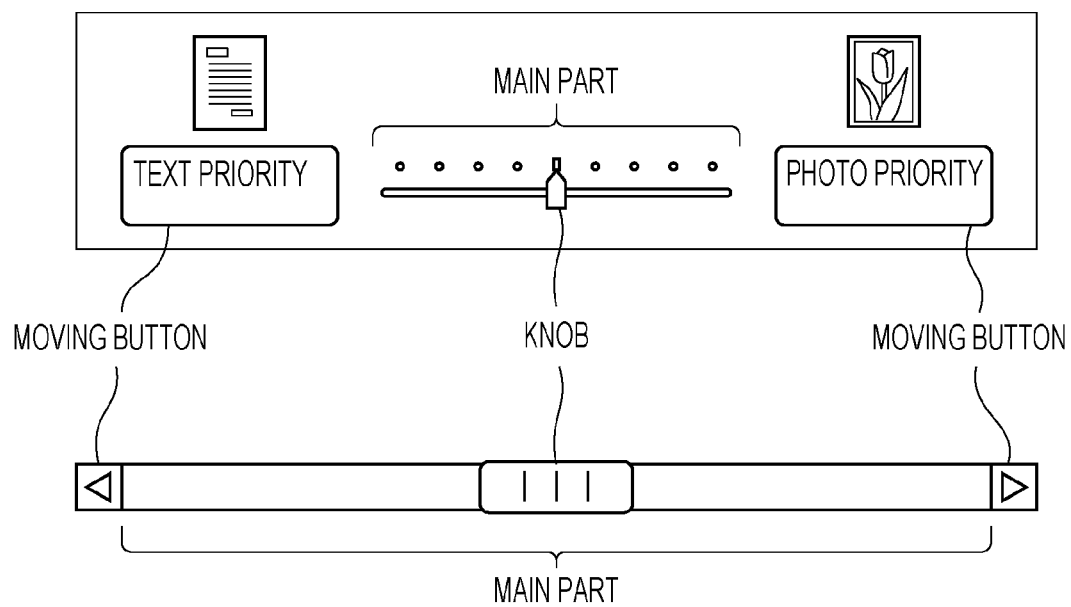
FIG. 24 is a diagram illustrating a slider-shaped operation object.

FIGS. 11A-11H and FIGS. 12A-12D will be used to show specific examples of the processing flow shown in FIG. 10. FIGS. 11A to 11H is another example of the group ID list added to the group ID list shown in FIG. 7B. FIG. 12A illustrates a screen 1100 displayed by the display unit 806, wherein this screen 1100 is an English version translated from a Japanese version shown in FIG. 12D. FIG. 12B illustrates an example of screen control information corresponding to the screen shown in FIG. 12A. The screen control information indicates a correspondence between a user operable UI component displayed on the screen and an action (a content of a screen control and an internal process to be performed) taken in response to the user operable UI component is operated. FIG. 12C shows an example of voice control operation determination information corresponding to the screen 1100 shown in FIG. 12A. FIG. 12D illustrates a screen 1100 displayed by the display unit 806, which is the Japanese version corresponding to the English version shown in FIG. 12A. Note that the voice control operation determination information indicates a correspondence, defined in advance, between a user operable UI component and one or more group ID determination results. Among a plurality of pieces of information described in the table shown in FIG. 12C, "example of phrase uttered by user in operation" and "operation performed on operation panel" are used in explanations given below, and they do not necessarily need to be included in the voice control operation determination information managed by the data management unit 803. In the example shown in FIG. 12A, the screen 1100 includes a slider-shaped operation object. FIG. 24 is a diagram illustrating details of the slider-shaped operation object. In the present embodiment, operation objects such as a slider, a slide bar, a scroll bar, a track bar, and the like are referred to slider-shape operation objects. A setting value and a setting status are indicated by a position of a knob (a scroller, a bubble, a thumb, a scroll box, a knob, an elevator, a quint, a pack, a wiper, a grip, etc.) By pressing a move button (an arrow button) or by dragging a knob, it is possible to move the position of the knob. Both or only one of the moving methods described above may be available. Scale graduations may or may not be provided on the main part of the slide-shape operation object. The examples shown in FIG. 12C are suitable for voice control operations performed by the user viewing the Japanese-version screen 1100 shown in FIG. 12D.

In S1001, the data transmitting and receiving unit 802 receives a group ID determination result generated by the group ID determining unit 707.

In step S1002, screen control information corresponding to the screen displayed by the display unit 806 and voice control operation determination information used by the voice control operation determination unit 807 to determine an operation target are acquired. For example, in the case where the screen shown in FIG. 12A is displayed by the display unit 806 the screen control information shown in FIG. 12B and the voice control operation determination information shown in FIG. 12C, corresponding to the screen shown in FIG. 12A, are acquired.

In S1003, the voice control operation determination unit 807 performs a voice control operation determination process using the group ID determination result received in S1001 and the voice control operation determination information acquired in S1002. In this voice control operation determination process, one of user operable UI components displayed on the screen of the operation panel 509 or one of the hardware keys 201 to 210 provided on the operation panel 509 is determined as an operation target. For example, in a case where the user 106 utters, for example, "auto", the group ID determining unit 707 generates {ID:DRG00008} as a group ID determination result, and the group ID determination result is transmitted. The data transmitting and receiving unit 802 receives this group ID determination result in S1001, and the voice control operation determination unit 807 detects that an "Auto (Color/Black and White)" button 1101 matches the received group ID determination result and thus the voice control operation determination unit 807 determines that the "Auto (Color/Black and White)" button 1101 is the operation target. Other operation targets include the full color button 1102, the black button 1103, single color button 1104 and two colors button 1105 by way of example.

A detailed flow of the voice control operation determination process and an example of the determination process will be described later with reference to FIGS. 14A to 14E and other figures.

In S1004, the display unit 806 updates the content displayed on the screen based on the result of the voice control operation determination process in S1003 and the screen control information acquired in S1002. For example, if the "Automatic (Color/Black and While)" button is determined as an operation target in S1003, the screen is updated based on the screen control information shown in FIG. 12B such that the display unit 806 highlights the button determined as the operation target. Note that in the example shown in FIG. 12C, the voice control operation determination information indicates that when the "Automatic (Color/Black and White)" button displayed on the LCD touch panel 200 of the operation panel 509 is touched, the button is also highlighted.

If the result of the voice control operation determination process in S1003 is a voice instruction to instruct a transition to a slider screen, the display is transitioned to the corresponding slider screen. If the result of the voice control operation determination process in S1003 is an instruction to move the slider as in S1309 to S1315 described later, the process is performed as follows. That is, the displayed screen is modified such that a pointed scale graduation (pointing position) of the slider is changed based on the screen control information shown in FIG. 14B and the voice control operation determination information shown in FIG. 14C. In this process, the pointing position of the slider is changed based on the pointing position of the slider as of the time when it is read in S1306 described later. After the setting by the slider is completed, the setting parameters of the data management unit 803 of the device control program 801 are updated.

In S1005, a determination as to whether to execute the job is made based on the result of the voice control operation determination process in S1003 and the screen control information acquired in S1002. When the job is to be executed, the process proceeds to S1007, but otherwise the process proceeds to S1006. For example, in a case where the "Automatic (Color/Black and White)" button is determined as the operation target in S1003, it is determined that the job execution is not performed because there is no internal process to be performed in FIG. 12B. In a case where it is determined in S1003 that the start key 207 is an operation target, it is determined that the job execution is to be performed because the internal process defined in FIG. 12B in this case is to "start execution of copy job".

In S1006, the data transmitting and receiving unit 802 transmits a screen update notification to the server 102 as shown in S916 described above.

In S1007, the job execution process is performed based on the setting values of the job parameters. In the job execution process, the image forming apparatus 101 executes a series of image forming processes (for example, copying, scanning, printing, etc.). For example, in a case where the execution of a copy job is started when the "Auto (Color/Black and White)" button is in a highlighted state as in the screen shown in FIG. 12A, the job is executed using the set values of "Auto (Color/Black and White)" in this state as the job using the values.

In S1008, the data transmitting and receiving unit 802 transmits a job execution status notification to the server 102 as shown in S946 and S950 described above.

Examples of Interactions Between System and User

Among processes shown in the sequence of FIGS. 9A to 9C and the processing flows shown in FIG. 10 and FIG. 13, FIGS. 17A to 17D more specifically illustrate examples of voice control operations by the user 106 and interactions given by the system in response to the voice control operations. That is, FIGS. 17A to 17D illustrate examples of utterances made by the use 106 as voice control operations and the corresponding on/off status of the LED controlled by the voice control apparatus 100 to indicate the voice processing status. Screens displayed on the operation panel 509 of the image forming apparatus and corresponding voices reproduced as responses by the voice control apparatus 100 are also shown.

First, in the system, the LED is in the off state which shows that the system is in awaiting state, and atop screen is displayed on the operation panel 509 (S1701). In this state, if the user 106 utters the wake word (S1702), then the system starts accepting the voice control operation and turns on the LED to indicate that utterance processing is in progress (S1703). Note that S1702 is a specific example of S905, and S1703 is a specific example of S906 in FIG. 9A. After the wake word, if the user 106 utters "I want to make a copy" (S1704), then the system blinks the LED to indicate that response processing is in progress (S1705), and the system displays the copy top screen (S1706). The system then reproduces a response voice saying "copy screen is displayed" (S1707), and again turns on the LED to prompt the user 106 to make a next utterance (S1708). Note that S1704, S1705, S1706, S1707 and S1708 are respectively specific examples of S907, S908, S915, S919, and S920 shown in FIG. 9A.

Next, if the user 106 utters "document type" (S1709), then the system blinks the LED (S1710) and displays a document typesetting screen (S1711). The system then reproduces a response voice saying "the type of document is allowed to be changed" (S1712), and turns on the LED (S1713). Note that S1709, S1710, S1711, S1712 and S1713 are respectively specific examples of S921, S922, S915, S924, and S925 shown in FIG. 9A or 9B.

Next, when the user 106 utters "level adjustment" (S1714), the system blinks the LED (S1715) and displays a level adjustment setting screen (S1716). The system then reproduces a response voice saying "level adjustment is allowed to be changed" (S1717), and turns on the LED (S1718). Note that S1714, S1715, S1716, S1717 and S1718 are respectively specific examples of S921, S922, S915, S924, and S925 shown in FIG. 9A or 9B.

Next, when the user 106 utters "select the photograph priority button three times" (S1719), the system blinks the LED (S1720) and moves the level adjustment (that is, the slider) to the right by three positions (S1721). The system then reproduces a response voice saying "level adjustment has been changed" (S1722), and turns on the LED (S1723). Details of the operation of the slider will be described later with reference to FIG. 13. Note that S1719, S1720, S1721, S1722 and S1723 are respectively specific examples of S926, S927, S915, S929, and S925 shown in FIG. 9A or 9B.

Next, when the user 106 utters "OK" (S1724), the system blinks the LED (S1725), and displays a document type setting screen modified so as to reflect the level adjustment (S1726). The system then reproduces a response voice saying "setting is confirmed" (S1727), and turns on the LED (S1728). Note that S1724, S1725, S1726, S1727 and S1728 are respectively specific examples of S931, S932, S915, S934, and S935 shown in FIG. 9A or 9B.

Next, when the user 106 utters "copy start" (S1729), the system blinks the LED (S1730) and executes the copy job. When the execution of the copy job is started, the system displays a screen indicating that the copy job is being executed (S1732), and reproduces a response voice saying "copying is starting" (S1731). When the execution of the copy job is completed, the system displays a screen indicating that the copy job execution is ended and reproduces a final response voice saying "copying is completed" (S1733). Furthermore, the system turns off the LED to indicate that the voice reception is disabled (S1734). Note that S1729. S1730. S1732, S1731, S1733, and S1734 are respectively specific examples of S936, S937. S944, S949, S954, and S955 shown in FIG. 9C.

Voice Control of Slider

According to the present embodiment, it is allowed to control the slider in many ways by voice operation control in S1719 to S1721 described above as examples. FIGS. 22A to 22F are diagrams illustrating specific examples of operations of the slider controlled by voice.

Figure 22A:
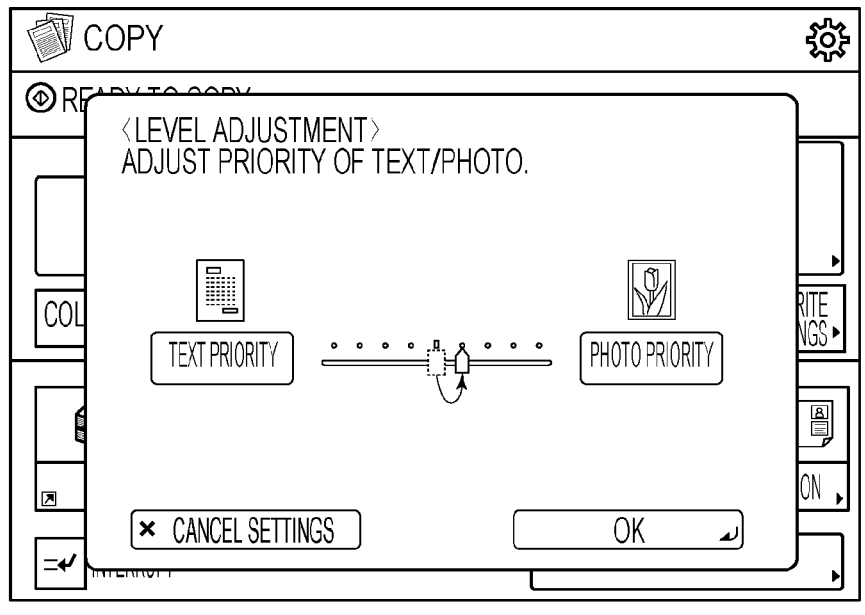
FIGS. 22A to 22F are diagrams illustrating examples of manners in which a slider is moved.

FIG. 22A illustrates an example of a manner in which the pointing position of the slider is moved to right from the center by one position in response to an utterance "Move slider to right". In a case where it is allowed to perform operations on the screen similar to those shown in FIG. 12A, operations are controlled by voice including a name of a button such as "Select photo priority button one". In the present embodiment, in addition to such a normal voice operation control, it is allowed to perform screen-specific voice operation controls (to move the slider according to a voice indicating a direction such as "right", "left", or the like).

Figure 22B:
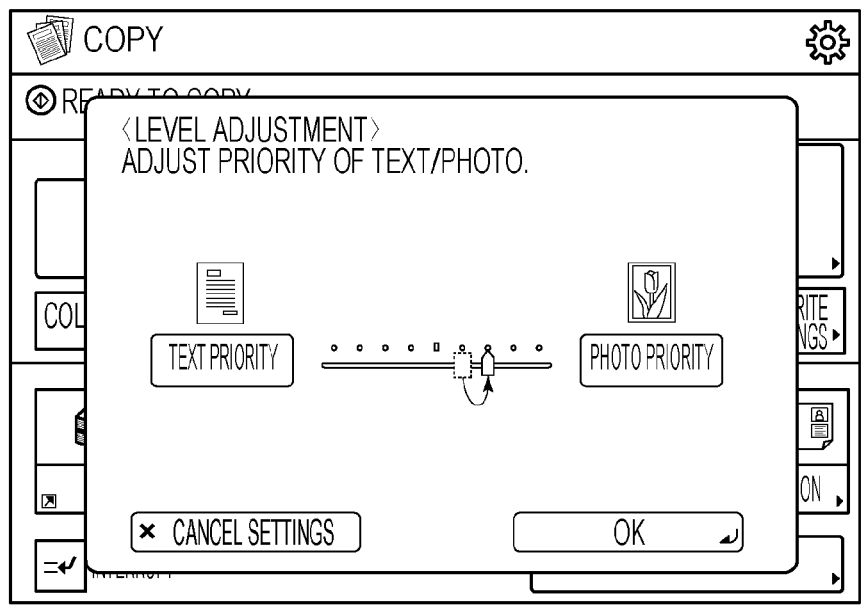

Further, on this screen, the same voice operation can be repeated a plurality of times. FIG. 22B shows a state where the slider has bee further moved from the position shown in FIG. 22A. In this embodiment, because the previous position of the slider is memorized, the second-time utterance of "Move slider to right" causes the slider to move to the position which is two positions away to right from the center position.

Utterances "Move slider to right" and "Move slider to right end" may be distinguished. The voice operation control by the utterance "Move slider to right end" causes the slide to move to the right end (four positions away from the center) as shown in FIG. 22D. Furthermore, voice operation controls by an utterance such as "Move slider to center", "Move slider to left end" or the like may be allowed. However, since the operation of the slider that is not based on the current position of the slider is not the subject matter of the present embodiment, a further detailed description thereof is omitted.

In a case where the pointing position of the slider is at the right end of the sliding range as in the case in FIG. 22D, the slider cannot be moved further to the right. Therefore, when a voice operation control is performed to further move the slider to right in the state shown in FIG. 22D, it is determined that the slider cannot be moved, and the pointing position is not moved. In this case, temporary displaying (for example, a pop-up display) may be performed to indicate that the requested movement is not allowed, and/or when the synthesized voice data is reproduced in S929 in FIG. 9B, the voice may tell that the requested movement of the slider is not allowed.

Figure 22C:
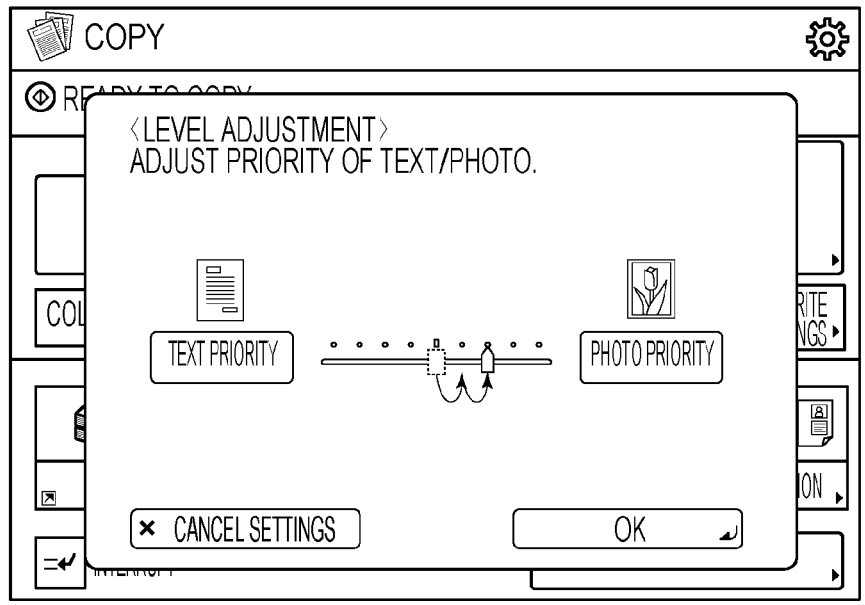
Figure 22D:
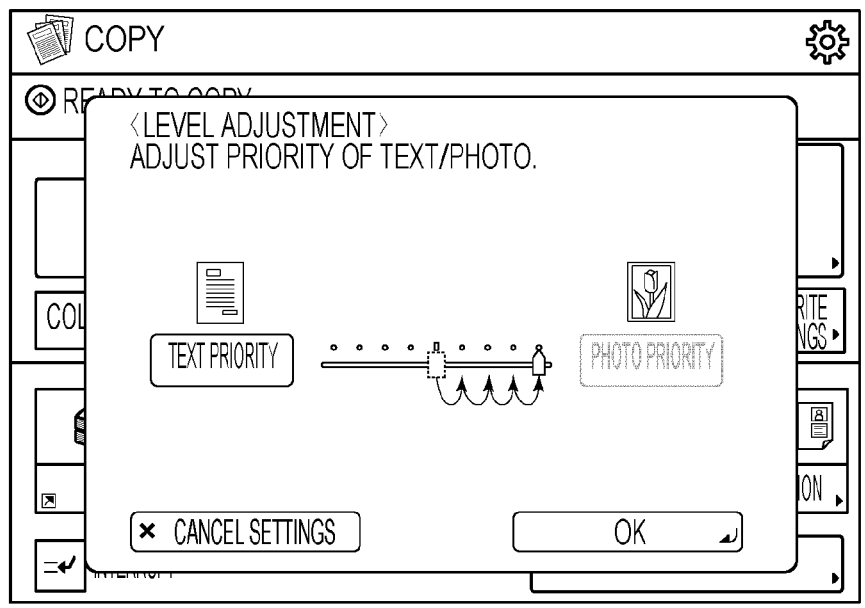

FIG. 22C illustrates an example of a manner in which the pointing position is moved to the right from the center position by two positions in response to an utterance of "Move slider to right by two" or "Move slider slightly to the right". The operability can be improved by enabling the slider to be moved a plurality of times by one utterance as described above. Allowing ambiguous expression such as "slightly" to be used in voice operation control makes it possible to provide an intuitive operation environment.

Figure 22E:
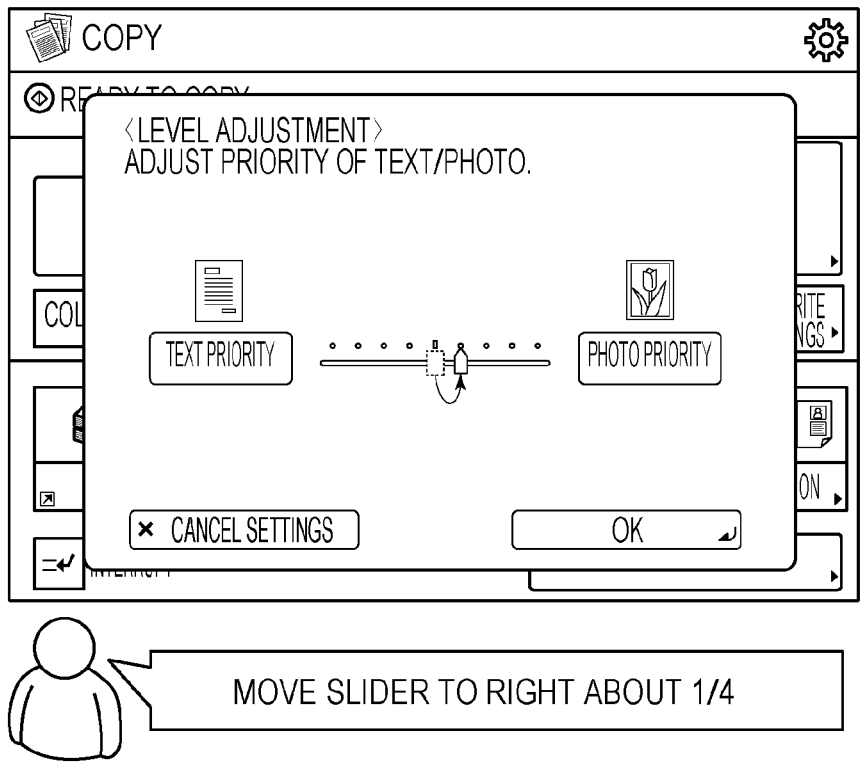
Figure 22F:
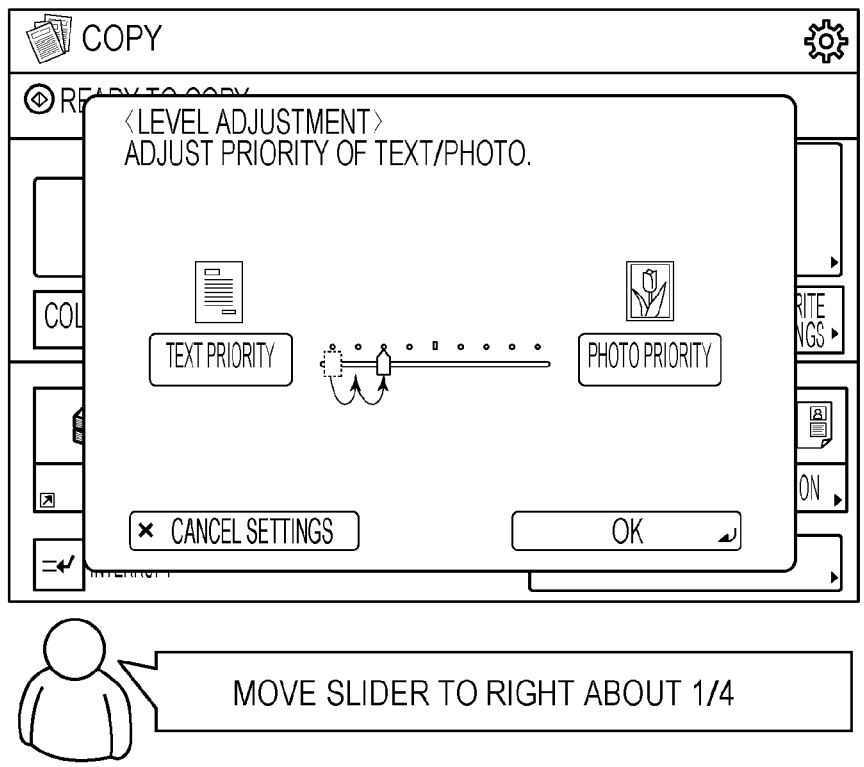

FIGS. 22E and 22F each illustrate a manner in which the pointing position is moved in response to an utterance "Move slider to the right about ¼". By allowing it to use a ratio expression in voice operation control as described above, it becomes possible to provide more flexible voice operation control. When the ratio expression is used as described above, the amount of movement in units of scale graduations varies depending on the current pointing position. In the example shown in FIG. 22E, the current pointing position is at the center and there are four remaining scale graduations to the right. Thus, the utterance "Move slider to the right by about ¼" causes the slider to move to the right by one scale graduation. In the example shown in FIG. 22F, the current pointing position is at the left end and there are eight remaining scale graduations to the right. Thus, the utterance "Move slider to the right by about ¼" causes the slider to move to the right by two scale graduations.

Processing Flow of Voice Control Operation Determination Unit

FIG. 13 is a flow chart illustrating an outline of processing of the voice control operation determination unit 807 of the image forming apparatus 101. The processing shown in FIG. 13 corresponds to the processing in S1003 in FIG. 10 and S914 and S943 in FIGS. 9A and 9C. FIGS. 14A to 14E illustrate an example of a screen on which an operation instructed to be performed by a voice is determined in the voice control operation determination process shown in FIG. 13, and examples of conventional operations (by pressing a button or a hardware key provided on the operation panel) and operations by the voice operation control. The processing flow of the voice control operation determination unit 807 is described below with reference to FIG. 13 and FIGS. 14A to 14E.

Figure 14E:
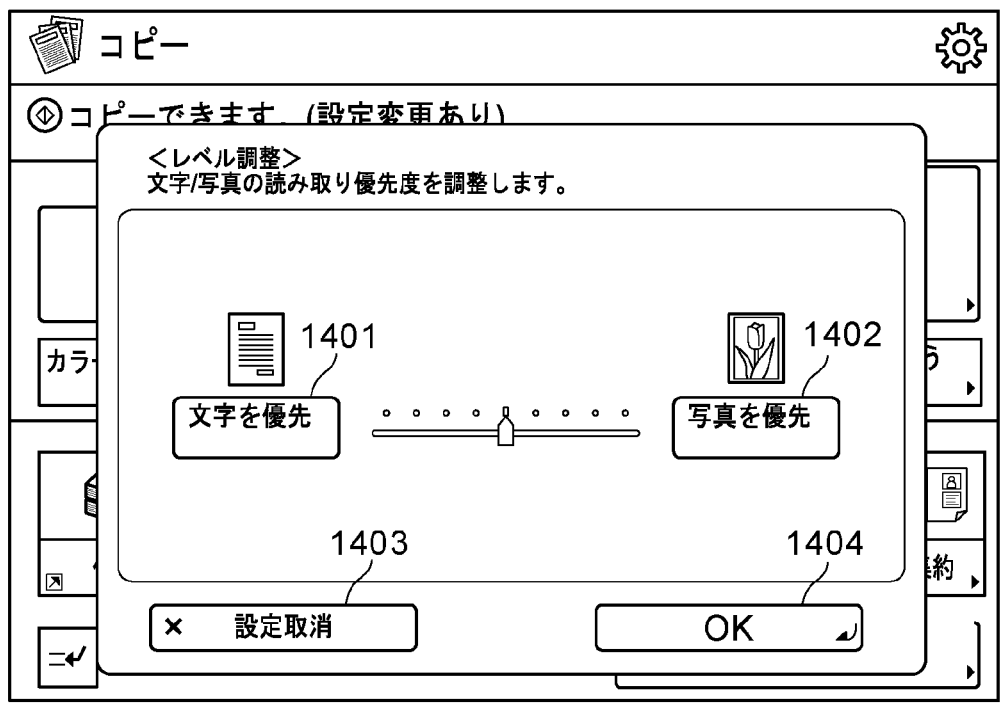
FIG. 14E is a diagram illustrating an example of a screen (a Japanese version corresponding to the English version shown in FIG. 14A) for use in the voice control operation determination process for the case where the screen includes one slider.

First, FIGS. 14A to 14E are referred to. FIG. 14A illustrates an example of a screen (an English version) for use in setting priority assigned to text/photo in scanning in copy level adjustment of the image forming apparatus 101. FIG. 14E shows an example of a Japanese version of a screen from which the English version shown in FIG. 14A is translated.

Buttons 1401 and 1402 are slider buttons for adjusting the degrees of the priority assigned to text and photos. When these buttons are operated, the slider provided in the center of screen is moved. The current slider position is at the center of a slider bar, and is moved to the left or right step-wisely when the right slider button or the left slider button is pressed. A button 1403 is a button for canceling the settings, and a button 1404 is an OK button for reflecting the settings. FIG. 14B shows an example of screen control information related to the screen shown in FIG. 14A. FIGS. 14C and 14D show an example of voice control operation determination information related to the screen shown in FIG. 14A. Rows 1405 to 1416 in FIGS. 14C and 14D represent row numbers of the voice control operation determination information.

The processing flow shown in FIG. 13 described below with reference to the screen illustrated in FIG. 14A and examples of the screen control information and the voice control operation determination information shown in FIGS. 14B to 14D.

In S1301, the voice control operation determination unit 807 performs matching between the group ID determination result received in S1001 in FIG. 10 and the group ID information of the buttons included in the voice control operation determination information acquired in S1002. For example, when the screen shown in FIG. 14A is displayed, if the group ID determination result is {ID:NUM00003, POS00016, FIN00011} (which is obtained when the user 106 utters "Move slide to left by three"), then matching is performed between the group ID determination result and the group ID information in rows 1405 to 1414 of the voice control operation determination information shown in FIGS. 14C and 14D. As a result, the group ID "NUM00003+POS00016+FIN00011" in the row 1406 is hit, and the matching is successful.

Note that in these examples shown in FIGS. 14C and 14D, it is assumed that the user is viewing the Japanese version of screen shown in FIG. 14E and utters a voice for voice operation control on the Japanese version of screen shown in FIG. 14E.

In S1302, the voice control operation determination unit 807 determines whether the matching in S1301 is successful or not. In a case where the matching is successful, the process proceeds to S1306, but otherwise the process proceeds to S1303.

In S1303, the voice control operation determination unit 807 performs matching between the group ID determination result received in S1001 in FIG. 10 and the group ID information of the hardware keys included in the voice control operation determination information acquired in S1002. For example, on the screen shown in FIG. 14A, if group ID determination result in the server 102 is {ID: OPR00011} (which is obtained when the user 106 utters "Start"), matching is performed between the ID determination result and the group ID information of the hardware keys described in the voice control operation determination information. In this case, the group ID "OPR00011" is hit in the voice control operation determination information, and the matching is successful.

In S1304, the voice control operation determination unit 807 determines whether the matching in S1303 is successful. If the matching is successful, the process proceeds to S1305, but otherwise the voice control operation determination process is ended.

In S1305, the voice control operation determination unit 807 determines that the voice operation control instructs to operate the hardware key that was hit in the matching process in S1303, and the voice control operation determination unit 807 ends the voice control operation determination process. For example, when "Start" with the group ID information "OPR00011" is hit, it is determined that the start key 207 is instructed to be operated, and the voice control operation determination process is ended.

In S1306, the voice control operation determination unit 807 determines whether the operation target indicated in the matching result in S1301 is a slider button. For example, in a case where "Select text priority" is uttered, the row 1405 is hit in the matching process with the rows 1405 to 1412 of the voice control operation determination information in FIGS. 14C and 14D. The "number" column in the row 1405 has a value of 1401, and thus it is determined from the screen control information in FIG. 14B that a slider button is the operation target.

In a case where it is determined that the operation target is a slider button, the pointing position of the slider to be operated is read. In the example shown in FIG. 14A, the pointing position of the slider is at "0" (values on the right side are positive and values on the left side are negative). The movement of the slider on the scale is performed based on the read pointing position. In a case where the matched operation target is the slider button, the process proceeds to S1308, but otherwise the process proceeds to S1307.

In S1307, the voice control operation determination unit 807 determines that the result of the matching in S1301 indicates that the voice operation control instructs to operate a usual-type button on the operation screen, and ends the voice control operation determination process. For example, in a case where "OK" with the group ID "OPR00010" is matched, 1404 is described in the "number" column in the row 1414 of the voice control operation determination information in FIG. 14D, and thus it is determined that the voice operation control instructs to operate an "OK" button, which is one of usual-type buttons.

In step S1308, the voice control operation determination unit 807 determines whether the group ID determination result includes a group ID specifying the number of times an operation target is to be operated. For example, in a case where the group ID determination result received in S1001 in FIG. 10 includes {ID:NUM00003} which means "three times", it is determined that the group ID determination result includes a group ID specifying the number of times. The group IDs indicating the numbers correspond to NUM00001 to NUM99999 in FIG. 7B. However, the adjustment range of the slider is at most eight. Therefore, the group ID for specifying the number of times is set in the range up to the maximum adjustment width of the slider (in this specific case, NUM00001 to NUM00008). If a group ID specifying the number of times is included, the process proceeds to S1310, but otherwise the process proceeds to S1309.

In S1309, the voice control operation determination unit 807 determines that the result of the matching in S1301 specifies a single voice operation on a slider button on the operation screen, and ends the voice control operation determination process. For example, in a case where the row 1405 and the row 1409 in FIG. 14C are matched as group ID information, it is determined that the voice operation control instructs to operate a slider button once (that is, the slider button 1401 or 1402 is to be operated once).

In S1310, the voice control operation determination unit 807 determines whether the group ID determined, in S1308, as specifying the number of times indicates a specific value for the number of times. For example, if one of NUM00001 to NUM00008 is included in the group ID determination result, it is determined that a specific value for the number is specified. If it is a specific value is specific, the process proceeds to S1311, but otherwise the process proceeds to S1312.

In S1311, the voice control operation determination unit 807 determines that the result of the matching in step S1301 indicates a voice control operation instructing to operate the slider button on the operation screen by a specified number of times, and ends the voice control operation determination process. For example, in a case where the row 1406 and the row 1410 in FIG. 14C are matched as the group ID information (for example, the row 106 is matched when the user 106 utters "Select text priority twice"), it is determined that the voice operation control instructs to operate the slider button the specified number of times (that is, to operate the slider button 1401 or 1402 the specified number of times).

In S1312, the voice control operation determination unit 807 determines whether in the group ID determined in S1308 as including information specifying the number of times, the number of times is described such that a special expression is used or a calculation is necessary. The special number expression is, for example, "a small amount", "slightly", and the like, and {DRG00018} in the group ID shown in FIG. 11D is an example such an expression. The special number expression is not limited to these example, and may include expressions that vaguely indicate the amount or the number (such as "almost", "most", "somewhat"). The calculation of the number of times is necessary, for example, in a case where a fractional expression such as "⅓" or the like is used as with {FRA00103} of the group ID in FIG. 11H.

In S1313, the voice control operation determination unit 807 determines that the result of the matching in step S1301 indicates a voice control operation instructing to operate the slider button on the operation screen by a particular number of times specified in the special expression, and ends the voice control operation determination process. For example, in a case where the rows 1407 and 1411 in FIG. 14C are matched as group ID information, it is determined that the number of times specified by the voice control operation described in the group ID {DGR00018} is to be interpreted such the slider button is to be operated twice (that is, the slider button 1401 or 1402 is pressed twice). Here, "slightly" associated with the group ID {DGR00018} is regarded as "twice". However, this value is not limited to "twice" but it can be changed by performing setting.

In S1314, the voice control operation determination unit 807 calculates the number of times. For example, in a case where the group ID information is {FRG00103, POS00012} (in which "⅓" and "right" are specified), the number of movements calculated from the current position of the slider and the number of remaining scale graduations to the right. More specifically, in a case where the current position is at the center of the slider bar as in the example shown in FIG. 14A, the number of remaining scale graduations to the right is 4, and thus 4×⅓=1.333≈1, which means that the number of movements is to be determined as 1. In this way, the number of movements is calculated from the current position of the bar of the slider, the number of remaining graduations in the direction in which the bar is to be moved, and the fractional expression described in the group ID information.

In S1315, the voice control operation determination unit 807 determines that the result of the matching in step S1301 indicates that the voice control operation instructs to operate the slider button on the operation screen as many times as the number of times calculated in S1314, and ends the voice control operation determination process. For example, in a case where the rows 1407 and 1411 in FIG. 14C are matched as group ID information, it is determined that the group ID {DGR00018} specifies "twice" as the number of times the operation is to be performed and thus it is determined that the voice control operation specified to press the slider button twice (that is, the slider button 1401 or 1402 is to be pressed twice). Here, "slightly" associated with the group ID {DGR00018} is regarded as "twice". However, this value is not limited to "twice" but it can be changed by performing setting.

Supplement

As described above, according to the present embodiment, it is possible to provide an information processing system that allows a user to perform a voice control operation depending on a configuration of a setting screen of an apparatus. In particular, it is possible to perform a voice control operation on a setting screen including a slider-shaped operation object. According to the present embodiment, it is possible to perform a voice control operation without depending on a name of a button a setting screen including a slider-shaped operation object. In the present embodiment, it is possible to perform a voice control operation to change a setting taking into account a current setting state. In this embodiment, the amount of movement of the slider can be specified by a numerical value (numerical information). In the present embodiment, the amount of movement of the slider can be specified by a ratio (ratio information). As described above, it is possible to flexibly control operations by a voice, and thus an excellent usability can be achieved.

Second Embodiment

The first embodiment has been described above, by way of example, for the case where one slider-shaped operation object is provided on setting screen. In a second embodiment described below, the embodiment is described for a case where a plurality of slider-shaped operation objects are provided on a setting screen.

Examples of Interactions Between System and User

Among processes shown in the sequence of FIGS. 9A to 9C and the processing flows shown in FIG. 10 and FIGS. 15A-15B, FIGS. 17A to 17D more specifically illustrate examples of voice control operations by the user 106 and interactions given by the system in response to the voice control operations. That is, FIGS. 18A to 18D illustrate examples of utterances for voice control operations by the user 106, and the on/off status of the LED controlled by the system to indicate corresponding voice processing statuses of the voice control apparatus 100. Screens displayed on the operation panel 509 of the image forming apparatus and corresponding voices reproduced as responses by the voice control apparatus 100 are also shown.

First, in the system, the LED is in the off state which shows that the system is in awaiting state, and atop screen is displayed on the operation panel 509 (S1801). In this state, if the user 106 utters the wake word (S1802), then the system starts accepting the voice control operation and turns on the LED to indicate that utterance processing is in progress (S1803). Note that S1802 is a specific example of S905, and S1803 is a specific example of S906 in FIG. 9A. After the wake word, if the user 106 utters "I want to make a copy" (S1804), then the system blinks the LED to indicate that response processing is in progress (S1805), and the system displays the copy top screen (S1806). The system then reproduces a response voice saying "copy screen is displayed" (S1807), and again turns on the LED to prompt the user 106 to make a next utterance (S1808). Note that S1804, S1805, S1806, S1807 and S1808 are respectively specific examples of S907, S908, S915, S919, and S920 shown in FIG. 9A.

Next, if the user 106 utters "other functions" (S1809), then the system blinks the LED (S1810) and displays an other-function screen (S1811). The system then reproduces a response voice saying "other function 1 has been displayed" (S1812), and turns on the LED (S1813). Note that S1809, S1810, S1811, S1812 and S1813 are respectively specific examples of S921, S922, S915, S924, and S925 shown in FIG. 9A or 9B.

Next, when the user 106 utters "Next page" (S1814), the system blinks the LED (S1815) and displays a second other-function screen (S1816). The system then reproduces a response voice saying "other function 2 has been displayed" (S1817), and turns on the LED (S1818). Note that S1814, S1815, S1816, S1817 and S1818 are respectively specific examples of S921, S922, S915, S924, and S925 shown in FIG. 9A or 9B.

Next, when the user 106 utters "Color adjustment" (S1919), the system blinks the LED (S1820) and displays a color adjustment setting screen (S1821). The system then reproduces a response voice saying "Color adjustment is allowed to be changed" (S1822), and turns on the LED (S1823). Note that S1819 is a specific example of S921, S1820 is S922, S1821 is S915, S1822 is S924, and S1823 is a specific example of S925 in FIG. 9A or 9B.

Next, when the user 106 utters "Saturation adjustment" (S1824), the system blinks the LED (S1825) and displays a saturation adjustment setting screen (S1826). The system then reproduces a response voice saying "Saturation adjustment is allowed to be changed" (S1827), and turns on the LED (S1828). Note that S1824 is a specific example of 921 in FIG. 9A, S1825 is S922, S1826 is S915, S1827 is S924, and S1828 is a specific example of S925 in FIG. 9A or 9B.

Next, when the user 106 utters "Increase yellow and cyan by two" (S1829), the system blinks the LED (S1830) and moves the saturation adjustor (that is, the sliders respectively associated with yellow and cyan) to the right by two (S1831). The system then reproduces a response sound saying "Saturation adjustment has been changed" (S1832), and turns on the LED (S1833). Details of the operation of the slider will be described later with reference to FIGS. 15A-15B. Note that S1829 is a specific example of S926, S1830 is 927, S1831 is S915, S1832 is S929, and S1833 is a specific example of S925 in FIG. 9A or 9B.

Next, when the user 106 utters "Reduce cyan and magenta by three" (S1834), the system blinks the LED (S1835) and moves the saturation adjusters (that is, the sliders respective for cyan and magenta) to the right by three positions (S1836). The system then reproduces a response voice saying "Saturation adjustment has been changed" (S1837) and turns on the LED (S1838). Note that S1834 is a specific example of S926, S1835 is S927, S1836 is S915, S1837 is S929, and S1838 is a specific example of S925 in FIG. 9A or 9B.

Next, when the user 106 utters "OK" (S1839), the system blinks the LED (S1840) and displays a saturation adjustment setting screen modified so as to reflect the saturation adjustment (S1841). The system then reproduces a response voice saying "Setting is fixed" (S1842), and turns on the LED (S1843). S1839 is a specific example of S931, S1840 is S932, S1841 is S915, S1842 is S934, and S1843 is a specific example of S935 in FIG. 9A, 9B or 9C.

Next, when the user 106 utters "Copy start" (S1844), the system blinks the LED (S1845) and executes the copy job. When the execution of the copy job is started, the system displays a screen indicating that the copy job is being executed (S1846), and reproduces a response voice saying "copying is starting" (S1847). When the execution of the copy job is completed, the system displays a screen indicating that the copy job execution is ended and reproduces a final response voice saying "copying is completed" (S1848). Furthermore, the system turns off the LED to indicate that the voice reception is disabled (S1849). Note that S1844, S1845, S1847, S1846, S1847, and S1848 are respectively specific examples of S936, S937, S944, S949, S954, and S955 shown in FIG. 9C.

Examples of Operations for a Case where there are a Plurality of Sliders

In the present embodiment, the voice control of the slider exemplified in S1829 to S1831 and S1834 to S1836 can be performed in various manners. FIGS. 23A to 23D are diagrams illustrating specific examples of operations of sliders controlled by voice.

FIG. 23A illustrates an example of a manner in which the pointing position of the slider for yellow is moved to right from the center by one position in response to an utterance "Increase yellow". In the present embodiment, in the case where the setting screen includes a plurality of sliders, it is possible to specify a particular slider by using a name (a color in the present example) identifying the slider, and thus it is possible to move only the particular slider of the plurality of sliders. To specify the yellow slider, an utterance of "yellow" and an utterance of "yellow slider" may both be allowed. Instead of uttering "high", it may be allowed to utter "to right".

FIG. 23B illustrates a manner of moving sliders such that by uttering "increase all colors", all sliders (sliders of yellow, green, cyan, blue, magenta, and red) on the screen are moved to right by one position from their current pointing positions. As described above, the present embodiment provides an excellent operability in operating a plurality of sliders at the same time.

Figure 23C:
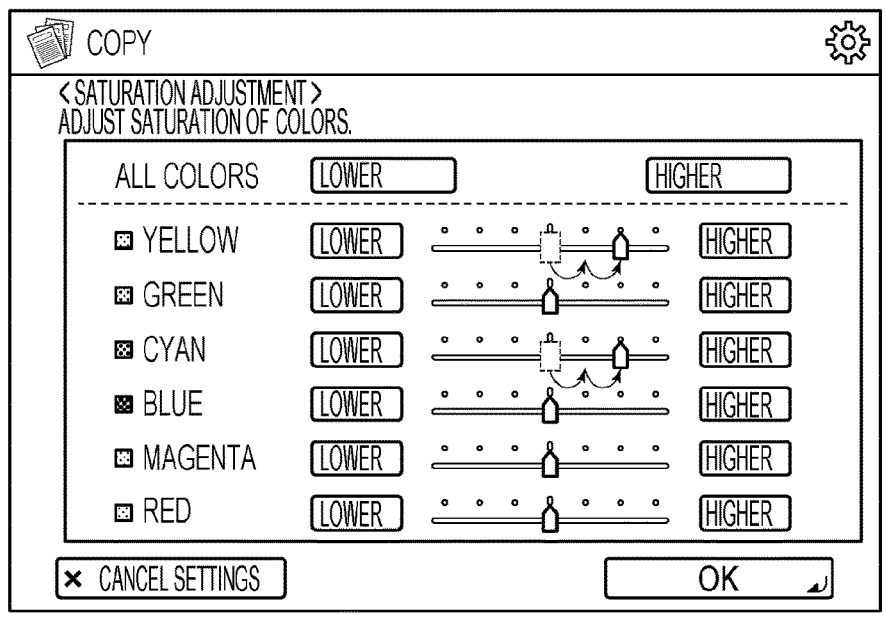

FIG. 23C illustrates a manner of moving sliders such that by uttering "Increase yellow and cyan by two", sliders of yellow and cyan are moved to right by two positions from their current pointing positions. As described above, according to the present embodiment, it is possible to operate two or more sliders of many sliders at a time.

Figure 23D:
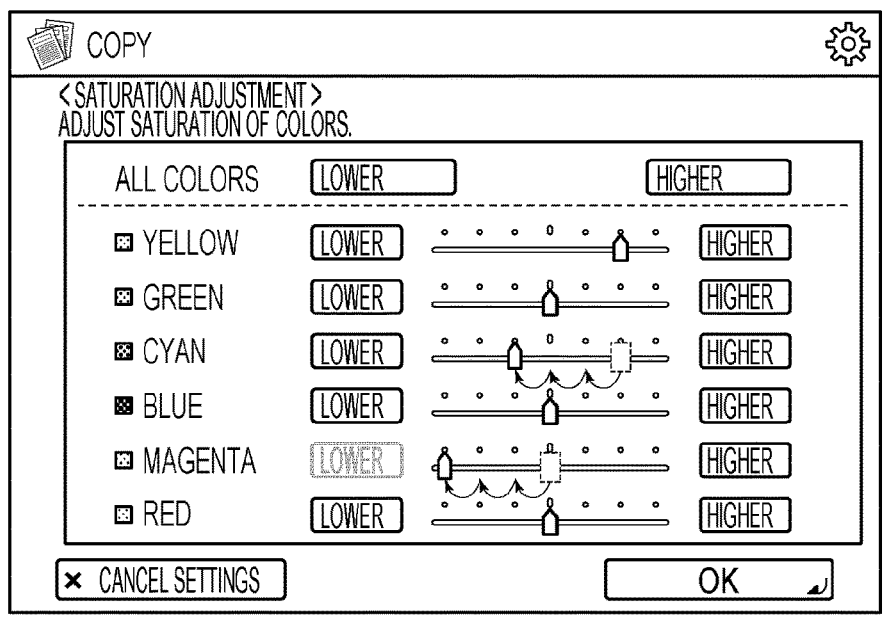

FIG. 23D illustrates a manner of moving sliders such that by uttering "Reduce cyan and magenta by three", sliders of cyan and magenta are moved to left by three positions from their current pointing positions. That is, the slider of cyan is moved from the current position, that is, at two graduations away to the right from the center position, to a graduation on the left side directly adjacent to the center position, while the slider of magenta is moved to the left by three graduations from the center position. As described above, according to the present embodiment, it is possible to move two or more slides among many sliders at the same time taking into accounts the their current positions.

Figure 15A:
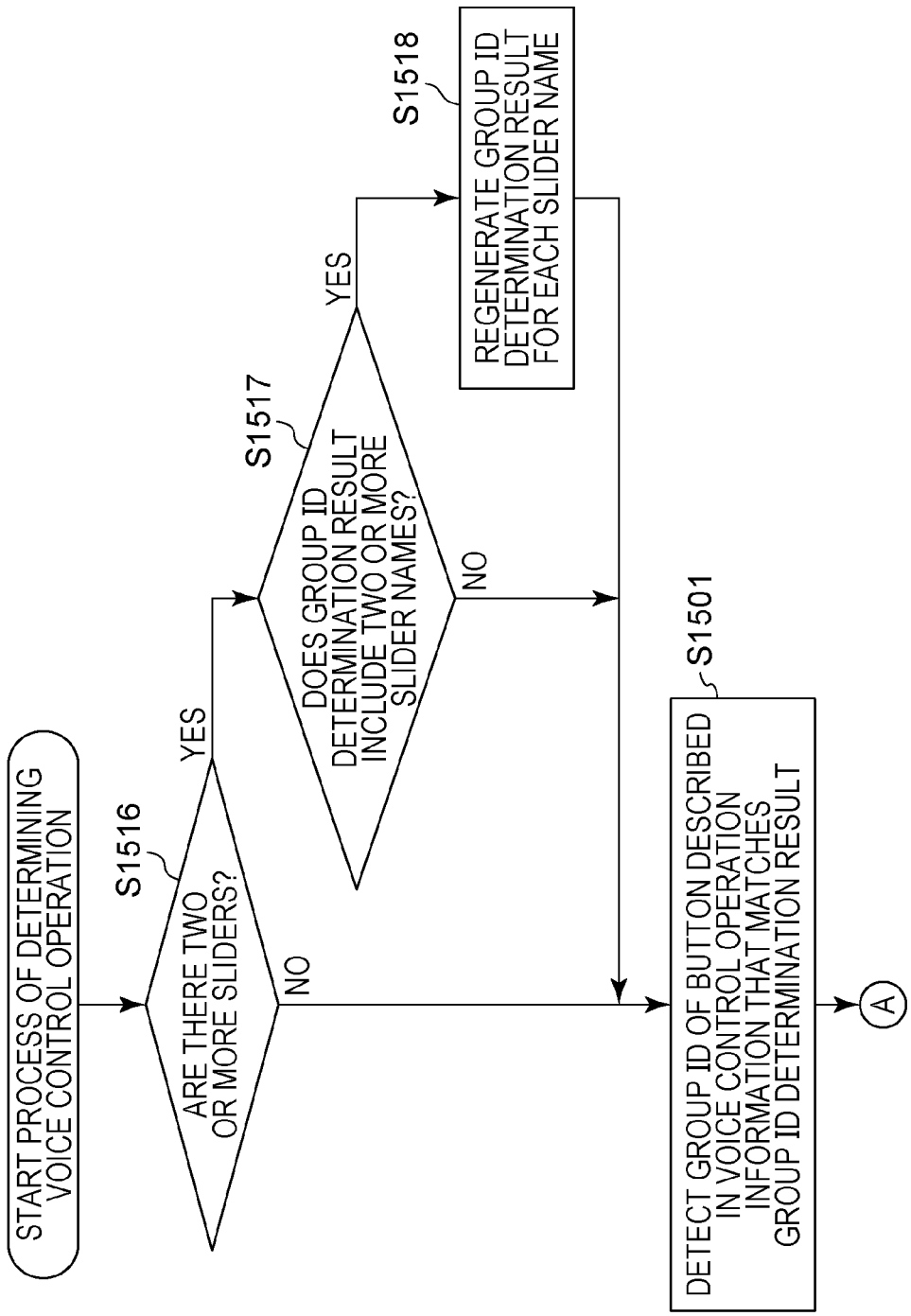

Processing Flow of Voice Control Operation Determination Unit when there are a Plurality of Sliders FIGS. 15A and 15B are flow charts illustrating an outline of processing of the voice control operation determination unit 807 of the image forming apparatus 101 for a case where the image forming apparatus 101 includes a plurality of sliders. The processing shown in FIGS. 15A and 15B corresponds to S1003 in FIG. 10, S915 shown in FIG. 9A, and S943 shown in FIG. 9C. FIGS. 16A to 16E illustrate examples of screens for a case where there are a plurality of sliders to be operated by a voice control operation wherein the operation on the sliders are determined via the voice control operation determination process shown in in FIGS. 15A to 15B A processing flow of the voice control operation determination unit 807 is described below for a case where there are a plurality of sliders on the screen with reference to FIGS. 15A to 15B and FIGS. 16A to 16E.

Figure 16A:
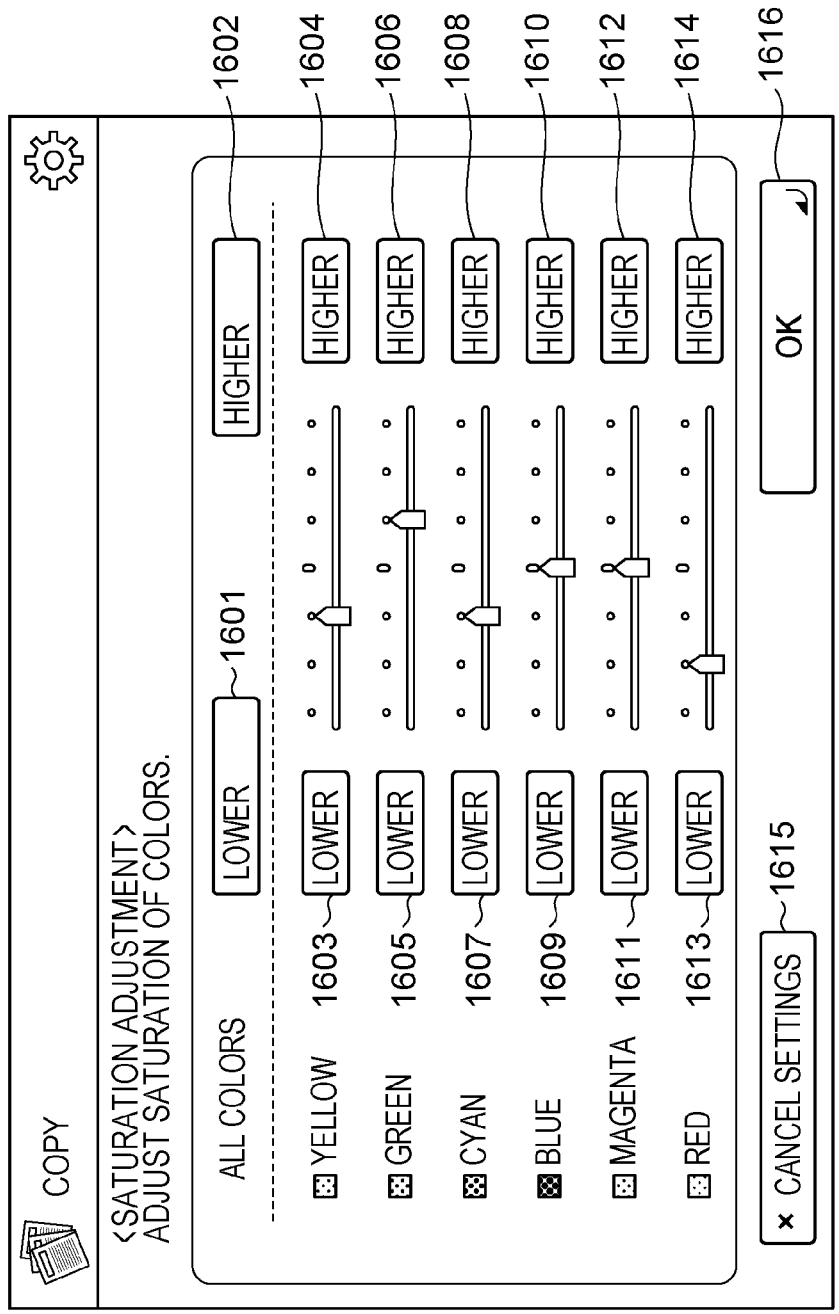
FIG. 16A is a diagram illustrates an example of a screen (an English version) for use in a voice control operation determination process for a case where the screen includes a plurality of sliders.
Figure 16E:
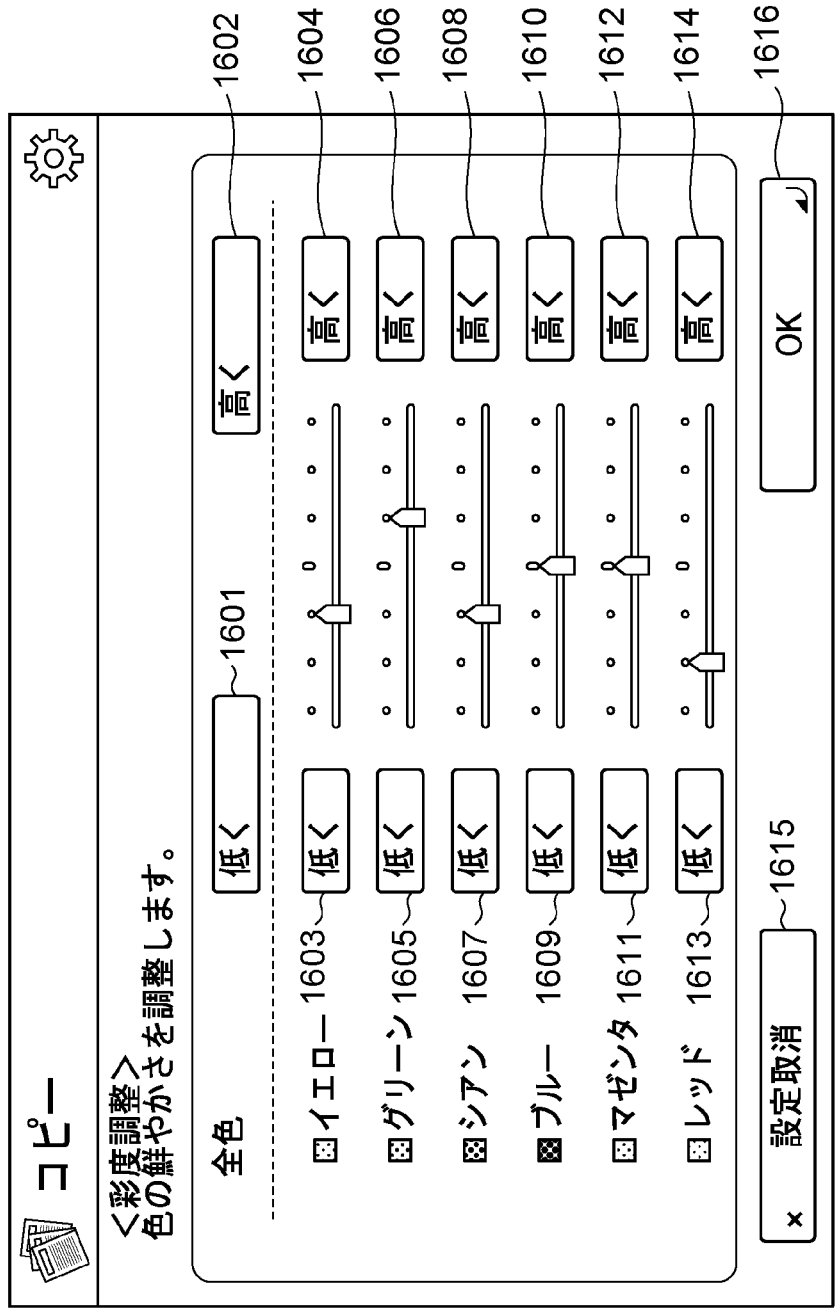
FIG. 16E is a diagram illustrates an example of a screen (a Japanese version corresponding to the English version shown in FIG. 16A) for use in the voice control operation determination process for the case where the screen includes a plurality of sliders.

First, FIGS. 16A to 16E are explained. FIG. 16A illustrates an example of a screen (an English version) for adjusting saturation of the image forming apparatus 101, and FIG. 16E illustrates an example of a screen (a Japanese version corresponding to the English version shown in FIG. 16A) for adjusting the saturation of the image forming apparatus 101. Buttons 1601 to 1614 are slider buttons for adjusting the saturation level, that is, buttons for operating corresponding sliders located in the center of the screen. A button 1615 is a button for canceling the settings, and a button 1616 is an OK button for reflecting the settings. FIG. 16B illustrates an example of screen control information on the screen shown in FIG. 16A. FIGS. 16C and 16D illustrates an example of voice control operation determination information associated with the screen shown in FIG. 16A. Rows 1617 to 1634 in FIGS. 16C and 16D indicate rows of the voice control operation determination information. Note that in these examples shown in FIGS. 16C and 16D, it is assumed that the user is viewing the Japanese version of screen shown in FIG. 16E and utters a voice for voice operation control on the Japanese version of screen shown in FIG. 16E.

The processing is described below with reference to the processing flow shown in FIGS. 15A and 15B, the screen shown in FIG. 16A, the screen control information shown in FIGS. 16B to 16C. S1501 to S1515 are similar to S1301 to S1315 shown in FIG. 13, and thus, the following description will focus on different processes in S1516 to S1518.

In S1516, based on the screen control information in FIG. 16B acquired in S1002 in FIG. 10, a determination is made as to whether there are two or more sliders. In a case where it is determined that there are two or more sliders as in FIG. 16B, the process proceeds to S1517. However, when the number of sliders is one or less, the process proceeds to S1501.

In S1517, it is determined whether two or more slider names are included in the group ID determination result received in S1001 in FIG. 10. The slider names are, for example, "yellow", "green", "cyan", "blue", "magenta", and "red" in FIG. 16A. In a case where the group ID determination result is {COL0004, COL0006, NUM00002, DRG00013} (which is obtained when the user utters "Increase yellow and cyan by two"), it is determined from the group ID (COL0004, COL0006) that two or more slider names "yellow" and "cyan" are included. In a case where it is determined that there are two or more slider names as in the case shown in FIG. 16A, the process proceeds to S1518, but otherwise the process proceeds to S1501.

In S1518, a group ID determination result is regenerated for each slider name determined in S1517. For example, in a case where the group ID determination result is {COL0004, COL0006, NUM00002, DRG00013} as in the example in S1517, two group ID determination results are regenerated for the respective slider names, such as {COL0004, NUM00002, DRG00013} and {COL0006, NUM00002, DRG00013}. By regenerating group ID determination results in the manner described above, it becomes possible for the user to operate two or more sliders at the same time by making an utterance once.

A brief description of the processing flow following S1501 is given below for a case where the group ID determination result is {COL0004, COL0006, NUM00002, DRG00013} (which is obtained when the user utters "Increase yellow and cyan by two").

Two group ID determination results {COL0004, NUM00002, DRG00013} and {COL0006, NUM00002, DRG00013} are regenerated in S1518. These group ID determination results each match with the group ID information of the voice control operation determination information in FIG. 16C in S1501.

Next, it is determined in step S1502 that matching is successful, and the process further proceeds to S1506. More specifically, the two group ID determination results respectively match rows 1620 and 1624 in FIG. 16C.

In S1506, it is determined that both group ID determination results each indicate a slider button (that is, 1604 and 1608 in FIG. 16B), and thus the process proceeds to S1508.

In step S1508, it is determined that each group ID determination result includes a group ID {NUM0002} specifying the number of times, and thus the process proceeds to S1510.

In S1510, it is determined that the number of times is represented by a specific value (ie, "2"), and thus the process proceeds to S1511.

In S1511, it is determined that the voice control operation specifies to operate each slider button, corresponding to the group ID information, on the screen a specified number of times. More specifically, rows 1620 and 1624 in FIG. 16C match as group ID information. Thus, it is determined that the voice control operation specifies to operate each of sliders of yellow and cyan twice (that is, slider buttons of respective buttons 1604 and 1608 are pressed twice).

By performing the processing as described above, it is possible to simultaneously operate two or more sliders when the user utters "Increase yellow and cyan by two".

Supplement

As described above, according to the present embodiment, it is possible to perform a voice control operation on a setting screen including a plurality of slider-shape operation object. In the present embodiment, on a setting screen having a plurality of sliders, a voice control operation can be performed such that the pointed scale graduation is changed only for a specific slider. In the present embodiment, it is possible to move a plurality of sliders at the same time. In this embodiment, it is possible to specify the amount of movement for a plurality of sliders by using values. In the present embodiment, it is possible to perform a voice control operation to change a setting taking into account a current setting status. As described above, it is possible to flexibly control operations by a voice, and thus an excellent usability can be achieved. Note that in the examples of voice control operation determination information relating to controlling of the plurality of sliders described above with reference to FIG. 16C, examples are omitted in which information is represented in a special expression and examples are omitted in which the number of times the operation is performed as in the cases described above with reference to S1309, S1313, and S1315 of FIG. 13 and group ID information in FIG. 14C. However, processing can be performed in a similar manner to control a plurality of sliders.

Third Embodiment

A third embodiment described below discloses a method of changing a set value by a voice control operation such that a particular selection object of a plurality of selection objects is selected and the set value is changed in this state. In the first and second embodiments described above, the voice control operation is explained for a case where the result of the voice control operation determination process in S1003 indicates that the voice control operation specifies to transition to a slider screen or to move a slider.

Figure 27A:
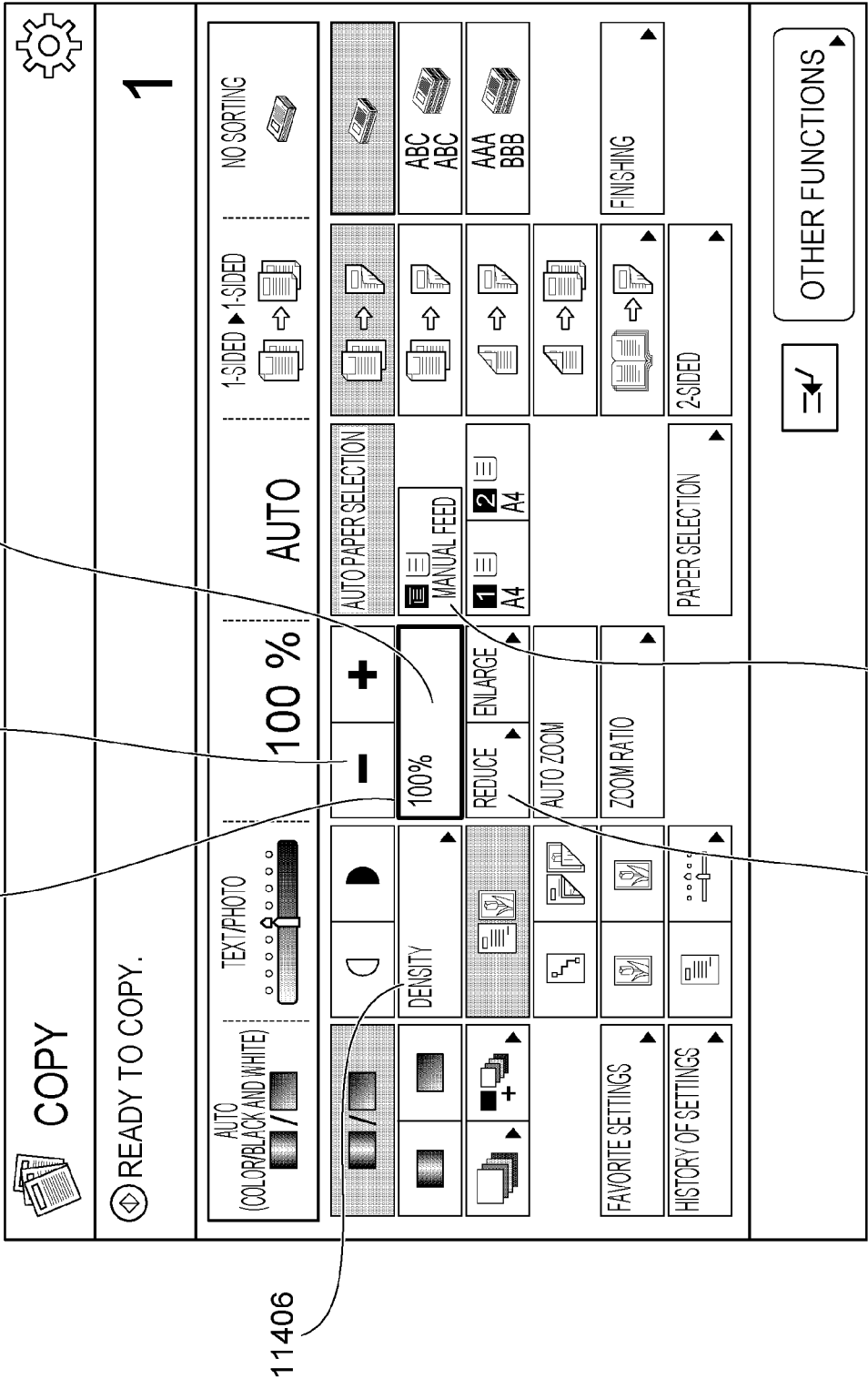
FIG. 27A is a diagram showing an example of an English version of a screen for explaining a voice control operation determination process.
Figure 27B:
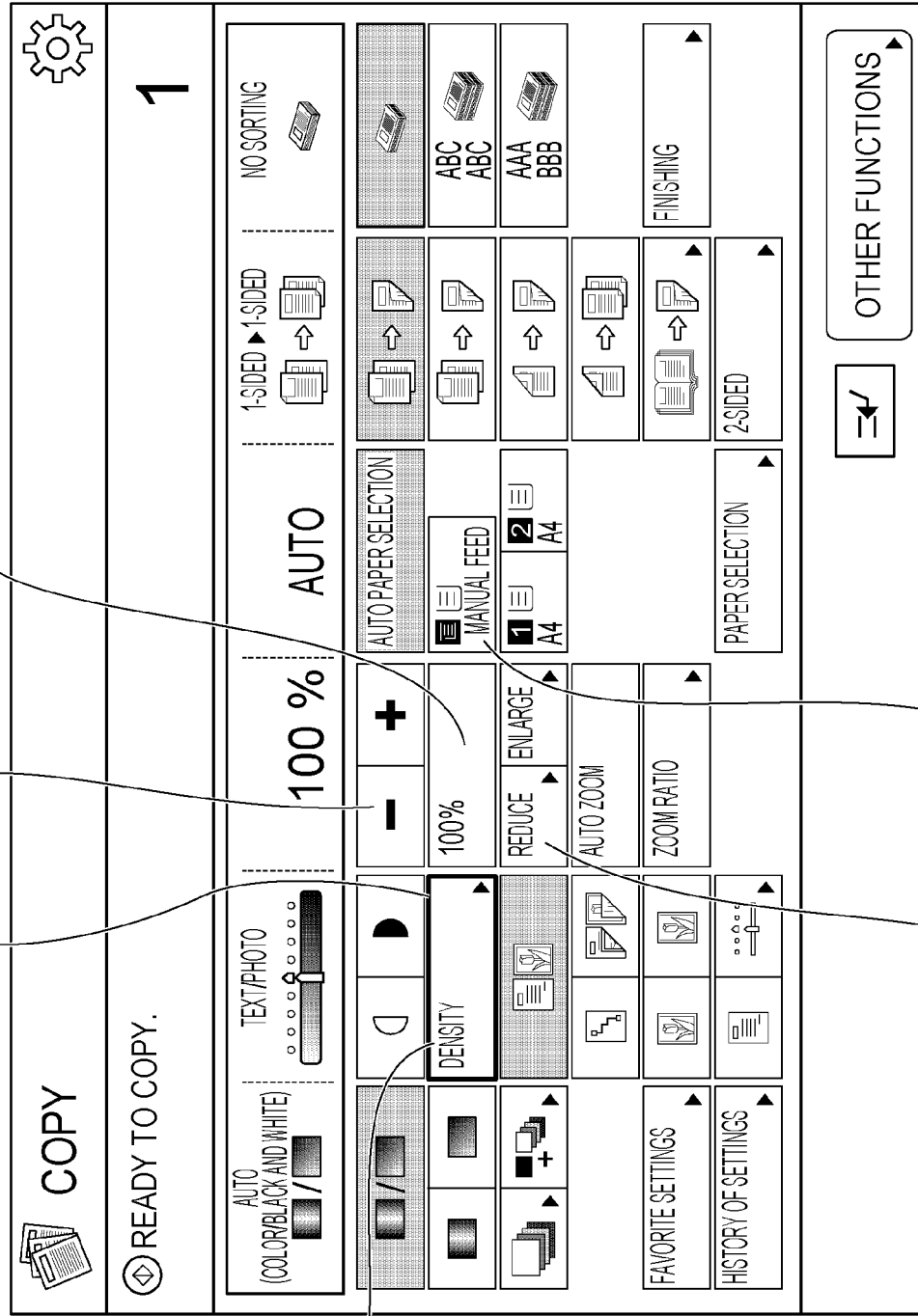
FIG. 27B is a diagram illustrating a further example of an English version of a screen for explaining a voice control operation determination process.

That is, in the third embodiment, the focus position (the position of interest) is changed based on the screen control information in FIG. 27B and the voice control operation determination information in FIG. 27C thereby updating the displayed screen. In this process, the focus position is changed based on the current focus position read at S1306 described later. After the setting using the focus is completed, the setting parameters of the data management unit 803 of the device control program 801 are updated. The button set at the position of interest is referred to as a button of interest (an object of interest), and an object used for highlighting the object of interest is referred to as a highlighting object.

Note that the third embodiment is similar to the first embodiment except for a featured part. Therefore, similar parts are denoted by similar reference numerals and a further description thereof will be omitted.

Figure 26:
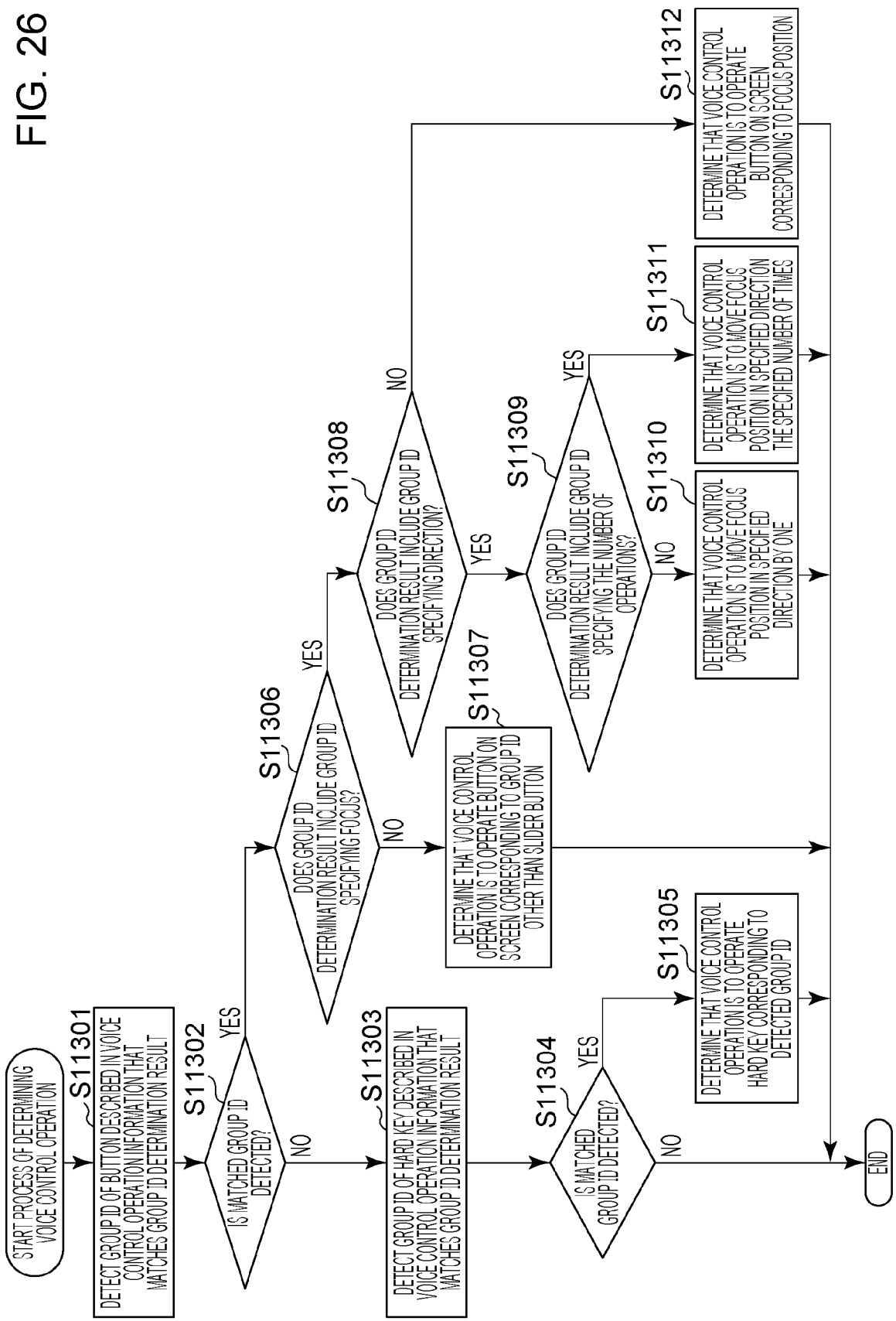
FIG. 26 is a diagram illustrating a processing flow of a voice control operation determination unit of an image forming apparatus.

FIGS. 28A to 28D are schematic diagrams illustrating examples of voice control operations performed by the user 106 and interactions by the system in response to the voice control operations. Note that examples described in the sequence shown in FIGS. 9A to 9C and the processing flow shown in FIG. 26 are more specifically described here. That is, FIGS. 28A to 28D illustrate examples of utterances given as voice control operations by the user 106, corresponding voice processing performed by the voice control apparatus 100 of the system, and the on/off status of the LED indicating the voice processing status. Screens displayed on the operation panel 509 of the image forming apparatus and corresponding voices reproduced as responses by the voice control apparatus 100 are also shown.

First, in the system, the LED is in the off state which shows that the system is in a waiting state for voice, and a top screen is displayed on the operation panel 509 (S11501). In this state, if the user 106 utters the wake word (S11502), then the system starts accepting the voice control operation and turns on the LED to indicate that utterance processing is in progress (S11503). Note that S11502 is a specific example of S905, and S11503 is a specific example of S906 in FIG. 9A. After the wake word, if the user 106 utters "I want to make a copy" (S11504), then the system blinks the LED to indicate that response processing is in progress (S11505), and the system displays the copy top screen (S11506). The system then reproduces a response voice saying "Copy screen is displayed" (S11507), and again turns on the LED to prompt the user 106 for the next utterance (S11508). Note that S11504 is a specific example of S907, S11505 is S908, S11506 is S915, S11507 is S919, and S11508 is a specific example of S920 in FIG. 9A.

Next, if the user 106 utters "Move focus to right" (S11509), then the system blinks the LED (S11510) and displays the copy top screen (setting screen) which has been modified such that the focus is moved to right (S11511). The system then reproduces a response voice saying "Focus has been moved" (S11512), and turns on the LED (S11513). Note that S11509 is a specific example of S926, S11510 is S927, S11511 is S915, S11512 is S929, and S11513 is a specific example of S930 in FIG. 9A or 9B.

Next, when the user 106 utters "Move focus down by three" (S11514), the system blinks the LED (S11515) and displays the copy top screen (setting screen) which has been modified such that the focus is moved down by three (S11516). The system then reproduces a response voice saying "Focus has been moved" (S11517), and turns on the LED (S11518). Note that S11514 is a specific example of S926, S11515 is S927, S11516 is S915, S11517 is S929, and S11518 is a specific example of S930 in FIG. 9A or 9B.

Next, when the user 106 utters "Select focus button" (S11519), the system blinks the LED (S11520) and displays the copy top screen modified such that the focused button is selected. The system then reproduces a response voice saying "Focus has been moved" (S11522), and turns on the LED (S11523). Details of the focus operation will be described later with reference to FIG. 26. Note that S11519 is a specific example of S931, S11520 is S932, S11521 is S915, S11522 is S934, and SI 1523 is a specific example of S935 in FIG. 9A, 9B or 9C.

Next, when the user 106 utters "Copy start" (S11524), the system blinks the LED (S11525) and executes the copy job. When the execution of the copy job is started, the system displays a screen indicating that the copy job is being executed (S11527), and reproduces a response voice saying "copying is starting" (S11526). When the execution of the copy job is completed, the system displays a screen indicating that the copy job execution is ended and reproduces a final response voice saying "copying is completed" (S11528). Furthermore, the system turns off the LED to indicate that the voice reception is disabled (S11529). Note that S11524, S11525, S11527, S11526, S11528, and S11529 are respectively specific examples of S936, S937. S944, S949, S954, and S955 shown in FIG. 9C.

Processing Flow of Voice Control Operation Determination Unit

FIG. 26 is a flow chart illustrating an outline of processing of the voice control operation determination unit 807 of the image forming apparatus 101. The processing shown in FIG. 26 corresponds to S1003 in FIG. 10, S914 shown in FIG. 9A, and S943 shown in FIG. 9C. FIGS. 27A to 27E illustrate an example of a screen on which an operation instructed to be performed by a voice is determined in the voice control operation determination process shown in FIG. 26, and examples of conventional operations (by pressing a button or a hardware key provided on the operation panel) and operations by the voice operation control.

The processing flow of the voice control operation determination unit 807 is described below with reference to FIG. 26 and FIGS. 27A to 27E.

First, FIGS. 27A to 27E are referred to.

Figure 27E:
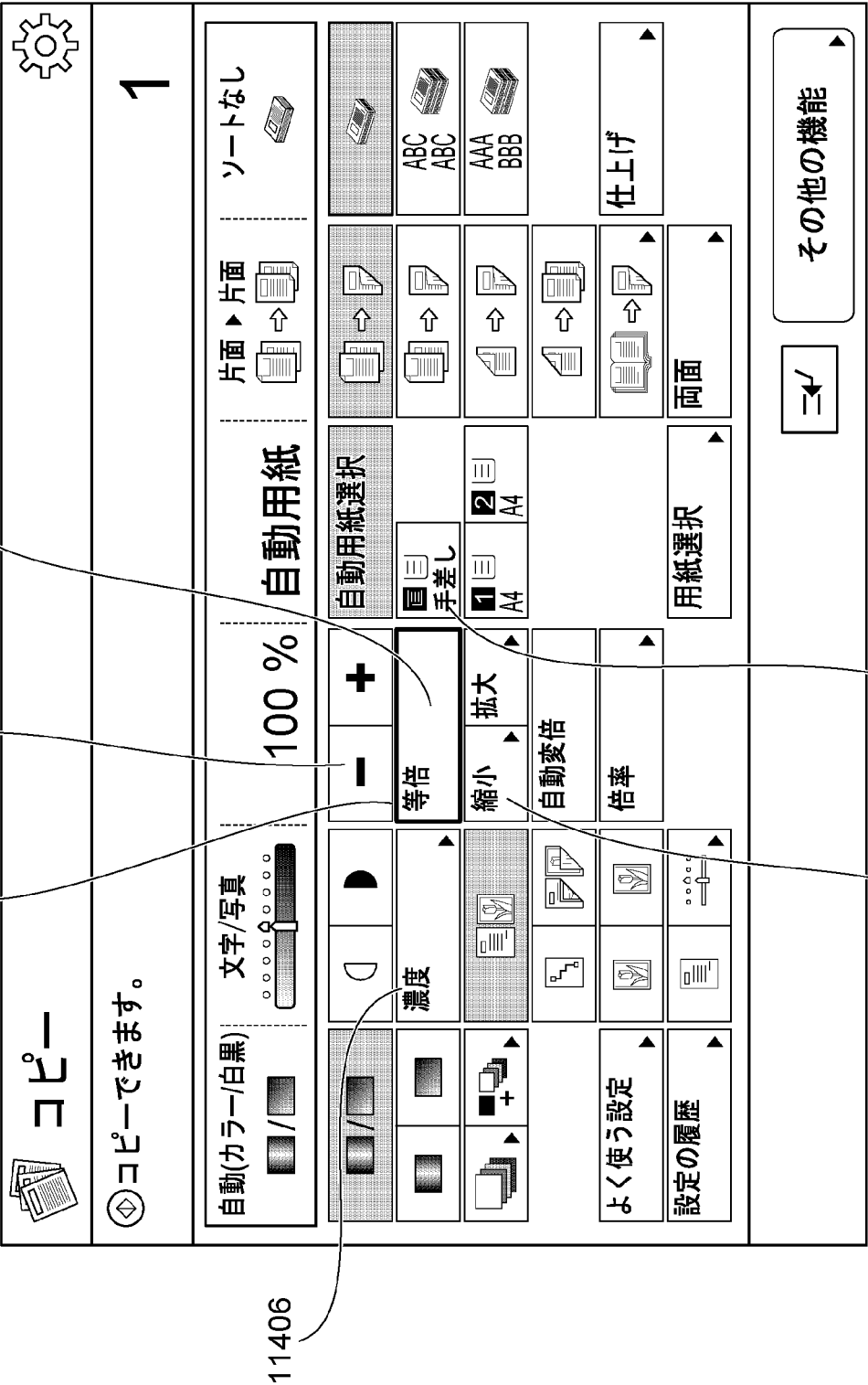
FIG. 27E is a diagram showing an example of a Japanese version of a screen for explaining a voice control operation determination process.
Figure 28A:
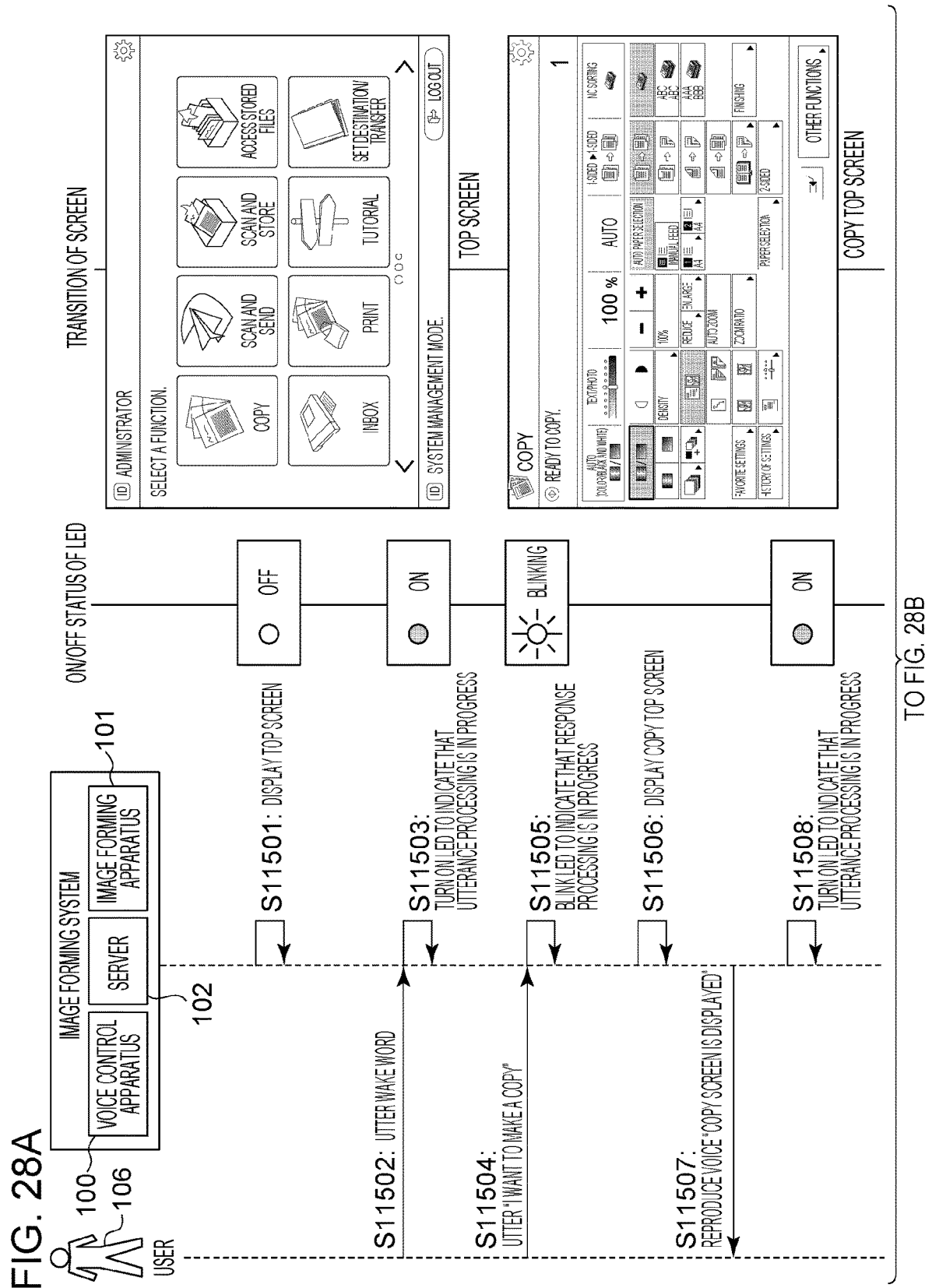
Figure 28D:
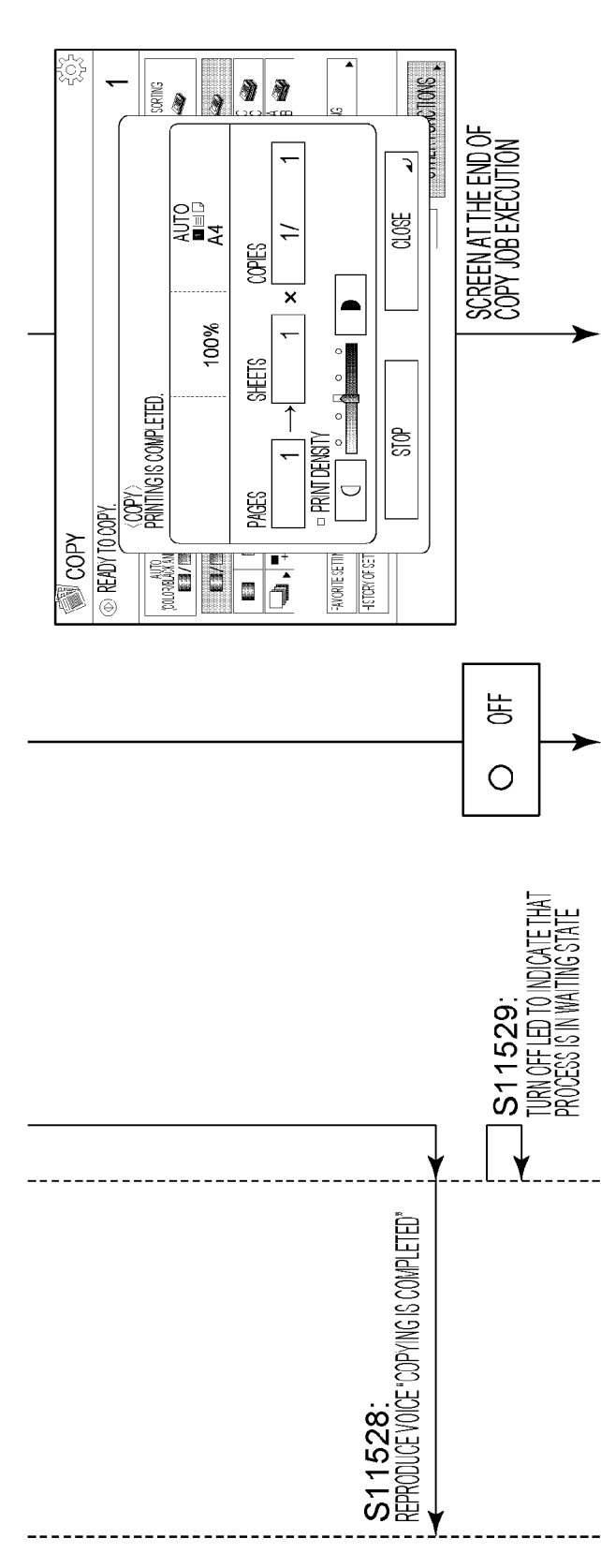
Figure 30A:
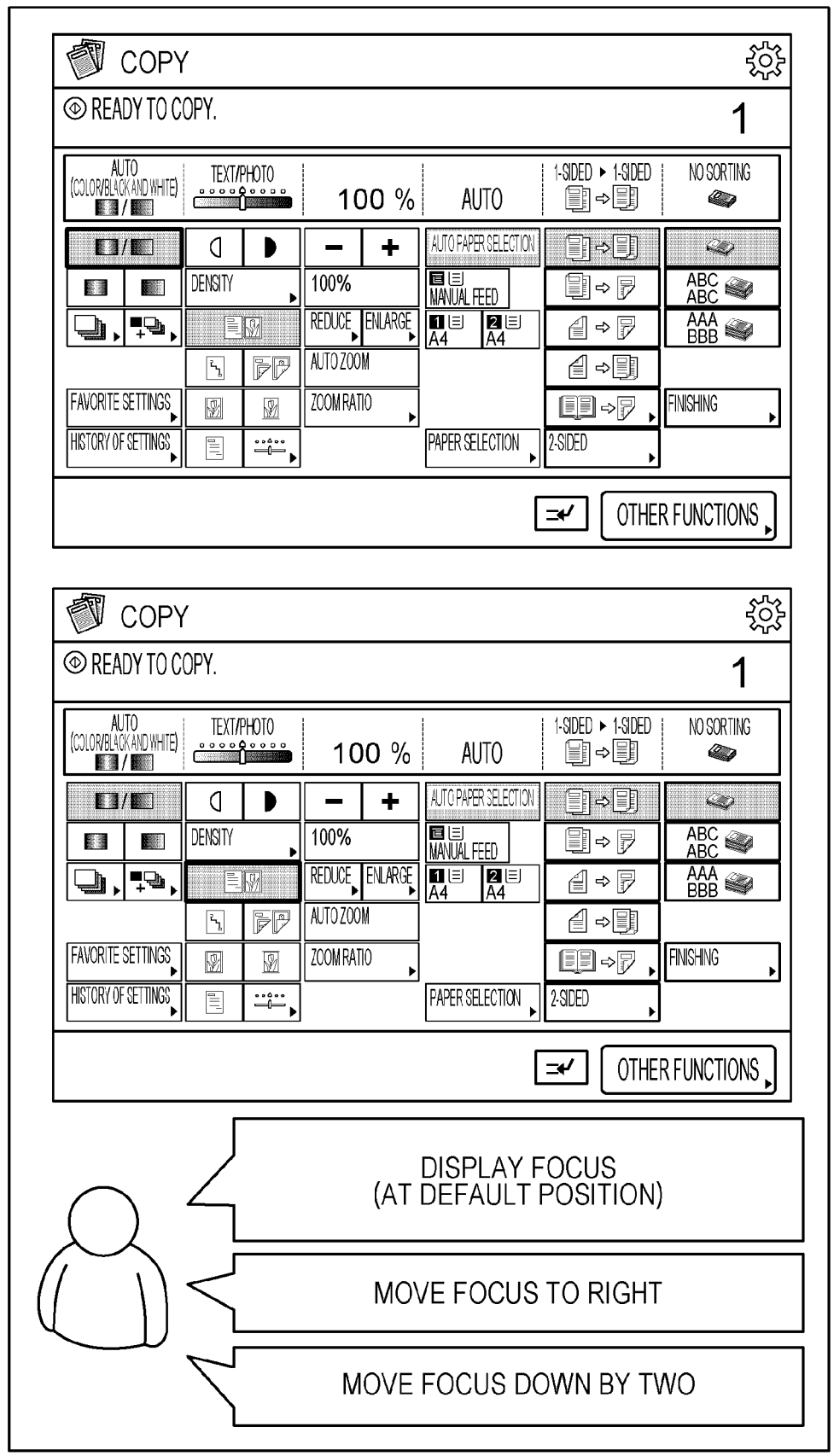
FIG. 30A is a diagram illustrating a manner in which a focus put at a default position is moved.
Figure 30B:
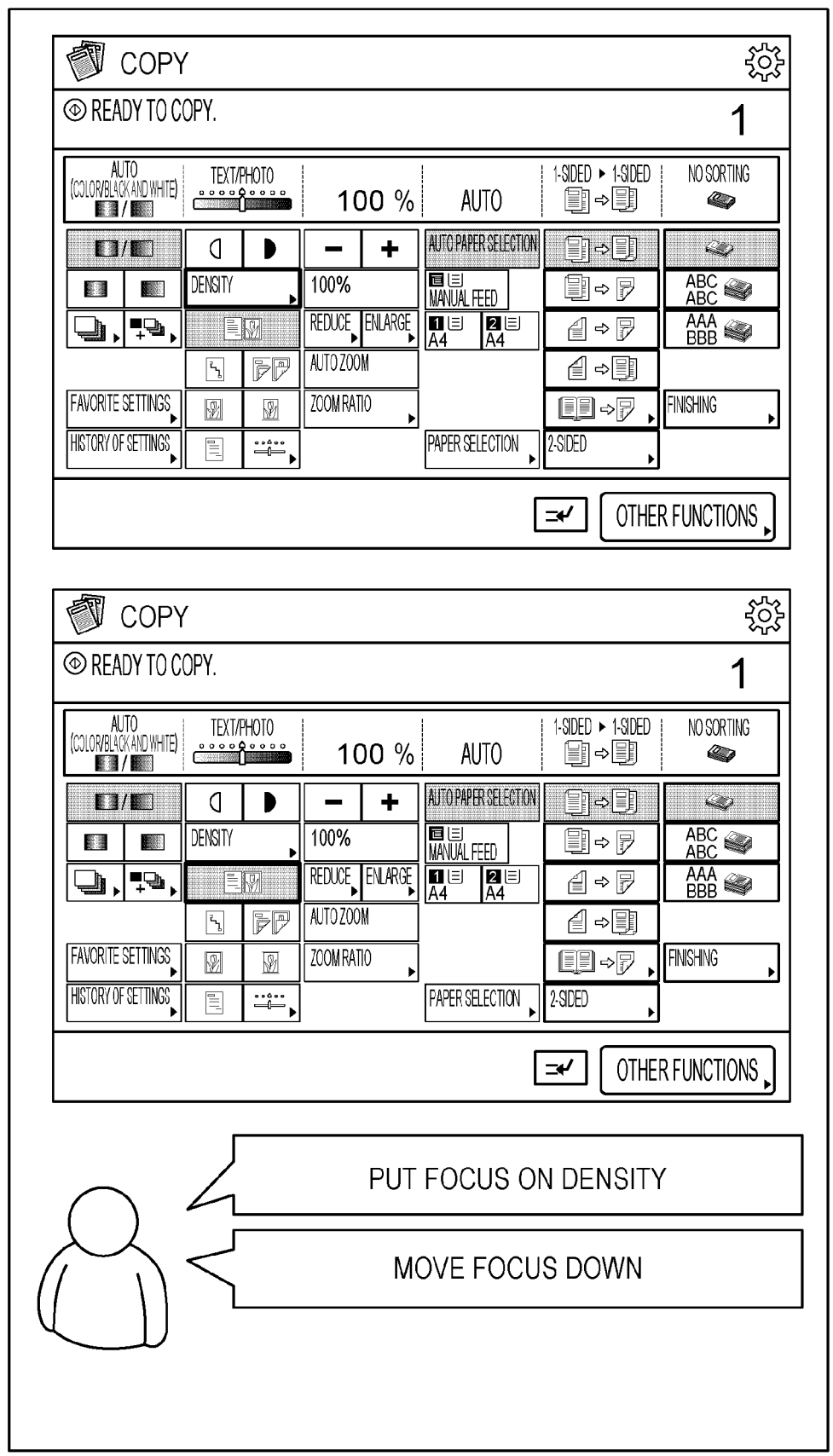
FIG. 30B is a diagram illustrating a manner in which a focus displayed at a position specified by a user is moved.

FIG. 27A illustrates an example of a screen (an English version) for adjusting the saturation of the image forming apparatus 101, and FIG. 27E illustrates an example of a screen (a Japanese version corresponding to the English version shown in FIG. 27A) for adjusting the saturation of the image forming apparatus 101. A focus 11401 is a highlighting object with a frame shape that is displayed so as to be superimposed on a particular button thereby indicating that the button is in a selected state. Buttons 11402 to 11406 are buttons for changing various copy settings. In FIG. 27A, the focus 11401 is displayed in a superimposed manner on a frame portion of a 100% button 11402. In the present embodiment, when a screen transition is performed in accordance with a voice control operation, a focus is displayed on the transitioned screen (the copy top screen). Note that a focus may always be displayed regardless of whether the screen transition is performed by a voice control operation or not. Alternatively, as shown in FIG. 30A, a focus is displayed at a default position in response to a user's utterance "Display focus", and then the focus may be moved to another button (such as text/photo button) represented by an icon located adjacent, on the right side, to the default position or located two buttons lower than the default position. FIG. 30A is a diagram illustrating a manner in which the focus displayed at the default position is moved. The timing of displaying the focus may be changeable by setting. The default position of the focus is on the leftmost button among a plurality of buttons (selection objects) on the screen. Note that the default focus position may be at any one of buttons at the lower left, upper right, lower right, or near the center. For example, the default position may be switchable by setting. Alternatively, the focus may be placed on a button specified by the user by a button name, and the focus operation may be started from this state. For example, as shown in FIG. 30B, first the focus may be placed on a density button 11406, and thereafter, the focus may be moved to another button, such as a button (text/photo button) represented by an icon located directly below. FIG. 30B is a diagram illustrating a manner in which the focus displayed at a position specified by a user is moved.

In the present embodiment, for the convenience of the description given later, an explanation is first given as to an operation performed after the focus has already been moved to the 100% button 11402. FIG. 27B illustrates an example of a screen obtained after the position of the focus 11401 in FIG. 27A is moved to the position of the density button 11406. The screens shown in FIG. 27A and FIG. 27B include buttons for changing setting in terms of copying in addition to buttons 11402 to 11406, but for simplicity, the following description focuses on buttons 11402 to 11406. FIG. 27C illustrates an example of screen control information on the screens shown in FIGS. 27A and 27B. FIG. 27D illustrates an example of the voice control operation determination information on the screens shown in FIGS. 27A and 27B. 11407 to 11416 in FIG. 27D indicate rows of the voice control operation determination information.

The processing shown in FIG. 26 is explained with reference to the screen shown in FIG. 27A and the examples of the screen control information and the voice control operation determination information shown in FIGS. 27B and 27C.

In S11301, matching is performed between the group ID determination result received in S1001 in FIG. 10 and the group ID information excluding the hardware keys (rows 11415 and 11416) of the buttons included in the voice control operation determination information acquired in S1002. For example, in a case where when the screen shown in FIG. 27A is displayed, if the group ID determination result is {ID:UIP00012, POS00016, FIN00011}, then matching is performed between group ID information in the column of "group ID information relating to the display screen" in the row 11407 of the voice control operation determination information in FIG. 27D and the group ID determination result. In this case, the group ID "UIP00012+POS00016+FIN000111" in the row 11407 is hit, and the matching is successful. Note that UIP00012 is information indicating the focus of interest, POS00016 is information indicating a direction, and +FIN00011 is information indicating movement. Note that POS00016 is direction information indicating a direction.

Note that the examples shown in FIG. 27D are suitable for voice control operations performed by the user viewing the Japanese-version screen shown in FIG. 27E.

In S11302, it is determined whether the matching in S11301 is successful or not. In a case where the matching is successful, the process proceeds to S11306, but otherwise the process proceeds to S11303.

In S11303, matching is performed between the group ID determination result received in S1001 in FIG. 10 and the group ID information in terms of the hardware keys included in the voice control operation determination information acquired in S1002. For example, on the screen shown in FIG. 27A, if the group ID determination result given by the server 102 is {ID:OPR00011} (which is obtained when the user 106 utters "Start"), then matching is performed between this group ID determination result and the group ID information in terms of the hardware keys in the voice control operation determination information In this case, the group ID "OPR00011" is hit in the voice control operation determination information, and the matching is successful.

In SI 1304, it is determined whether the matching in S1303 is successful or not. In a case where the matching is successful, the process proceeds to S11305, but otherwise the voice control operation determination process is ended.

In S11305, it is determined that the hardware key matched in S11303 is the operation target of the voice control operation, and the voice control operation determination process is ended. For example, when "Start" with the group ID information "OPR00011" is hit, it is determined that the voice control operation specifies to operate the start key 207, and the voice control operation determination process is ended.

In S11306, it is determined whether or not the focus 11401 is specified as the operation target in the matching result in S11301. For example, in a case where rows 11407 to 11409 of the voice control operation determination information in FIG. 27D are matched (for example, the row 11407 is matched when the user 106 utters "Move focus to left"), 11401 is described in the "number" column in the row 11401, and thus it is determined from the screen control information in FIG. 27A or FIG. 27B that the focus 11401 is specified by the voice control operation. Note that in a case where if it is determined that the focus is specified, the current position of the focus specified to be operated is read.

In a case where the matched operation target is the focus 11401, the process proceeds to S11308, but otherwise the process proceeds to S11307.

In S11307, it is determined that the result of the matching in S11301 indicates that the voice control operation specifies to operate a button on the operation screen, and the voice control operation determination process is ended. For example, in a case where "reduction" with a group ID "DGR0003" is matched, 11404 is described in the "number" column in the row 11408 of the voice control operation determination information shown in FIG. 27D, and thus it is determined, from screen control information in FIG. 27D, that the voice control operation specifies to operate the "reduction" button.

In S11308, a determination is made as to whether or not the group ID determination result includes a group ID specifying a direction. For example, in a case where {ID: POS00016} indicating "left" is included in the group ID determination result received in S1001 in FIG. 10, it is determined that a group ID specifying a direction is included in the group ID determination result. The group IDs indicating directions correspond to POS00010 to POS00017 in FIG. 25G, but, for simplicity of description, oblique directions such as upper right, lower left, and the like are excluded. In a case where a group ID specifying a direction is included, the process proceeds to S11310, bit otherwise the process proceeds to S11309.

In S11309, it is determined whether the group ID determination result includes a group ID specifying the number of times. For example, in a case where the group ID determination result received in S1001 in FIG. 10 includes {ID:NUM00002} (numerical information) indicating "two", it is determined that the group ID determination result includes a group ID specifying the number of times. The group IDs indicating the numbers correspond to NUM00001 to NUM99999 according to FIG. 7B. However, since the movement of the focus is eight at the maximum, the group IDs specifying the number of times are within the maximum allowable range of the focus movement (NUM00001 to NUM00008). If a group ID specifying the number of times is included, the process proceeds to S11311, but otherwise, the process proceeds to S11310.

In S11310, it is determined that the result of the matching in S11301 indicates that the voice control operation specifies to move the focus 11401 to a next button on the operation screen, and the voice control operation determination process is ended. More specifically, in a case where the row 11407 in FIG. 27D is matched as the group ID information, it is determined that the voice control operation specifies to move the focus 11401 to an adjacent button (that is, the focus 11401 is moved to one of buttons located above, below, left to, or right to the current focus position). For example, in a case where when the screen of FIG. 27A is displayed, the group ID determination result is {ID: UIP00012, POS00016, FIN00011}, it is determined from {POS00016} indicating "left" that the voice control operation specifies to move the focus 11401 to left by one button. When the screen updating process is performed in step S1004 in FIG. 10 based on the determination result described above, the screen is updated such that the focus 11401 is moved from the 100% button 11402 to the density button 11406 and is displayed so as to be superimposed on the density button 11406. In this manner, the user 106 is allowed to move the display position of the focus 11401 to one of upper, lower, left, and right button positions of the current button. The upper, lower, left, and right buttons to which the focus 11401 is moved are set in advance. That is, in the present example, the predetermined allowable movement destinations are a minus button 11403, a reduction button 11404, a density button 11406, and a manual feed button 11405 are located above, below, left to, and right to the position of the 100% button 11401 on which the focus is currently placed.

In SI 1311, it is determined that the result of the matching in S11301 indicates that the voice control operation specifies to move the focus 11401 by two or more buttons on the operation screen, and the voice control operation determination process is ended. For example, in a case where when the screen in FIG. 27A is displayed, if the group ID determination result is {ID: UP00012, NUM00002, POS00014} (which is obtained, for example, when the user 106 utters "Move focus down by two"), {NUM0002} indicates "two", {POS00014} indicates "down", and thus it is determined that the voice control operation specifies to move the focus 11401 down by two buttons. When the screen updating process is performed in step S1004 in FIG. 10 according to the determination result described above, the screen is updated such that the focus 11401 is moved from the 100% button 11402 to the auto zoom button and is displayed so as to be superimposed on the auto zoom button. In this way, the user 106 is allowed to move the display position of the focus 11401 by two or more positions at a time to one of buttons located above, below, left to, or right to the current focus position.

In S11312, it is determined that the voice control operation specifies to operate a button on the operation screen on which the focus 11401 is placed, and the voice control operation determination process is ended. More specifically, in a case where the row 11409 in FIG. 27D is matched as the group ID information, it is determined that the voice control operation specifies to operate the button on which the focus 11401 is currently placed. For example, when the screen of FIG. 27A is displayed, if the group ID determination result is {ID: UIP00012, OPR00040}, {OPR00040} indicates "selection" and thus it is determined that the voice control operation specifies to select the button on which the focus 11401 is currently placed. Then, in S1004 in FIG. 10, the screen is updated such that the screen is displayed in the same manner as when the 100% button 11402 is pressed.

As described above, the user 106 is allowed to operate the position of the focus 11401 by voice. Therefore, even if there is a button assigned no name, it is possible to select such a button by moving the position of the focus 11401 to the button (in the same manner as when the operation panel is pressed with a finger).

Examples of Manners of Displaying Focus

Figure 29A:
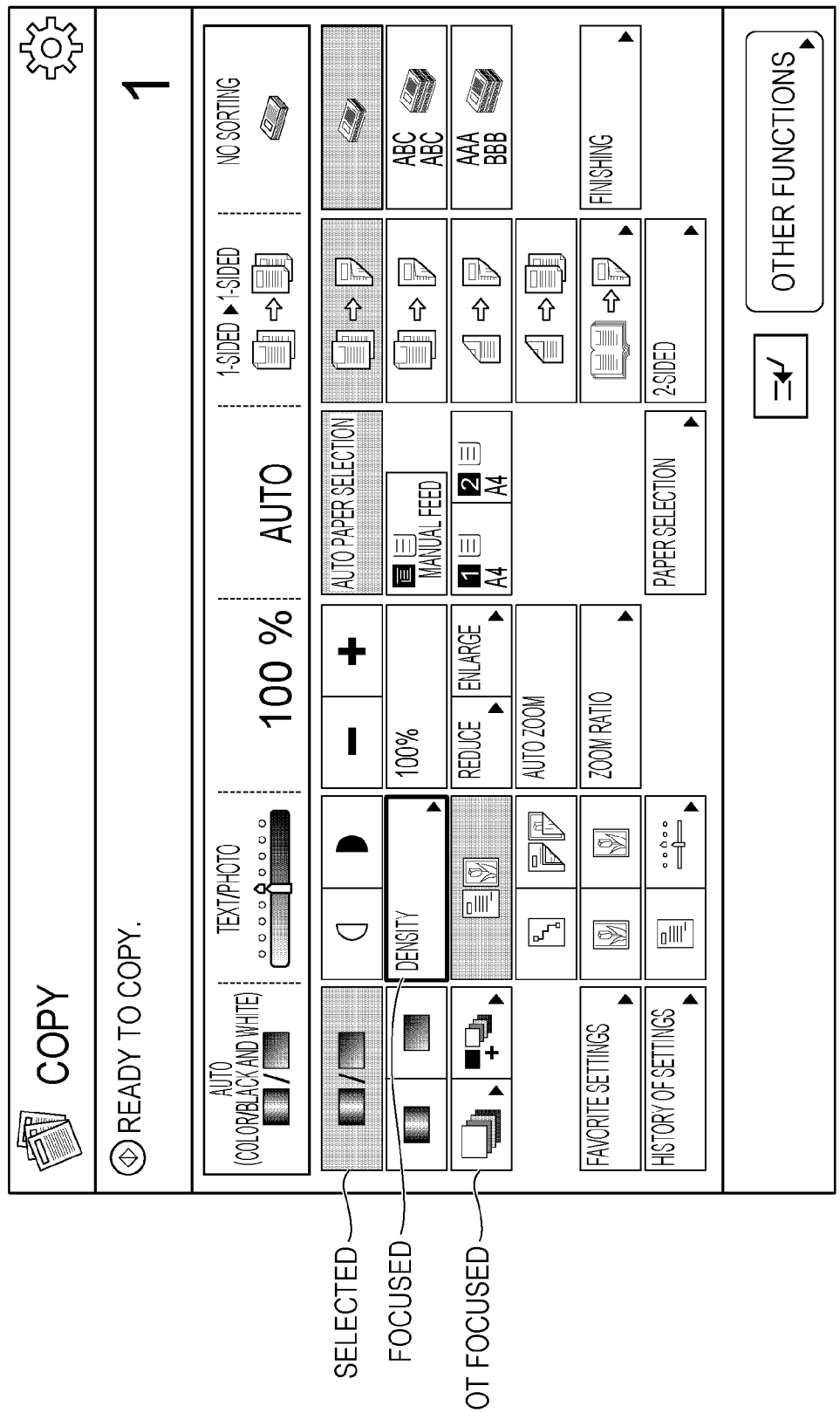
FIGS. 29A to 29C are diagrams illustrating examples of manners in which a focus is displayed.
Figure 29B:
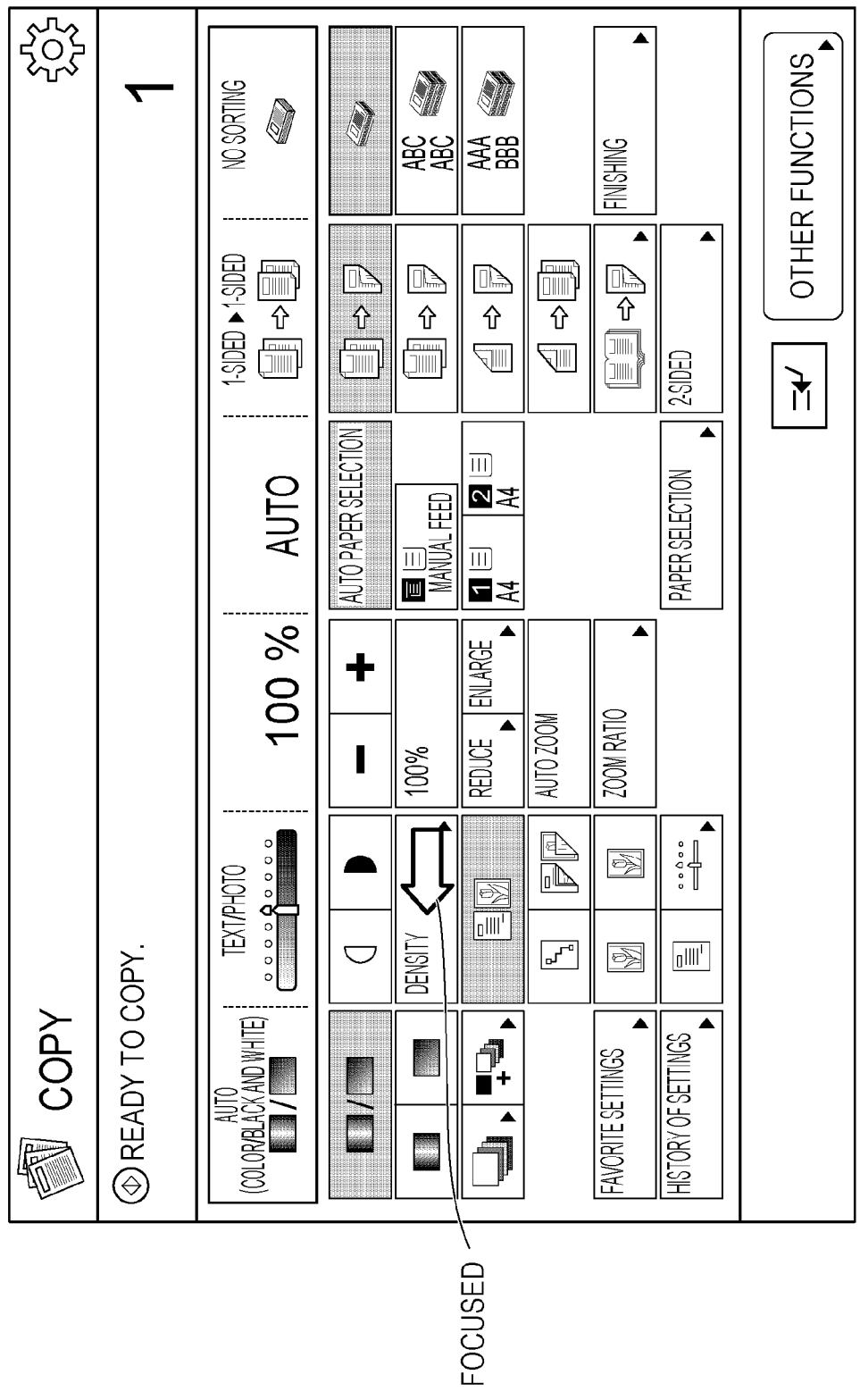
Figure 29C:
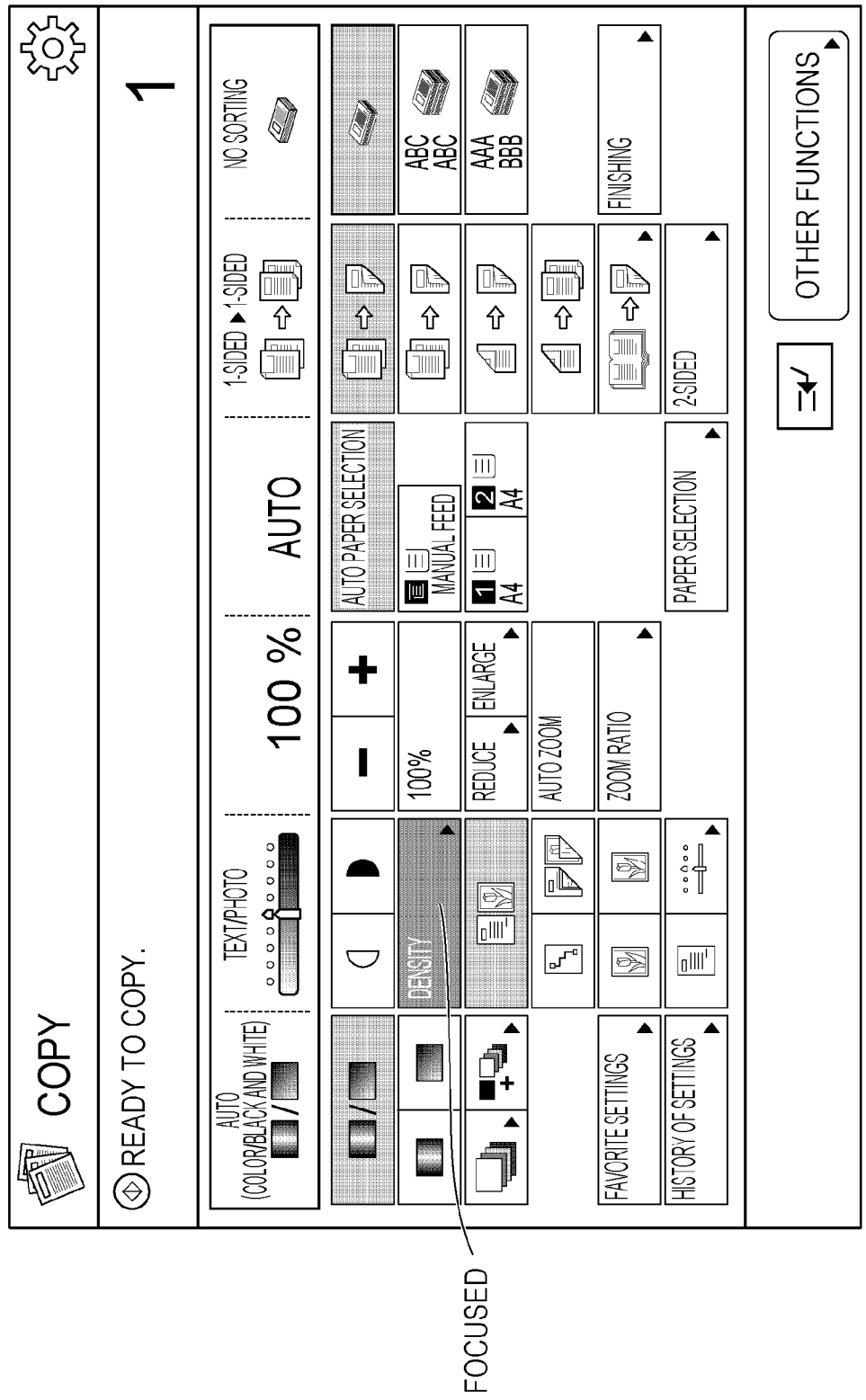

It is allowed to display the focus position in various manners depending on the screen configuration, the visibility, and the like. FIG. 29A illustrates an example in which a button on which the focus is placed is surrounded by a dark frame thereby explicitly notifying the user of the focus position. FIG. 29B illustrates an example in which the focus is explicitly indicated to the user 106 by pointing the focused button with an arrow (pointing icon). FIG. 29C illustrates an example in which the entire focused button is displayed in a dark and conspicuous color, and a text is displayed in a reversed color thereby explicitly notifying the user 106 that the button is focused.

As shown in FIGS. 29A to 29C, various methods can be used to indicate the focus position. However, it is preferable that the button in the selected state, the button in the non-selected state, and the button in the focused state are distinguished (identifiable). The method of displaying the focus may be switchable by setting.

Supplement

As described above, according to the present embodiment, the user 106 can operate, by voice, the operation panel 509 of the image forming apparatus 101. In particular, according to the present embodiment, the focus position on the screen can be controlled such that the focus is moved to one of the upper, lower, left, and right positions from the current focus position in accordance with an utterance made by the user. Furthermore, by selecting the focus by a voice operation control, it becomes possible to operate a button on which the focus is placed. Therefore, it becomes possible to specify even a selection object whose name is unknown by controlling the focus. According to the present embodiment, it is possible to selectively perform an operation to select a selection object (to change the selection status of the selection object) and an operation to place the focus on a selection object (to change the focused status). According to the present embodiment, it is possible to switch the condition of starting the focus display. According to the present embodiment, it is possible to switch the method of indicating the focus.

Other Embodiments

The present disclosure is not limited to the embodiments described above, and various modifications (including organic combinations of embodiments) are possible based on the spirit of the present disclosure. Note that any such modifications also fall within the scope of the present disclosure. That is, any embodiments and any modifications including combinations of embodiments fall within the scope of the present disclosure.

The present disclosure may be applied to a system including a plurality of devices, or to an apparatus including a single device. In the above-described embodiment, the voice control program 601, the device control program 801, and the voice data conversion control program 701 are respectively executed by the voice control apparatus 100, the image forming apparatus 101, and the server 102. However, all programs may be executed by the image forming apparatus 101 having a microphone. The server 102 may be separated, and the voice control program 601 and the device control program 801 may be executed by the image forming apparatus 101.

In the above embodiments, operations on operation screens have been described above for part of many operation screens provided by the image forming apparatus 101. Note that a method of controlling a particular screen by a natural language may be applied to other screens. In particular, a voice control operation on a screen including a slider-shaped operation object or a voice control operation using a focus may be applied to other screens.

FIGS. 19A to 19C, FIGS. 20A to 20C, and FIGS. 21A to 21C are diagrams illustrating lists of setting items in the image forming apparatus. In tables of lists shown in these figures, functional classes are described in the first column, that is in the leftmost column. The functions provided in the image forming apparatus 101, which is an MFP, include a print function, a copy function, and a transmission function. On the image forming apparatus 101, in addition to the settings relating to these functions, it is possible to make setting of the main part necessary for the apparatus to operate. In tables of lists shown in FIGS. 19A to 19C, FIGS. 20A to 20C, and FIGS. 21A to 21C, item groups are described in the second column as counted from the leftmost column. The item group is a group of items that are grouped together by similar classes among items operated in using the functions. The item groups are output as one or more screens. In tables of lists shown in FIGS. 19A to 19C, FIGS. 20A to 20C, and FIGS. 21A to 21C, items are described in the third column as counted from the leftmost column. The items are operation items or setting items that are allowed to be operated on a screen displayed for each item group. Items that are common in the function column or the item group column are operation items that can be used on almost all screens, except for some exceptional screens. In the present disclosure, settings can be changed not only on the screens described above with reference to the embodiments in terms of the level adjustment, the saturation adjustment, etc., but the present disclosure can also be applied to changing of any setting items described in FIGS. 19A to 19C, FIGS. 20A to 20C, and FIGS. 21A to 21C. Furthermore, in addition to the settings described above, the present disclosure can be applied, by way of example, to sliding in a display area on a page by a voice control operation such as "Move to right by two pages", "Scroll the page by about ½", and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-106916, filed Jun. 7, 2019, and Japanese Patent Application No. 2019-110689, filed Jun. 13, 2019, which are hereby incorporated by reference herein in their entirety.

What is claimed is:

1. An image forming system comprising:
an image forming device configured to form an image on a sheet;
a display capable of displaying information;
a microphone capable of acquiring a sound; and
one or more controllers configured to function as:
a unit configured to perform control so as to display, on the display, a screen including a plurality of sliders for making a setting relating to an image formation;
a unit configured to acquire, based on first one-phrase voice information acquired via the microphone, first identification information about a selecting slider of interest among the plurality of sliders and second identification information corresponding to a direction; and
a unit configured to update a position indicated by the slider of interest from a first position to the second position, based on the first identification information and the second identification information,
wherein in a case where second one-phrase voice information acquired by the microphone includes the first identification information, the second identification information, and adverb information indicating an extent, the slider of interest is updated from the first position to a third position different from the second position.

2. The image forming system according to claim 1, wherein
first one-phrase text information is acquired from the first one-phrase voice information using at least a learning model learned using training data including a pair of text information and voice information, and
the first identification information and the second identification information are acquired from the first one-phrase text information.

3. The image forming system according to claim 1, wherein the one or more controllers are configured to further function as a unit configured to provide the first identification information given by a name that is not displayed on the screen.

4. The image forming system according to claim 1, wherein the plurality of sliders are each linked to corresponding predetermined identification information.

5. The image forming system according to claim 1, wherein the screen is a screen for setting a copy function.

6. The image forming system according to claim 1, wherein the screen is a screen for setting a transmission function.

7. The image forming system according to claim 1, wherein the screen is a screen for setting a print function.

8. The image forming system according to claim 1, wherein the screen is a screen for setting a main part.

9. The image forming system according to claim 1, further comprising:
a speaker configured to output a sound; and
a unit configured to, in response to the updating, provide a notification via the speaker.

10. The image forming system according to claim 1, further comprising a unit configured to generate a synthesize voice for use in the notification.

11. The image forming system according to claim 1, further comprising an apparatus including the microphone, the display, and the one or more controllers.

12. The image forming system according to claim 1, further comprising:
an apparatus including the microphone and the display; and
an apparatus including the one or more controllers.

13. The image forming system according to claim 1, further comprising:
an apparatus including the microphone; and
an apparatus including the display and the one or more controllers.

14. The image forming system according to claim 1, further comprising:
- an apparatus including the microphone;
- an apparatus including the display; and
- an apparatus including the acquisition unit.

15. The image forming system according to claim 1, wherein the one or more controllers are configured to further function as a unit configured to acquire further text information based on further voice information acquired via the microphone,
- wherein the further text information includes instruction information to shift a screen not including the slider of interest to a screen including the slider of interest.

16. The image forming system according to claim 1, wherein the display is capable of receiving a touch operation, and each of the plurality of sliders is shifted into a selected state by the touch operation regardless of whether each of the plurality of sliders is a slider of interest.

17. The image forming system according to claim 1,
- wherein the screen includes the first slider, the second slider and a third slider, and the first slider is emphasized to indicate that this one of the selection sliders is the slider of interest.

18. The image forming system according to claim 1, wherein the adverb information indicating the extent is adverb information about a width by which the slider is moved.

19. The image forming system according to claim 1, wherein the adverb information indicating the extent is not adverb information indicating a direction.

20. The image forming system according to claim 1, wherein the adverb information indicating the extent is a word slightly.

21. The image forming system according to claim 1, wherein the third position is a position moved more than the second position in a direction indicated by the second identification information from the first position.

22. The image forming system according to claim 1, wherein the third position is a position not moved more than the second position in a direction indicated by the second identification information from the first position.

23. An information processing method comprising:
- preparing a display capable of displaying information;
- preparing a microphone capable of acquiring sound;
- performing control so as to display, on the display, a screen including a plurality of sliders for making a setting relating to an image formation;
- based on first one-phrase voice information acquired via the microphone, acquiring first identification information about a selecting slider of interest among the plurality of sliders and second identification information corresponding to a direction; and
- updating an objecta position indicated by the slider of interest from a first position to the second position, based on the first identification information and the second identification information,
- wherein in a case where second one-phrase voice information acquired by the microphone includes the first identification information, the second identification information, and adverb information indicating an extent, the slider of interest is updated from the first position to a third position different from the second position.

* * * * *